US009227247B1

(12) United States Patent
Binford et al.

(10) Patent No.: US 9,227,247 B1
(45) **Date of Patent: *Jan. 5, 2016**

(54) METHOD AND APPARATUS FOR LOADING VESSELS USING ROTATION

(71) Applicant: Coastal Cargo Company, Inc., New Orleans, LA (US)

(72) Inventors: Wallace R. Binford, Slidell, LA (US); Gerald C. Miller, Gautier, MS (US); William C. Alberts, Ocean Springs, MS (US)

(73) Assignee: Coastal Cargo Company Inc., New Orleans, LA (US)

( * ) Notice: Subject to any disclaimer, the term of this patent is extended or adjusted under 35 U.S.C. 154(b) by 48 days.

This patent is subject to a terminal disclaimer.

(21) Appl. No.: 14/159,572

(22) Filed: Jan. 21, 2014

Related U.S. Application Data

(63) Continuation of application No. 13/621,906, filed on Sep. 18, 2012, now Pat. No. 8,632,296, which is a continuation of application No. 12/861,959, filed on Aug. 24, 2010, now Pat. No. 8,267,638, which is a (Continued)

(51) Int. Cl.
*B63B 27/10* (2006.01)
*B23B 27/10* (2006.01)

(52) U.S. Cl.
CPC ..................................... *B23B 27/10* (2013.01)

(58) Field of Classification Search
USPC ................ 108/54.1, 55.1, 56.1, 57.28, 57.32, 108/57.34; 187/237; 414/139.9, 140.2, 414/140.4, 141.5, 142.6, 398, 404, 416.09, 414/425, 592, 607, 620, 621, 641, 661, 662, 414/664, 665, 667, 669, 672, 758, 761, 763, 414/766, 767, 776, 783, 785, 799, 802, 803, 414/814, 816, 912
See application file for complete search history.

(56) References Cited

U.S. PATENT DOCUMENTS

| | | | |
|---|---|---|---|
| 1,373,513 | A | 4/1921 | Ladd |
| 1,490,235 | A | 4/1924 | Smith et al. |

(Continued)

FOREIGN PATENT DOCUMENTS

| | | |
|---|---|---|
| AU | 199656235 | 1/1997 |
| AU | 199748410 | 1/1998 |

(Continued)

OTHER PUBLICATIONS

Cascade Corporation, product literature, "45G, 55G, 65G Rotators", 2005.

(Continued)

*Primary Examiner* — Gregory Adams
(74) *Attorney, Agent, or Firm* — Brett A. North; Garvey, Smith, Nehrbass & North, L.L.C.

(57) ABSTRACT

A method and apparatus for rapid loading stacks of items aboard vessels which can include rotating palletized items to depalletize the items, and then placing the items on a lifting robot, lifting the robot and items into the hold of a vessel, removing the items from the robot using a load push lift truck, and then using the load push lift truck to stow the items in a stowage location. The empty robot can be removed from the hold of the vessel and put in a position to receive a another depalletized stack of cartons. In one option the robot has a plurality of fork channels for receiving the blades of a load push lift truck along with receiving the blades or a rotating lift truck.

20 Claims, 29 Drawing Sheets

Related U.S. Application Data continuation of application No. 11/777,756, filed on Jul. 13, 2007, now Pat. No. 7,780,397.

(60) Provisional application No. 60/943,988, filed on Jun. 14, 2007.

(56) References Cited

U.S. PATENT DOCUMENTS

| | | | | |
|---|---|---|---|---|
| 1,555,785 | A | 9/1925 | Luce | |
| 1,878,994 | A * | 9/1932 | Abbe | 414/620 |
| 2,388,458 | A | 11/1945 | Alfonte | |
| 2,509,023 | A | 5/1950 | Vogel et al. | |
| 2,639,051 | A | 5/1953 | Thomas | |
| 2,671,571 | A | 3/1954 | Gerhardt | |
| 2,782,066 | A | 2/1957 | Lord | |
| 2,808,157 | A | 10/1957 | Terrill | |
| 2,890,807 | A | 6/1959 | Parcell | |
| 3,332,716 | A | 7/1967 | Gridley | |
| 3,370,880 | A | 2/1968 | Carliss et al. | |
| 3,433,376 | A | 3/1969 | Jordan | |
| 3,499,560 | A | 3/1970 | Gros | |
| 3,645,409 | A | 2/1972 | Sinclair | |
| 3,949,890 | A * | 4/1976 | Keller | 414/810 |
| 3,952,888 | A | 4/1976 | Currie | |
| 3,971,584 | A | 7/1976 | Duncan | |
| 3,972,553 | A | 8/1976 | Johnston | |
| 4,185,944 | A | 1/1980 | Seaberg | |
| 4,219,300 | A * | 8/1980 | McMillan | 414/420 |
| 4,274,794 | A | 6/1981 | Olson | |
| 4,279,564 | A | 7/1981 | Weinert | |
| 4,439,093 | A | 3/1984 | Victorino | |
| 4,556,359 | A | 12/1985 | Sinclair | |
| 4,642,020 | A | 2/1987 | Sinclair | |
| 4,679,685 | A | 7/1987 | Inoko | |
| 4,694,962 | A | 9/1987 | Taub | |
| 4,737,069 | A | 4/1988 | Coblentz | |
| 4,818,717 | A | 4/1989 | Burkholder | |
| 4,850,283 | A | 7/1989 | Carvin | |
| 4,878,796 | A | 11/1989 | Ammeraal | |
| 4,907,933 | A | 3/1990 | Kressly et al. | |
| 4,941,794 | A | 7/1990 | Hara et al. | |
| 4,972,782 | A | 11/1990 | Shepherd et al. | |
| 5,009,562 | A | 4/1991 | Hosotani et al. | |
| 5,161,934 | A | 11/1992 | Richardson | |
| 5,186,596 | A | 2/1993 | Boucher et al. | |
| 5,209,629 | A | 5/1993 | Rasmussen | |
| 5,364,226 | A | 11/1994 | Gombos et al. | |
| 5,391,038 | A | 2/1995 | Stewart | |
| 5,403,142 | A | 4/1995 | Stewart | |
| 5,779,295 | A | 7/1998 | Auston | |
| 5,827,039 | A * | 10/1998 | Gammerler | 414/744.6 |
| 6,189,931 | B1 | 2/2001 | Balzano | |
| 6,360,676 | B1 | 3/2002 | Schepers | |
| 6,375,407 | B1 | 4/2002 | Coblentz | |
| 6,789,997 | B2 | 9/2004 | Coblentz | |
| 6,824,346 | B2 | 11/2004 | Coblentz | |
| 7,213,684 | B2 * | 5/2007 | Bruns et al. | 187/237 |
| 7,780,397 | B1 * | 8/2010 | Binford et al. | 414/803 |
| 8,267,638 | B1 * | 9/2012 | Binford et al. | 414/803 |
| 8,632,296 | B1 * | 1/2014 | Binford et al. | 414/803 |
| 2005/0279582 | A1 * | 12/2005 | Bruns et al. | 187/237 |

FOREIGN PATENT DOCUMENTS

| | | |
|---|---|---|
| AU | 199715022 | 9/1998 |
| CA | 1052723 | 4/1979 |
| CA | 2025464 | 7/1990 |
| CA | 2045121 | 11/1997 |
| DE | 7537962 | 6/1976 |
| GB | 2024115 | 1/1980 |
| GB | 2049617 | 12/1980 |
| JP | 57-43240 | 3/1982 |
| JP | 58006828 | 1/1983 |
| JP | 60-026527 | 2/1985 |
| JP | 63-166578 | 10/1988 |
| JP | 01-187199 | 7/1989 |
| JP | 05-139445 | 6/1993 |
| JP | 06-156492 | 6/1994 |
| JP | 06-321358 | 11/1994 |
| JP | 07-041180 | 2/1995 |
| JP | 07-228467 | 8/1995 |
| JP | 08-073036 | 3/1996 |
| JP | 08-183532 | 7/1996 |
| WO | WO95/23105 | 8/1995 |

OTHER PUBLICATIONS

Cascade Corporation, "Operator's Guide, Series 4, Non-Sideshifting/Sideshifting/Revolving Clamps, Turnafork, Turnaload", Manual No. 1809012-R0, 1998.

Cascade Corporation, Service Manual, G-Series Revolving Clamps, 2005.

Cascade Corporation, product drawing for Double Frame Design, 2005.

Cascade Corporation, product literature,"Rotator with Load Hold Down", 2003.

Cascade Corporation, product literature, "Turnaload," 2003.

Cascade Corporation, product literature, "Inverta Push", 2003.

Cascade Corporation, product literature, "220/300/400 D-Series Rotators", 2003.

Prior Commercial use by Coastal Cargo Company, Inc., prior public use in United States occurred more than one year before effective filing date of instant application.

* cited by examiner

METHOD AND APPARATUS FOR LOADING VESSELS USING ROTATION

CROSS-REFERENCE TO RELATED APPLICATIONS

This is a continuation of U.S. patent application Ser. No. 13/621,906, filed Sep. 18, 2012 (issuing as U.S. Pat. No. 8,632,296 on Jan. 21, 2014), which was a continuation of U.S. patent application Ser. No. 12/861,959, filed Aug. 24, 2010, (issued as U.S. Pat. No. 8,267,638 on Sep. 18, 2012), which was a continuation of U.S. patent application Ser. No. 11/777,756, filed Jul. 13, 2007, (issued as U.S. Pat. No. 7,780,397 on Aug. 24, 2010), which was anon-provisional of U.S. Provisional Patent Application Ser. No. 60/943,988, filed Jun. 14, 2007. Each of the above-referenced applications are incorporated herein by reference. Priority of all of the above applications is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND

The present invention relates to cargo handling and, in particular, to handling with lift trucks (e.g., fork lifts) using rotation of palletized stacks of cartons or boxes to rotate the stacks of cartons and pallets about 180 degrees around a substantially horizontal axis.

Stevedores load and stow in ships many items, including palletized stacks of cartons of frozen animal products. A large volume of animal products such as frozen chicken, turkey, beef, pork, and seafood products are frozen and shipped in boxes or cartons. For example, chicken thighs, legs, or quarters may be shipped in cartons of about 23.5 inches in length by about 16.5 inches in width by about 4 to about 6.25 inches in height (59.7 cm by 41.9 cm by 10.2 to 15.9 cm). Each carton of frozen animal parts may weigh between about 30 and about 45 pounds (14 to 20 kg). A preferred standardized box size can be about 24 inches by about 16 inches (61.0 cm by 40.6 cm) with the height of the box varied to hold the particular products to be shipped. A box of such dimensions containing frozen chicken parts may weigh between about 30 to about 45 pounds (14 to 20 kg). Generally, these cartons are stacked on wooden "two" and/or "four way" pallets in layers. For simplicity, this application refer generally to stacks of cartons of frozen animal products (such as cartons of frozen chicken parts), as other animal products may be similarly handled, or merely to stacks of cartons.

In order to facilitate unitized transportation and storage of stacks of cartons of frozen animal products, the stacks are typically wrapped with a stretchable plastic film (e.g., stretch wrap or shrink wrap) to help reduce sliding of the individual cartons and/or layers of cartons relative to one another and facilitate the handling of the stacks as unitized loads.

A pallet is a platform or open-ended box, usually made of wood, that allows mechanical handling of bulk goods during transport and storage. Although wood is typically used, other materials such as metals, composites, etc., can be used to make pallets. "Two-way" wooden pallets are typically made of three parallel beams (including a center beam and two outer beams). Slats or other surface support members can be nailed, stapled, or otherwise fastened to the upper and lower surfaces of the support beams (slats forming at least the top). "Two-way" pallets can be converted to "four-way" pallets by including openings in the beams along their lower edges and/or removing (or spreading) slats from the bottom to allow insertion of lift truck blades (e.g., forks or tines) parallel to the slats (and generally perpendicular to the beams). "Four-way" pallets can be lifted from any of their four sides—therefore, they are described as "four-way." However, "two-way" pallets can only be lifted from two directions (e.g., the two directions which are both generally parallel to their beams and generally perpendicular to their slats).

Size restrictions imposed by standard trucks and trailers normally cause the cartons to be stacked on 40 by 48 inch (102 by 122 cm) pallets with five cartons per layer—arranged with layers of two cartons placed on the pallets in an end-to-end relationship beside three cartons placed side to side with their long axes being perpendicular to those of the first two cartons. While the exact sizes of the stacks of cartons may vary depending on the true dimensions of the cartons, stacks of cartons and layers of such stacks will be referred to as having a longer side of 48 inches (122 cm) (called length "L") and a shorter side of 40 inches (102 cm)(called width "W"). These dimensions are approximate, and may vary depending on box dimensions along with factors such as bulging of the cartons and irregularities in the stacking pattern. In general, however, the cartons have a relatively low aspect ratio (length divided by height). For example, a 4 inch tall by 16 inch long carton would have an aspect ratio of 4 inches by 16 inches or 0.25. A palletload of cartons generally contains between about 10 to 12 layers of cartons. A 12 layer stack of cartons (with 5 cartons per layer) with each carton weighing about 30 pounds (14 kg) would in total weigh about 1800 pounds (818 kg). Two such stacks of cartons would weigh about 3,600 pounds (1,636 kg).

In the frozen animal products industry the general practice includes using pallets having dimensions of 40 by 48 inches (102 by 122 cm), however, 48 by 48 inch pallets (122 by 122 cm) holding five cartons per layer, can also be used. In such cases, the layers can each have two rows of three cartons with the three cartons of each row being in a side-to-side arrangement. Typically, the stacking pattern for either the 40 by 48 or 48 by 48 inch pallets (102 by 122 cm or 122 by 122 cm) may be varied, such as by rotating the stacking pattern from layer to layer. For example, in the 40 by 48 inch (102 by 122 cm) pallets the two end-to-end cartons may be arranged along one of the long edges of the pallet in one layer and rotated 180 degrees in the next layer.

Excessive delays in loading of the stacks of cartons of frozen animal products which result in cartons being left on the dock or in a truck or trailer, can allow the frozen product to begin to thaw, which can result in spoilage, or otherwise render the product unmarketable. Delays in loading may also result in increased condensation of moisture on the cartons which can complicate the handling process. As the industry is seeking to use less wax on the cartons and to utilize paper-coated boxes, the damaging effect of condensation and internal thawing on the boxes is increased and delays should be minimized.

While there have been significant advances in the methods of loading and unloading of ships or vessels, the loading of stacks of cartons of frozen animal products has proved difficult due to many problems associated with the handling of stacks of frozen animal products. As a result, the loading of stacks of frozen animal products onto ships is currently carried out by methods involving high costs, significant expenditures of labor, and which include various bottlenecks slowing down the process—resulting in excessively large loading times, along with product damage, degradation, and/or spoilage.

Space on refrigerated vessels is at a premium. Stowing the pallets with the stacks of cartons of frozen animal products takes valuable storage space away from the possible stowage of additional cartons. Accordingly, the practice has been to stow the cartons without the pallets. Removing the pallets has been done manually, e.g., by hand restacking the cartons without the pallets. Additionally, removing the pallets has been done mechanically, e.g., by pushing the stacks of cartons off of the pallets. However, these prior art methods of depalletizing the palletized stacks of cartons have various disadvantages.

When it is time to load a ship with the cartons, lift trucks can be used to remove the palletloads of stacks of cartons frozen animal products from the cold storage warehouse, and place them inside dry van trucks or truck trailers for transportation to the dock where the ship is waiting to be loaded. The trucks or truck trailers are typically uninsulated and unrefrigerated, and thus can provide a deleterious environment to the stacks of frozen animal products if they are not soon loaded into the refrigerated ship. At the dock, the cartons can be removed from the truck trailer by lift trucks and placed on the dock. Alternatively, if the cold storage warehouse is sufficiently near to the dock, the lift trucks may transport the palletized stacks of cartons directly to the dock.

Hand loading has been used for many years. The palletized stacks of cartons can be lifted or hoisted into the ship's hold using lifting robots, carriers, slings, lifting platforms, lift cages, flying forks, or the like. In the hold, lift trucks can move the palletized stacks of cartons and transport the palletized stacks closed to their ultimate stowage location. Stevedores can then manually (i.e., by hand) unstack the individual cartons from the pallets and restack the cartons without pallets for shipping. The empty pallets can then be removed from the hold. Manual unloading can be slowed by the time it takes to manually unstack and restack the individual cartons along with delays in returning pallets shipside.

One method proposed to decrease loading times and increase loading efficiency (compared to manual unstacking and restacking) is described in U.S. Pat. No. 6,622,854 (for a "Method and Apparatus for Loading Stacks of Cartons of Frozen Animal Products Onto Vessels Using a Carrier"), which patent is incorporated herein by reference. In its abstract this patent describes using "[a] method for rapid loading of stacks of cartons aboard vessels is provided which may include sliding the stacks of cartons from a pallet onto a carrier having fork channels receiving the blades of a load push lift truck, lifting the carrier into the hold of a vessel, removing the stacks of cartons from the carrier using a second load push lift truck and stowing the stack of cartons in a stowage location using the second load push lift truck." One of the disadvantages of the method described in the '854 Patent is the damage to the cartons (and frozen animal products) caused by sliding the stacks of cartons off of their pallets and onto the carrier. Even where the cartons are pushed in the direction of the supporting pallet slats, damage to the cartons can occur by discontinuities in the slats (e.g., nails, splintered portions, and/or misaligned slats). Damage to the cartons both slows down the overall loading process and typically is charged to the stevedore—both being undesirable. Another of the disadvantages of the method described in the '854 Patent is the time it takes to slide the stacks of cartons off of pallets. During the process of sliding, the load push lift truck is necessarily immobile (and cannot ambulate from one place to another, e.g., traveling towards the carrier to deposit the depalletized stack of cartons), also slowing down the overall loading process and efficiency. Another disadvantages of the method described in the '854 Patent, is the requirement that two stacks of cartons being simultaneously slid onto the carrier have their lengths (i.e., their 48 inch sides) parallel to and co-linear with each other. This necessarily increases the overall length of the carrier being used to lift the stacks (the dimensions of the two stacks of cartons 40 inches by 96 inches). This is required because the stacks are pushed in the direction of the upper slats of the four way pallets (i.e., such slats are parallel to the 40 inch sides of the stacks and perpendicular to the 48 inch sides of the stacks).

It would be advantageous to develop a method of depalletizing the stacks of cartons where the stacks are not required to be slid off of the pallets.

It would be advantageous to develop a method of depalletizing where the stacks can be both rotated and simultaneously moved to the area where they will be hoisted to the ship.

It would be advantageous to develop a method of depalletizing two stacks of cartons where the 40 inch sides of each stack are parallel to and co-linear with each other making the dimension of the two stacks 48 inches by 80 inches taking up less longitudinal length in the hold and allowing the load push lift trucks to have more room to work around the hold.

Many of the ships transporting cartons of frozen animal products internationally are older vessels having ship's gear (e.g., union purchases and/or cranes) with a three-ton (metric) rated capacities. This permits the ship's gear to lift up to three stacks of cartons at a time, depending on the weight of the stacks, along with the weight of the ship's gear used to lift the stacks. However, other ships may have cranes with capacities of five or more tons. Because of structural concerns, the weight of a lifting robot or carrier used to hoist two stacks of cartons can approach one ton. Accordingly, with three-ton ship's cranes or union purchases, generally only two stacks of cartons at a time can be lifted into the hold of the ship. In some cases loading docks may include dock cranes or mobile cranes which can be used to hoist or lift loads into the ships allowing for the hoisting of heavier loads.

Incorporated herein by reference is published European Patent Application number 86202117.7, published as EPO publication number EP0224966 "Method for loading piece goods, supplied on pallets, into a hold, particularly a hold of a vessel."

While certain novel features of this invention shown and described below are pointed out in the annexed claims, the invention is not intended to be limited to the details specified, since a person of ordinary skill in the relevant art will understand that various omissions, modifications, substitutions and changes in the forms and details of the device illustrated and in its operation may be made without departing in any way from the spirit of the present invention. No feature of the invention is critical or essential unless it is expressly stated as being "critical" or "essential."

BRIEF SUMMARY

The apparatus of the present invention solves the problems confronted in the art in a simple and straightforward manner. In one embodiment is provided a method and apparatus for using rotation to depalletize palletized stacks of cartons of frozen animal products and then loading these depalletized stacks a vessel with a lifting robot.

One embodiment provides a method for transportation and loading stacks of cartons of frozen animal products from the side of a refrigerated vessel and into one of its holds.

In one embodiment palletized of stacks of cartons may be rotated for depalletizing, and then loaded on a loading robot for lifting into a ship.

The loading robot may then be lifted into the hold of a ship. The robot may be provided with fork channels or forking openings, of sufficient depth and spacing that can receive the blades (the forks) of the lift truck. These permit the blades of the lift truck to be easily removed after loading the lifting robot outside of the ship. Inside the ship this also permits lifting of the palletless stacks of cartons from the robot for transport of the stacks to a stowage location.

In the hold of the ship the stack of cartons may be deposited at the storage location by sliding it relative to the long axis of the forks of the lift truck to deposit it in the stowage location.

A rotation attachment can be used on a lift truck which allows rotation of the one or more stacks of cartons of about 45 degrees, about 90 degrees, about 180 degrees, about 270 degrees, about 360 degrees, and more.

In one embodiment, depending on the configuration of the loading robot, a lift truck with multiple sets of blades may be used to load two or more stacks of cartons onto the robot at a time.

In one embodiment where the robot is provided with fork channels or fork openings, a lift truck may pick up at least one of the stack of cartons by inserting its forks under the stack and into the fork channels or fork openings and then lifting the stack directly once the robot is landed in the cargo hold of the ship. The load push lift truck may position the push mechanism in its fully retracted position and moves its blades into the fork channels or fork openings under the at least one stack of cartons. Thereafter, the at least one entire stack of cartons may be transported to its stowage location or to a position near its stowage location, including stowage locations on top of another stack of cartons.

In one embodiment when the loading of the hold is completed except for the area under the square of the ship's hatch, the at least one load push lift truck and other equipment and materials may be removed from the hold. Thereafter, the square of the hatch may be filled by using the ship's gear to lift one or more stacks of cartons from alongside into the square of the hatch such as by using cargo slings disposed about the stack. Multiple stacks of cartons may be lifted at one time if a spreader bar or like apparatus is used.

One embodiment includes using a rotating lift truck to lift and depalletize by rotation at least one palletized stack of cartons of frozen products.

One embodiment includes using a rotating lift truck to lift and depalletize by rotation at least two palletized stacks of cartons of frozen products.

In one embodiment the lift truck includes a side shifting device for horizontally positioning horizontally adjusting the position of stacks of cartons before depositing them in a lifting area.

In one embodiment the lift truck includes a rotation stop at about 180 degrees which restricts rotation to about 180 degrees in a first angular direction of rotation.

In one embodiment the lift truck includes a second rotation stop at about 180 degrees which restricts rotation to about 180 degrees in a second angular direction of rotation, the second angular direction of rotation being the opposite direction compared to the first angular direction of rotation.

In one embodiment the at least one stack of cartons is wrapped with stretch or shrink wrap to facilitate unitized handling of the stack.

In one embodiment the at least two stacks of cartons are wrapped individually by stack with stretch or shrink wrap to facilitate unitized handling of the at least two stacks.

In one embodiment the lift truck includes a plurality of upper and lower fork tines or blades, the upper fork tines or blades being movable relative to the lower fork tines to compress and/or expand.

In one embodiment the upper fork tines or blades include two sets of two fork tines, and the lower fork tines include two sets of two fork tines or blades.

In one embodiment the upper fork tines or blades include two sets of three fork tines or blades, and the lower fork tines or blades including two sets of two fork tines or blades. In one embodiment the two sets of three fork tines can be converted to two sets of two fork tines blades.

In one embodiment the upper fork tines or blades include two sets of upper fork tines or blades, and the first set of upper fork tines or blades being movable relative to the second set of upper fork tines or blades.

In one embodiment the lower fork tines or blades include two sets of lower fork tines or blades, and the first set of lower fork tines or blades being movable relative to the second set of lower fork tines or blades.

In one embodiment during rotation the upper and lower sets of forks tines or blades are used to support the at least one stack of cartons.

In one embodiment the rotating lift truck causes at least 45 degrees of the rotation to occur while the at least one palletized stack of cartons is supported by the lift truck, and while the lift truck is moving from the first area towards a lifting area.

In one embodiment the rotating lift truck causes at least 90 degrees of the rotation to occur while the at least one palletized stack of cartons is supported by the lift truck, and while the lift truck is moving from the first area towards a lifting area.

In one embodiment the rotating lift truck causes at least 135 degrees of the rotation to occur while the at least one palletized stack of cartons is supported by the lift truck, and while the lift truck is moving from the first area towards a lifting area.

In one embodiment the rotating lift truck causes at least 180 degrees of the rotation to occur while the at least one palletized stack of cartons is supported by the lift truck, and while the lift truck is moving from the first area towards a lifting area.

In any of the embodiments two palletized stacks of cartons can be simultaneously rotated 180 degrees for depalletization.

In one embodiment, during rotation the lift truck moves greater than about 5, 10, 15, 20, 25, 30, 35, 40, 45, 50, 60, 70, 80, 90, and/or 100 feet. In various embodiments the range of movement during rotation can be any range between any two of the above specified distances.

In one embodiment the at least one stack of cartons has a cross sectional area with long and short dimensions, the lift truck having a longitudinal axis, and when the lift truck rotates the at least one stack of cartons, the long dimension of the at least one stack is parallel to the longitudinal axis of the lift truck.

In one embodiment the at least one stack of cartons has a cross sectional area with long and short dimensions, the lift truck having a longitudinal axis, and when the lift truck deposits the at least one stack of cartons on the robot, the long dimension of the at least one stack being parallel to the longitudinal axis of the lift truck.

In one embodiment the at least one palletized stack of cartons is on a pallet having a plurality of support slats and the support slates having a plurality of longitudinal axes, after depalletization by rotation, the at least one stack of cartons is deposited on the robot, the robot having a plurality of fork openings, each opening having a longitudinal axis, the pallet is located over the plurality of fork openings and at least one of the plurality of longitudinal axes of the slats are substantially perpendicular to at least one of the plurality of longitudinal axes of the plurality of fork openings;

In one embodiment a first set of two palletized stacks of cartons are simultaneously rotated by a rotating lift truck in a first angular direction, loaded simultaneously on a loading robot, and then a second set of two palletized stacks of cartons are simultaneously rotated by the rotating lift truck in a second angular direction, and loaded simultaneously on the loading robot, the second angular direction being the opposite of the first angular direction.

In one embodiment a rotating lift truck, with upper and lower sets of fork tines or blades, rotates two palletized stacks of cartons, the stacks being of substantially different heights, and during rotation the upper and lower sets of fork tines or blades clamp and hold the two stacks.

In one embodiment the rotating lift truck includes a side support which constrains lateral movement of the at least one stack of cartons during at least part of the rotation cycle.

In one embodiment the side support is a support plate. In one embodiment, the side support includes a front positioning member. In one embodiment, the side support plate includes a first positioning member on the upper end of the side support, and/or a second positioning member on the lower end of the side support.

In one embodiment relative movement of the side support with respect to the at least one stack of cartons causes either the first or second positioning member to laterally reposition at least one displaced carton.

In one embodiment relative vertical movement of the side support with respect to the at least one stack of cartons causes either the first or second positioning member to laterally reposition at least one displaced carton.

In one embodiment relative horizontal movement of the side support with respect to the at least one stack of cartons causes either the first or second positioning member to laterally reposition at least one displaced carton.

In one embodiment the lifting robot is operably connected to the ship for lifting.

In one embodiment the lifting robot includes a plurality of fork openings or fork channels capable of receiving a plurality of fork tines or blades from a lift truck.

In one embodiment the lifting robot includes a plurality of fork openings or fork channels each having widened horizontal inlets to guide fork tines or blades entering the fork openings in a horizontal direction.

In one embodiment the lifting robot includes a plurality of fork openings or fork channels each having widened vertical inlets to guide fork tines or blades entering the fork openings in a vertical direction.

In one embodiment the lifting robot includes at least six fork openings or channels for receiving the fork tines or blades of a lift truck.

In one embodiment the lifting robot includes at least one positioning guide for automatically laterally repositioning the lifting robot by a lift truck during the process of loading the robot. In one embodiment the lifting robot includes at least one positioning guide for automatically angularly repositioning the lifting robot by a lift truck during the process of loading the robot. In one embodiment the lifting robot includes at least one positioning guide for automatically laterally and angularly repositioning the lifting robot by a lift truck during the process of loading the robot.

In one embodiment the loading robot includes at least two positioning guides, at least three positioning guides, and/or at least four positioning guides spaced apart from each other. In one embodiment at least one of the positioning guides serves as a structural support for the lifting robot. In one embodiment at least one of the positioning guides is an angled plate.

In one embodiment, the lifting robot has a base and the width of the base decreases from the front edge of the robot towards the center of the robot.

In one embodiment horizontal movement of the lift truck operably interacts with at least one of the positioning guides and repositions the robot for loading. In one embodiment repositioning of the robot includes lateral movement. In one embodiment repositioning of the robot includes rotational movement of the robot. In one embodiment repositioning of the robot includes both lateral and rotational movement of the robot caused by the lift truck.

In one embodiment a plurality of stacks of depalletized cartons are loaded on the lifting robot by a downward movement with pallets old pallets located above the stacks.

In one embodiment, before the depalletized stacks of cartons are loaded on the lifting robot, the rotating lift truck vertically spaces apart the pallets from the stacks.

In one embodiment, after the depalletized stacks of cartons are loaded on the lifting robot, the rotating lift truck vertically spaces apart the pallets from the stacks.

In one embodiment the ship lifts the loaded lifting robot and deposits the lifting robot in one of the ship's holds. In one embodiment a crane or union purchase is used to lift the lifting robot.

In one embodiment, in the hold, a load push lift truck inserts its fork tines or blades under the at least one depalletized stack of cartons through the plurality of fork openings or fork channels and raises the at least one stack and stows the stack in the hold. In one embodiment two load push lift trucks are used in the hold. In one embodiment each of the load push lift trucks include pushers. In one embodiment the load push lift trucks also include side shifting devices for horizontally adjusting the position of stacks of cartons before depositing them in the hold of the ship.

In one embodiment two load push lift trucks operate concurrently in the hold of the ship. In one embodiment each load push lift truck includes a side shifting device for horizontally adjusting the position of stacks of cartons before depositing them in the hold of the ship. In one embodiment each load push lift truck includes a plurality of fork tines or blades and the plurality of fork tines or blades entering a plurality of fork channels of the robot under the stacks.

In one embodiment each hold of the ship includes multiple decks and lower decks are loaded with depalletized stacks of cartons before proceeding to the loading of upper decks with depalletized stacks of cartons.

In one embodiment a plurality of holds in the ship are loaded simultaneously with depalletized stacks of cartons. In one embodiment at least two of the holds in the ship are loaded simultaneously with depalletized stacks of cartons. In one embodiment at least three of the holds in the ship are loaded simultaneously with depalletized stacks of cartons. In one embodiment at least four holds in the ship are loaded simultaneously with depalletized stacks of cartons.

In one embodiment at least one pallet is automatically removed from the fork tines of the rotating lift truck at a used pallet storage station. In one embodiment the automatic removal is caused by the momentum of the pallet overcoming frictional forces resisting the sliding of the pallet off of the fork tines or blades of the lift truck.

In one embodiment at least one pallet is manually removed from the fork tines or blades of the rotating lift truck at a used pallet storage station.

In one embodiment a plurality of pallets at a plurality of used pallets station are collected and brought to an overall used pallet storage station.

One embodiment includes one or more apparatuses for practicing the methods.

In one embodiment other transport carriers beyond a ship can be loaded after rotating the stacks of cartons. These include, but are not limited to, the storage areas for trains and/or trucks.

In this application fork tines are used interchangeably with blades.

The drawings constitute a part of this specification and include exemplary embodiments to the invention, which may be embodied in various forms.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION

Detailed descriptions of one or more preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in any appropriate system, structure or manner.

General Overview

Figure 1:
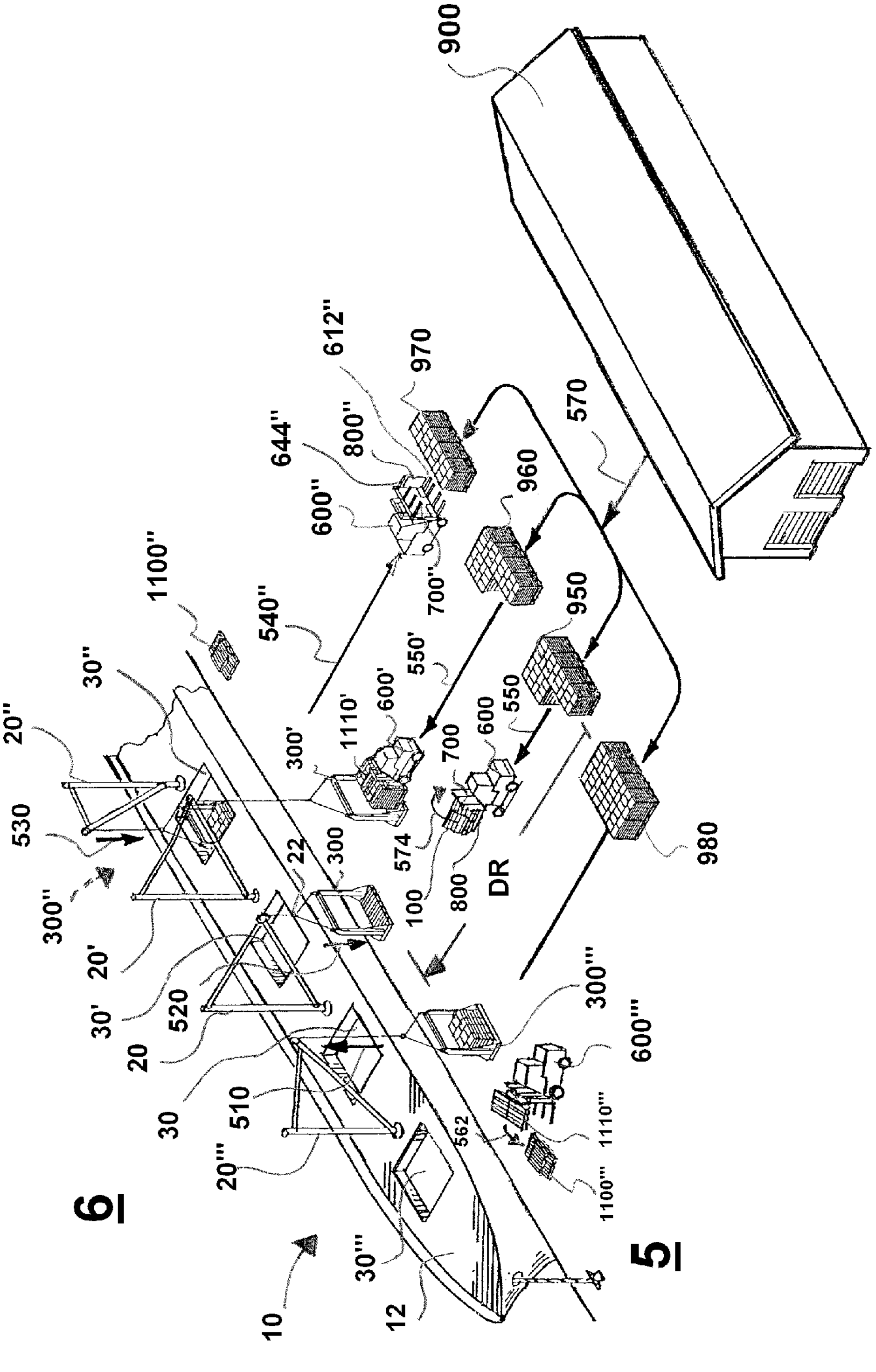
FIG. 1 is an overall perspective view illustrating one embodiment using multiple robots and multiple rotating lift trucks to load a single ship.
Figure 2:
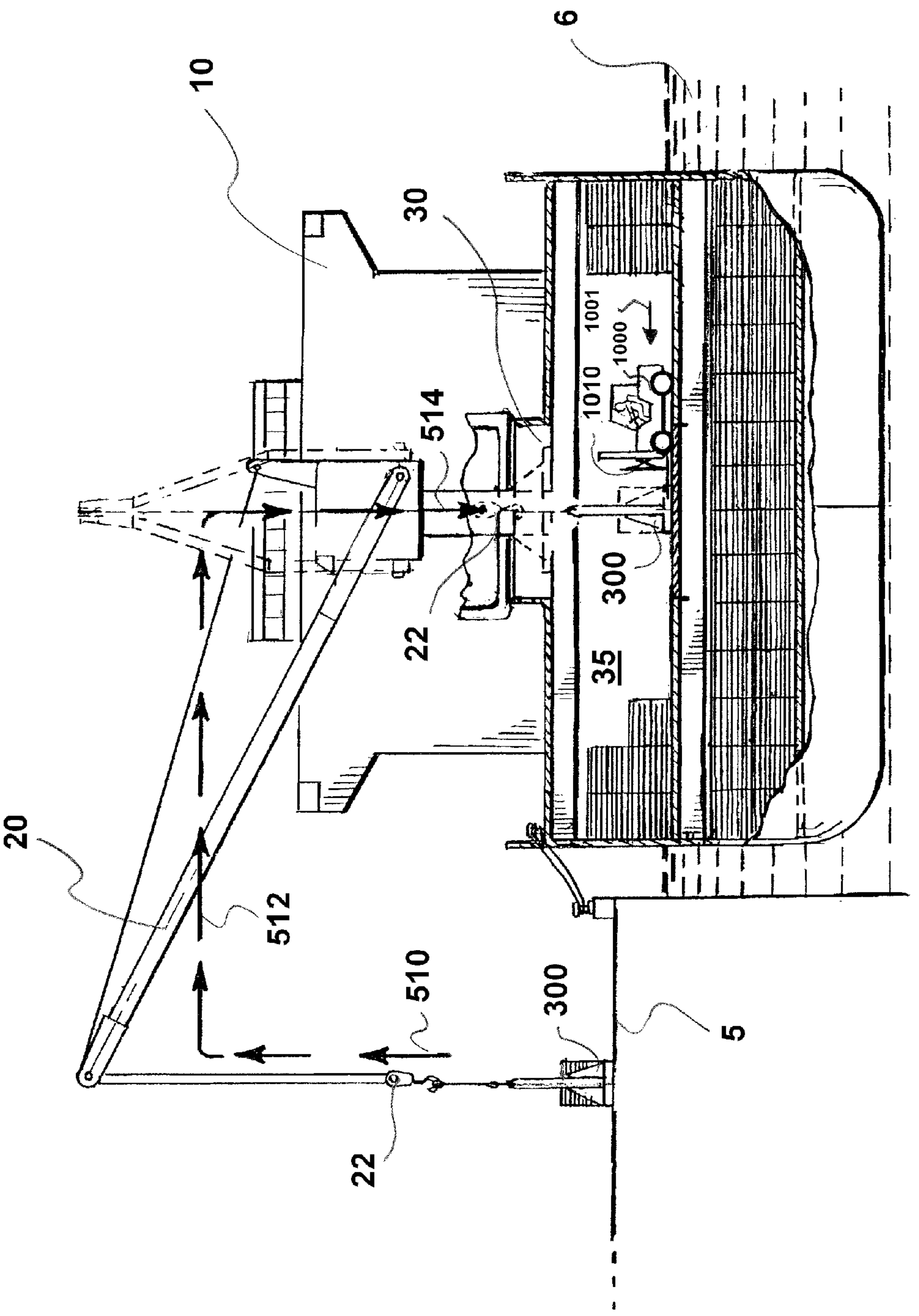
FIG. 2 is a cutaway of the ship of FIG. 1 schematically illustrating movement of a robot with stacks of cartons into the hold of the ship.

FIG. 1 schematically illustrates various steps in a method and apparatus of using rotation to depalletize which steps occur outside of a ship 10 which can include one or more holds 35. FIG. 2 schematically illustrates certain steps occurring inside the one or more holds 35. Each of the components schematically shown in FIGS. 1 and 2 will be discussed in more detail below.

FIG. 1 illustrates part of one embodiment of the process (occurring outside of the holds 35 of ship 10) using multiple lifting robots (300, 300', 300", 300'") and multiple lift trucks with rotators (600, 600', 600", 600'"). Rotating lift truck 600 is shown rotating two stacks 100, 100' and moving towards the loading area of loading robot 300. Rotating lift truck 600' is shown loading onto robot 300' two rotated stacks of cartons 100, 100'. Also shown is robot 300'" with two depalletized stacks of cartons being lifted by one of the ships's cranes or union purchases 20'" (in the direction of arrow 510). Robot 300" is shown with stacks of depalletized cartons being lowered into hatch 30". Also shown is empty robot 300 being lowed in the direction of arrow 520 for loading by rotating lift truck 600.

Also shown in FIG. 1 are multiple palletized stacks of cartons 950, 960, 970, 980 waiting for pick up and rotation by an appropriate rotating lift truck 600, 600', 600", and 600'". Multiple palletized stacks of cartons 950, 960, 970, 980 can be obtained from palletized stacks of cartons which had been being previously stored in cold storage warehouse 900. Alternatively, these multiple palletized stacks can be removed from trucks (either refrigerated or non-refrigerated).

FIG. 1 also shows empty pair of pallets 1110'" being ejected from lift truck 600'" (schematically indicated by arrow 562) to empty pallet stack 1100'". After lifting robot 300 (300" in FIG. 1) is loaded, lift truck 600" can pick up a new pair of palletized stacks of cartons (schematically indicated by arrow 540"), such as from multiple palletized stacks of cartons 970, for rotation and loading of lifting robot 300".

Rotation of palletized stacks and loading the rotated stacks on lifting robots is continued until all of the ship's 10 holds are loaded with depalletized stacks of cartons.

From time to time, the empty or used wooden pallets (e.g., stacks 1100", 1100'") obtained from previously rotated stacks of cartons 100, 100', can be collected and moved to a general pallet storage location for later reuse or disposal.

FIG. 1 shows a ship 10 to be loaded tied up alongside a dock 5. Ships used to transport frozen products are typically provided with refrigeration systems in their one or more holds for maintaining the holds at low temperatures such as below freezing. Ship 10 can be provided with one or more cranes or union purchases 20 for loading and unloading. The one or more cranes or union purchases 20 can be provided with cables and hooks 22 that may be extended and retracted to lift various items into a hold 35 through hatch 30 (such as loaded lifting robots 300). A deck 12 can include one or more hatches 30. Ship 10 can include a plurality of holds 35,35',35",35'", each hold being accessible through a hatch 30,30',30",30'". Multiple cranes or union purchases 20,20',20",20'" can be used to lift multiple loaded lifting robots 300,300',300",300'" from alongside ship 10 and into respective holds 35,35',35", 35'".

Below will be discussed various components of one embodiment of the method and apparatus using rotation to depalletize palletized stacks of cartons of frozen animal products.

Palletized Stacks of Cartons of Frozen Animal Products

Figure 3:
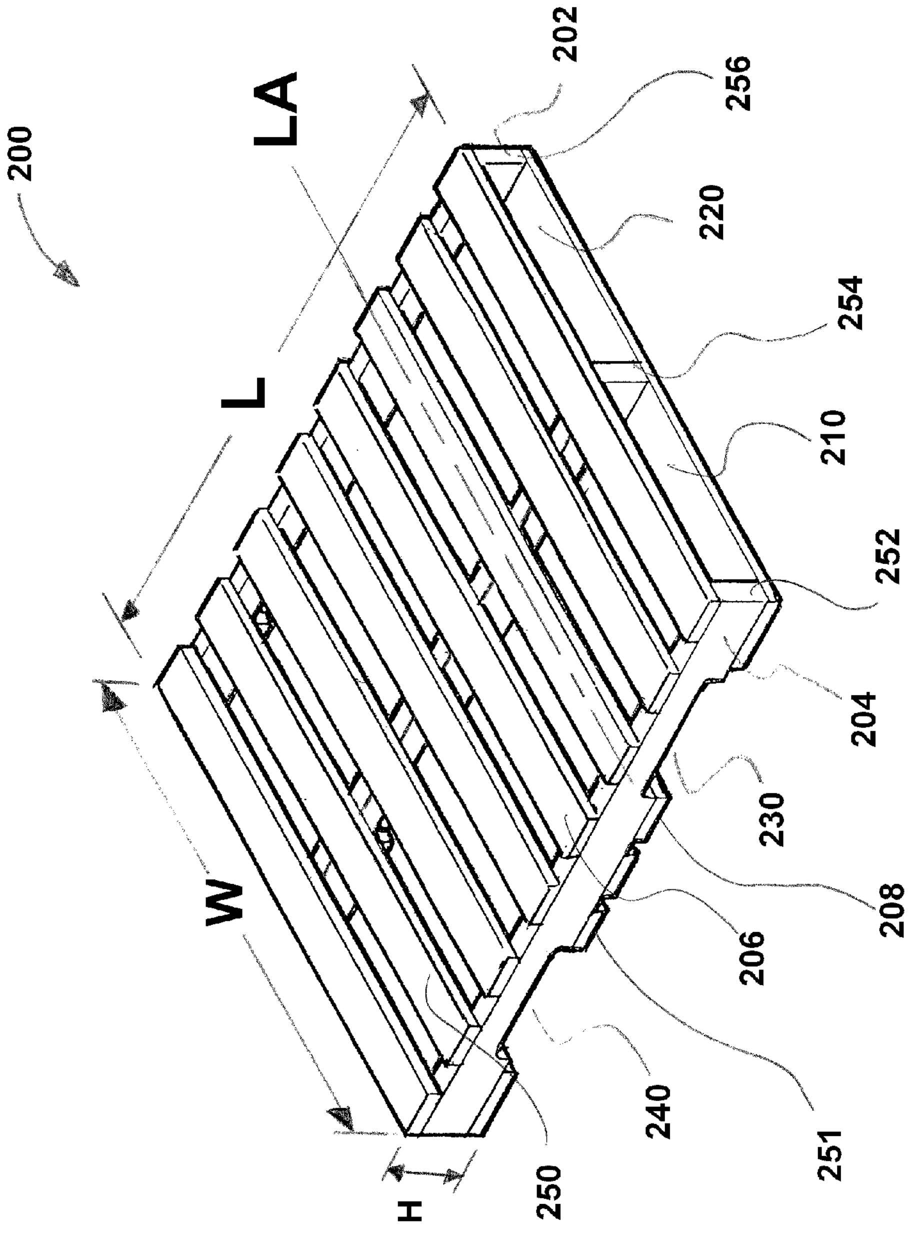
FIG. 3 is a perspective view of a wooden pallet.

FIG. 3 shows an example pallet 200 which is known in the art. Pallet 200 can include a center beam 254, which runs the length L of pallet 200, and two side beams 252,256 which similarly run the length L of pallet 200 and which are situated along opposite edges 202, 204 of pallet 200. The upper and lower surfaces 206, 208 can be formed by a plurality of slats or boards 250 which extend across the width W and which are fastened to the beams 252, 254, 256 by nails, screws or other fasteners. Openings 230, 240 can be cutout along of the lower edges of the beams 252, 254, 256. Plurality of slats 251 on bottom 208 do not cover openings 230, 240. As is well known in the art of cargo handling, a lift truck may lift pallet 200 either by inserting its fork tines or blades in the openings 210, 220, and then lifting its fork tines or blades. Pallet 200 may also be lifted by inserting its fork tines or blades through openings 230, 240 in the beams 252,254,256 and then raising the blades. Because pallet 200 can be lifting from any one of its four sides, it is commonly known as a "4-way pallet."

Figure 4:
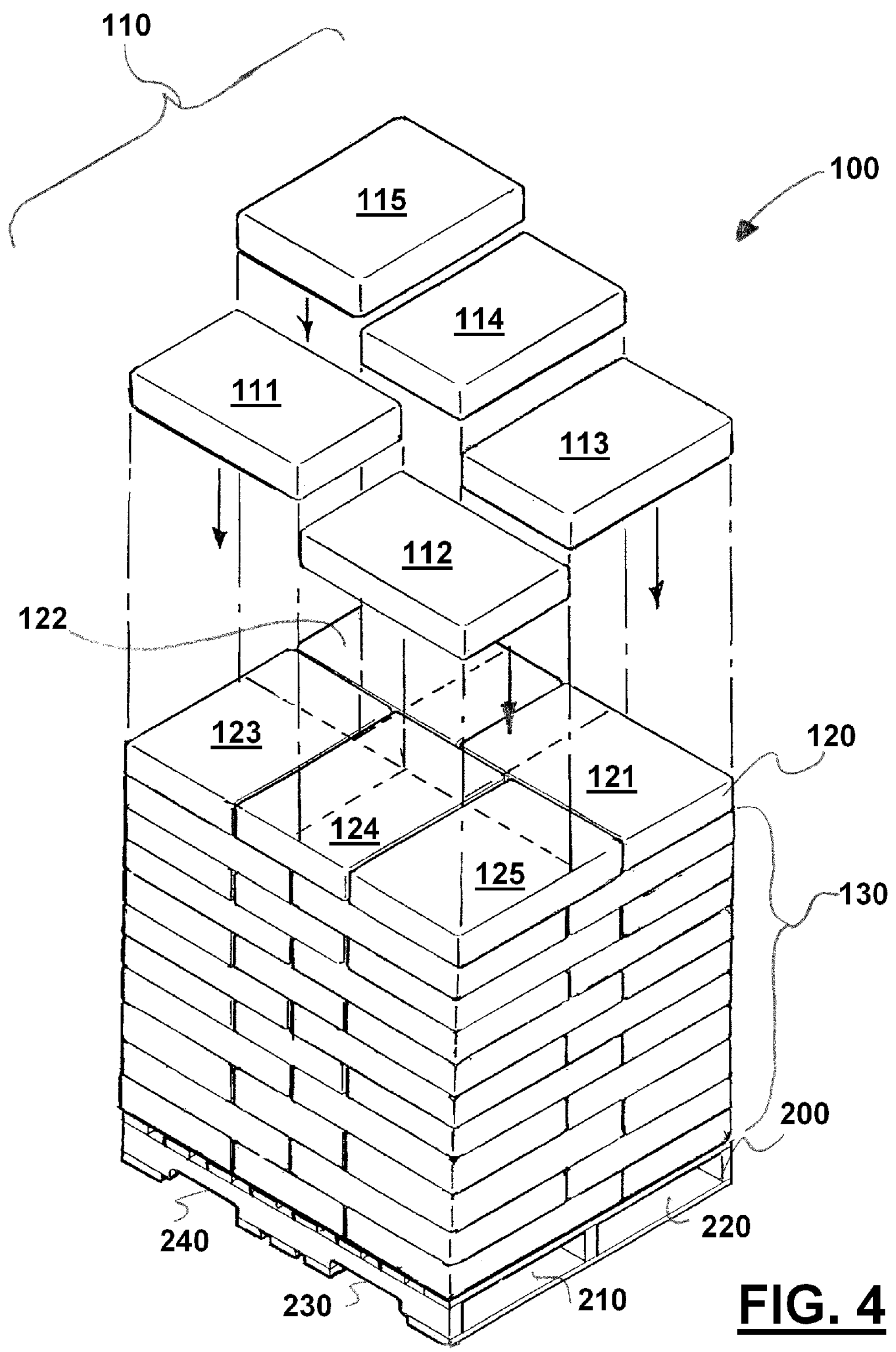
FIG. 4 is a perspective view of a palletized stack of cartons of frozen animal products illustrating an alternative stacking pattern for adjacent layers of cartons, each layer having five cartons.

A variety of cargo may be stacked on pallet 200. Such pallets 200 can be commonly used for holding and transporting stacks of cartons, including stacks of cartons of frozen animal products, such as frozen chicken parts, frozen organ meat, such as liver and kidney, or other frozen animal products. FIG. 4 shows a stack of cartons 100 arranged in a three-two carton stacking pattern commonly used for stacking cartons of frozen chicken on a standard 40 by 48 inch (102 cm by 122 cm) pallet 200. In layer 110 the three-two pattern comprises three cartons 113, 114, 115 arranged side-by-side with their long edges abutting one another, and two cartons 111, 112 arranged in end-to-end relation beside the row of the three cartons 113, 114, 115. Preferably, alternating layers of cartons are rotated ninety degrees relative to the adjoining layer. In layer 120 cartons 123, 124, 125 are under cartons 111, 112 of layer 110.

Figure 5:
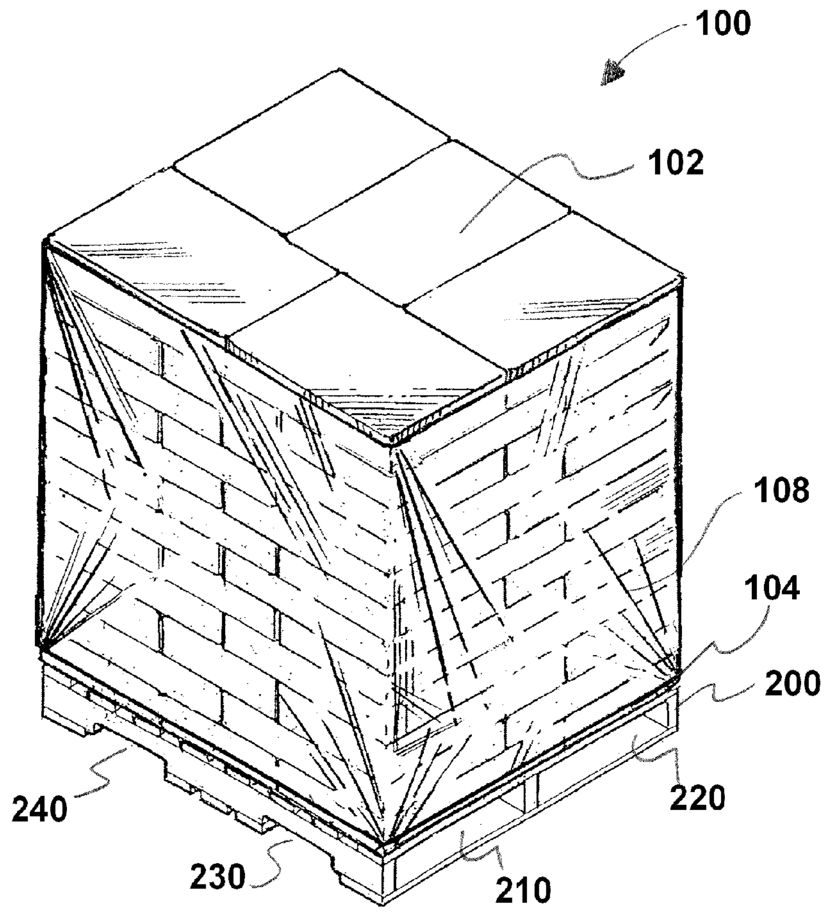
FIG. 5 is a perspective view of a palletized stack of cartons of frozen animal products having stretch or shrink wrap facilitating the handling of this stack as a unitized load.

FIG. 5 is a perspective view of a palletized stack of cartons 100 of frozen animal products having stretch or shrink wrap 108 facilitating the handling of this stack 100 as a unitized load. FIG. 5 shows shrink or stretch wrap 108 used to unitize stack of cartons 100. Preferably, shrink or stretch wrap 108 extends from near the top 102 to near the bottom 104 of stack 100. Shrink or stretch wrap 108 can resist one or more of the cartons in stack 100 from becoming dislodged and/or falling out (and/or one or more layers from falling off), along with increasing the ease of handling stack 100 during loading. Although not expressly shown every figure, it is preferred that shrink or stretch wrap be used to unitize the stacks of cartons to be rotated.

Figure 6:
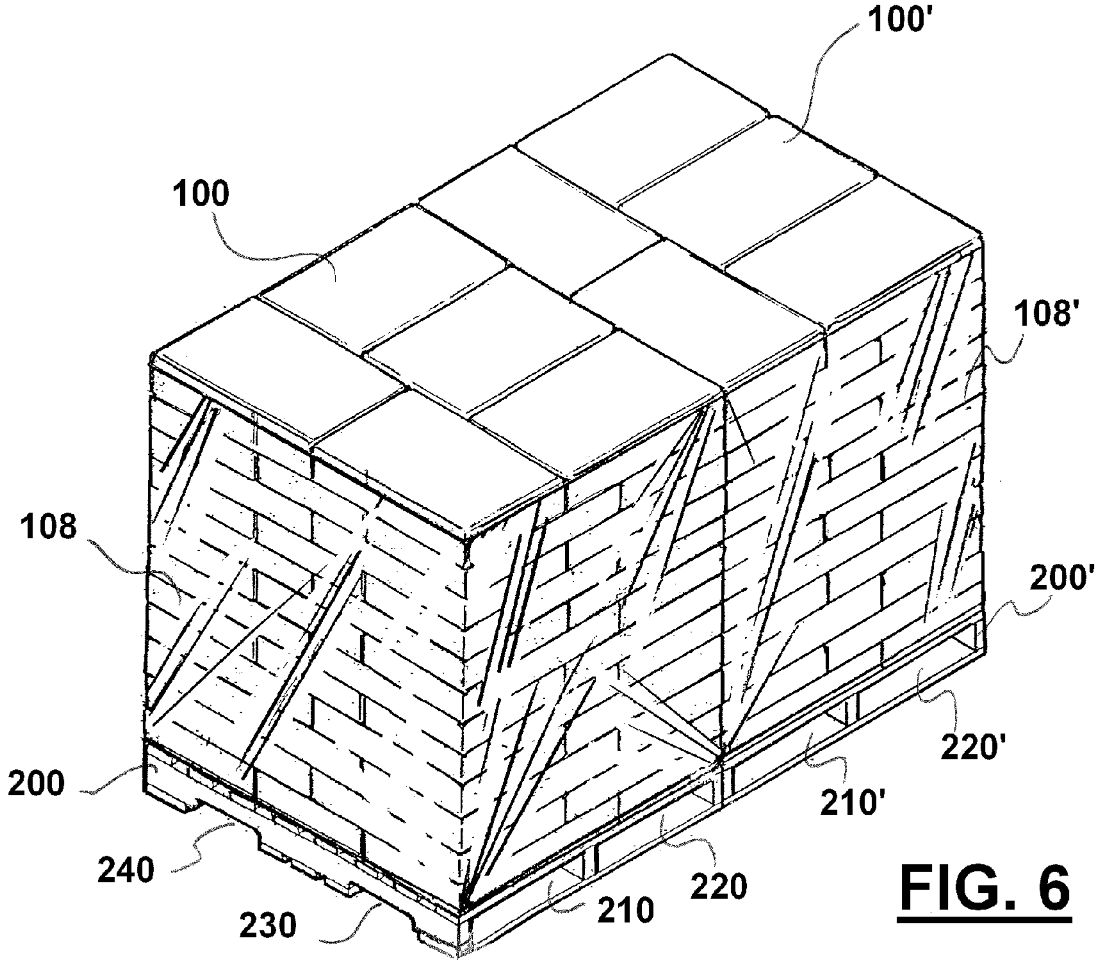
FIG. 6 is a perspective view of two palletized stacks of cartons of frozen animal products adjacent each other with each stack being stretch or shrink wrapped facilitating the handling of each stack as a unitized load.

FIG. 6 is a perspective view of two palletized stacks 100, 100' of cartons of frozen animal products adjacent each other with each stack being individually stretch or shrink wrapped 108, 108' facilitating the handling of each stack 100, 100' as a unitized load.

Figure 7:
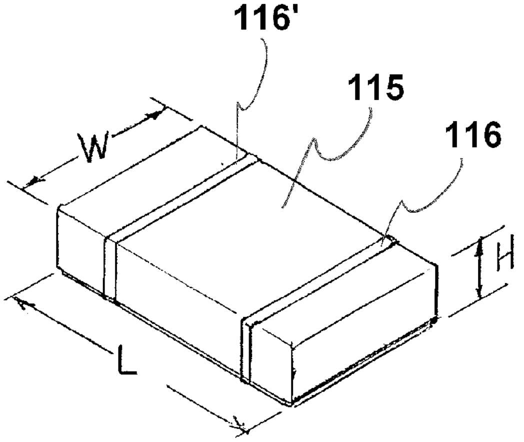
FIG. 7 is a perspective view of a single carton of frozen animal products.

FIG. 7 is a perspective view of a single carton 115 of frozen animal products. This carton 115 can include one or more retaining straps 116 to resist opening of the carton. Carton 115 can have length L, height H, and width W which are conventionally determined in the art.

Rotating Lift Truck

Lift trucks are known in the art of lift trucks. In one embodiment a rotator 700 can be added to the lift truck 600 as an attachment, the rotator attachment having four sets of opposed blades (shown in FIG. 9) with widths of about 3 to about 8 inches (10.2 to 20.3 cm). In one embodiment the lift truck can also include side shift capability.

Figure 9:
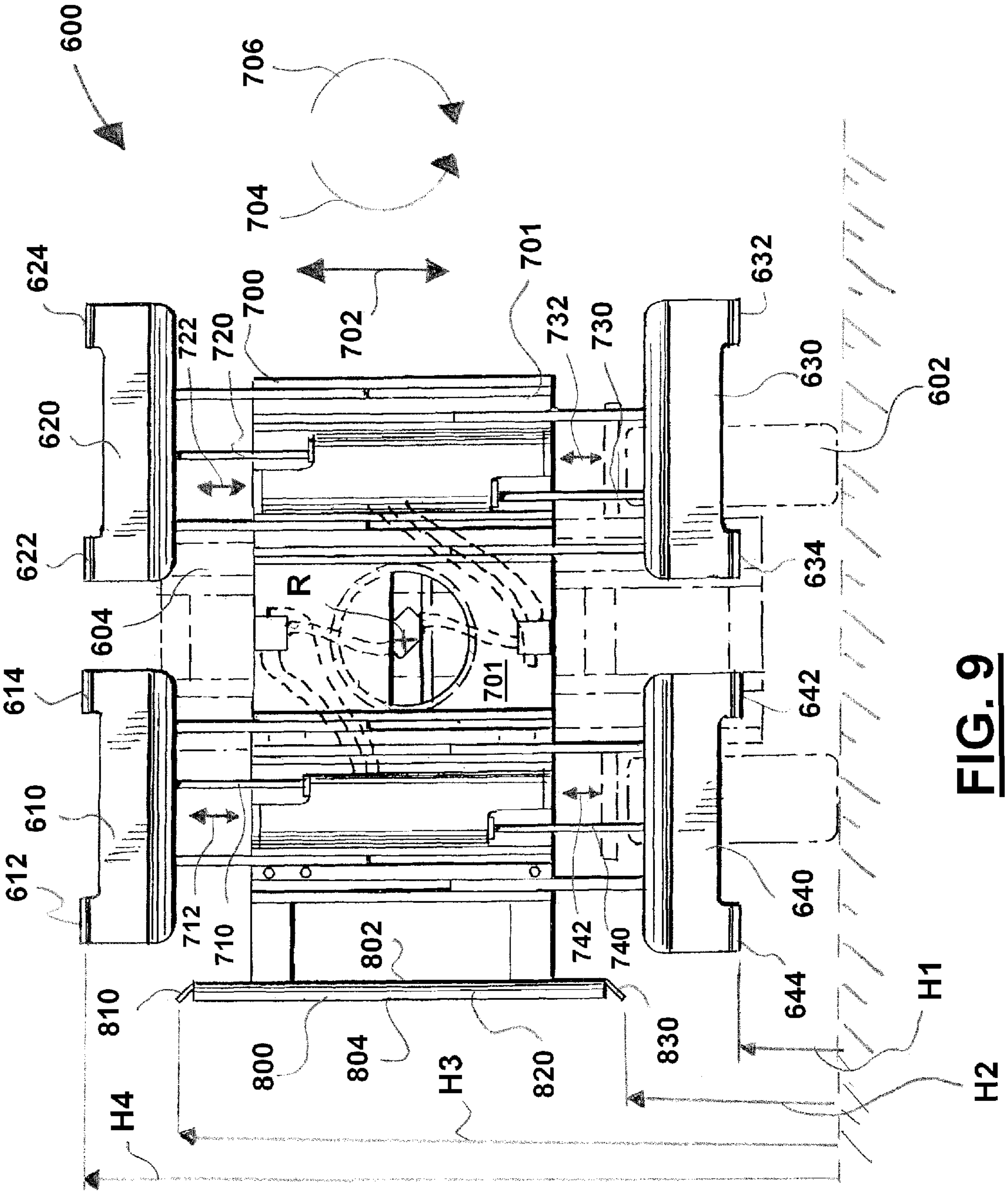
FIG. 9 is a view of a rotator which can be attached to a lift truck and used in one embodiment.

In one embodiment a rotator unit 700 is operably connected to lift truck 600. FIG. 9 is a front view of a rotator 700 which can be attached to lift truck 600 and used in various embodiments. Rotator 700 can be operably connected to lift truck 600 such that it can both rotate about a horizontal axis of rotation R, relative to lift truck 600 (in a counterclockwise and/or clockwise rotation) and move vertically (upward and/or downward) relative to the lift truck. Rotator 700 can include base 701 which is operably connected to elevator 604 of lift truck 600.

Preferably rotator 700 includes a rotation motor which can be powered by the hydraulic system of lift truck 600. Also preferably, rotator 700 is set up in a parallel hydraulic circuit compared to the other hydraulic circuits of lift truck 600. At least partially separating the hydraulic circuit of rotator 700, can isolate the relatively larger amounts of heat absorbed by the hydraulic fluid (and/or higher pressures) flowing through the hydraulic circuit powering rotator 700 (as rotator 700 can experience greater hydraulic loads than the rest of lift truck), and minimizes any special valving and other materials for the hydraulic circuits for operation of the various components of lift truck 600. In one embodiment one or more high capacity aluminum valves can be used for the rotator's 700 hydraulic circuit operably connected to lift truck's 600 hydraulic power system.

Arrows 702 schematically indicate the ability of rotator 700 (through base 701) to move vertically (upwardly and downwardly) relative to lift truck 600. Vertical movement of rotator 700 can increase or decrease H1, H2, H3, and H4. Vertical rotation can also increase or decrease H1, H2, H3, and H4. Arrow 704 schematically indicates the ability of rotator 700 through base 701 to rotate in a counterclockwise direction. Arrow 706 schematically indicates the ability of rotator 700 through base 701 to rotate in a clockwise direction.

Plurality of lower fork tines 632 and 634 can be attached to base 630. Preferably there are two fork tines, however, in an alternative embodiment, three fork tines can be used. Additionally, the middle fork tine of the three can be detachably connectable to base 630 (such as by a plurality of fasteners which threadably connect through a plurality of recessed openings). Alternatively, base 630 can be detachably connectable to rotator 700 (such as by a plurality of threaded fasteners), and a new detachably connectable base 630' having three fork tines can replace base 630. Base 630 can be operably connected to base 701 through hydraulic cylinder and piston 730. Arrows 732 schematically indicate the ability of base 630 to move in both an expanding and retracting motion relative to base 701 and the opposing base.

Plurality of lower fork tines 642 and 644 can be attached to base 640. Preferably there are two fork tines, however, in an alternative embodiment, three fork tines can be used. Additionally, the middle fork tine of the three can be detachably connected to base 640 (such as by a plurality of fasteners which threadably connect through recessed openings). Alternatively, base 640 can be detachably connectable to rotator 700 (such as by a plurality of threaded fasteners), and a new detachably connectable base 640' having three fork tines can replace base 640. Base 640 can be operably connected to base 701 through hydraulic cylinder and piston 740. Arrows 742 schematically indicate the ability of base 640 to move in both an expanding and retracting motion relative to base 701 and the opposing base.

Plurality of upper fork tines 622 and 624 attached to base 620. Preferably there are two fork tines, however, in an alternative embodiment, three fork tines can be used. Additionally, the middle fork tine of the three can be detachably connected to base 620 (such as by a plurality of fasteners which threadably connect through recessed openings). Alternatively, base 620 can be detachably connectable to rotator 700 (such as by a plurality of threaded fasteners), and a new detachably connectable base 620' having three fork tines can replace base 620. Base 620 can be operably connected to base 701 through hydraulic cylinder and piston 720. Arrows 722 schematically indicate the ability of base 620 to move in both an expanding and retracting motion relative to base 701 and the opposing base.

Plurality of upper fork tines 612 and 614 attached to base 610. Preferably there are two fork tines, however, in an alternative embodiment, three fork tines can be used. Additionally, the middle fork tine of the three can be detachably connected to base 610 (such as by a plurality of fasteners which threadably connect through recessed openings). Alternatively, base 610 can be detachably connectable to rotator 700 (such as by a plurality of threaded fasteners), and a new detachably connectable base 610' having three fork tines can replace base 610. Base 610 can be operably connected to base 701 through hydraulic cylinder and piston 710. Arrows 712 schematically indicate the ability of base 610 to move in both an expanding and retracting motion relative to base 701 and the opposing base.

In one embodiment hydraulic cylinders and pistons 730, 740, 720, and 710 each have two-way operations so that changes in the direction of hydraulic fluid flow changes the direction of movement of the individual pistons for expansion and contraction. For example, hydraulic fluid flow in a first direction causes piston 730 to expand while fluid flow in the opposite direction causes piston 730 to retract.

Rotator 700 can be set up so that lower bases 630 and 640 are independently controllable for expansion and contraction. In one embodiment hydraulic cylinder and piston 730 can be in the same hydraulic circuit as hydraulic cylinder and piston 740. Accordingly, when fluid flow is set to tend to cause piston 730 to expand, the fluid flow is also set to tend to cause piston 740 to expand (and similarly when fluid flow tends to cause piston 730 to retract, fluid flow also tends to cause piston 740 to retract). In this way bases 630 and 640 (and their fork tines) tend to expand and contract together (contraction can cause a clamping effect). Alternatively, base 630 can be attached to base 640 so that the bases will necessarily expand and retract together. However, not attaching the bases together allows the bases 630 and 640 to retract on items of different sizes (such as palletized stacks cartons of different heights as will be described below). Expansion for different sizes is also possible.

Rotator 700 can be set up so that upper bases 610 and 620 are independently controllable for expansion and contraction. In one embodiment hydraulic cylinder and piston 710 is in the same hydraulic circuit as hydraulic cylinder and piston 720. Accordingly, when fluid flow is set to tend to cause piston 710 to expand, the fluid flow is also set to tend to cause piston 720 to expand (and similarly when fluid flow tends to cause piston 710 to retract, fluid flow also tends to cause piston 720 to retract). In this way bases 610 and 620 (and their fork tines) tend to expand and contract together. Alternatively, base 610 can be attached to base 620 so that the bases will necessarily expand and retract together. However, not attaching the bases together, allows the bases 610 and 60 to retract on items of different sizes (such as palletized stacks of cartons of different heights as will be described below). Expansion for different sizes is also possible.

The hydraulic cylinders and pistons allow upper and/or lower pairs of bases and their fork tines, when contracted, to clamp down on a stack of cartons, such as during rotation. On the other hand, expansion of the hydraulic cylinders and pistons can release the clamping effect.

Support plate 800 can be attached to base 701 where support plate 800 moves with base 701 (either vertically and/or rotationally). Support plate 800 can serve as a side support during the rotation of the stacks of cartons resisting the tendency of the stacks (and/or individual cartons in a stack) to slide out when they are being rotated, and reducing the amount of clamping pressure required by the upper and lower sets of fork tines during a rotation cycle. Theoretically, clamping pressure between the upper and lower sets of fork tines could resist the tendency of the stacks to slide out. However, the cartons of frozen animal products do not have large compressive strengths and excessive clamping forces can damage the cartons. Support plate 800 can include inside surface 802 and outside surface 804. Support plate 800 can include a plurality of openings to reduce the overall weight of support plate (where the openings are preferably less than the smallest dimension of any carton). Support plate 800 can include upper guide member 810 which can be an angled surface (whose function will be described in more detail below). Support plate 800 can include lower guide member 830 which can be an angled surface (whose function will be described in more detail below). Support plate 800 can include forward guide member 820 which can be an angled surface (whose function will be described in more detail below).

Preferably, the depalletizing rotation cycles of rotator 700 are set up where counterclockwise rotation occurs for about 180 degrees around a horizontal axis of rotation R for a first rotating cycle, and then clockwise rotation occurs around a horizontal axis of rotation R for about 180 degrees for then next rotating depalletizing cycle. That is, each rotation cycle is about 180 degrees and in opposite rotating directions around the horizontal axis of rotation R. For each rotation cycle, however, rotation is performed so that support plate 800 swings towards the ground surface thereby providing side support for the stacks of cartons being rotated. By alternating the direction of succeeding rotation cycles one avoids the need to reset rotator 700 so that support plate 800 sweeps under the stack of cartons each time. The horizontal axis of rotation R may be at different vertical elevations depending on the height of rotator 700 at the start, finish, and during rotation cycles.

Preferably, rotator 700 includes rotation stops restricting the amount or number of degrees of angular rotation during any one rotation cycle and in any one angular rotation direction. Preferably, these rotation stops restrict rotation beyond about 180 degrees for any cycle of rotation. Rotation stops avoid the requirement that the lift truck operator actually determine when a rotation cycle has been completed or that the rotated stacks of cartons are actually parallel or horizontal when compared to the ground (such as before depositing the rotated stacks on a loading robot 300). Otherwise, without the rotation stops in many rotation cycles the stacks of cartons after rotation may not be parallel to the ground and cause damage when the operator attempts to deposit these stacks on a lifting robot 300 (in an askew relationship). Rotation stops can avoid much “operator error” during rotation cycles and ensure a proper alignment between the rotated stacks and any decks upon which the stacks will be deposited.

In an alternative embodiment 360 degrees or more can be used for rotation cycles during depalletization.

Preferably, maximum hydraulic pressures are set for rotator 700 so that only a selected maximum compression force can be applied by any one pair of fork tines (612 and 614, 622 and 624, 632 and 634, and/or 612 and 614). This safety pressure limit can minimize possible damage caused by excessive compressive (or squeezing) forces placed on the stack of cartons being rotated, moved, and/or lifted (and thus avoiding possible damage by compressive failure of the cartons).

The speed of depalletization by rotating (and loading) may be increased by using lift truck 600 having two or more opposing paired sets of upper and lower fork tines, where the rotator is capable of lifting and rotating two or more stacks of cartons 100, 100' and pallets at a time. Lift truck 600 can pick up two stacks 100, 100', rotate them 180 degrees for depalletization, and subsequently deposit the two stacks 100, 100' simultaneously onto lifting robot 300 (e.g., simultaneously load lifting robot 300 with the two stacks rotated 180 degrees).

Lifting mechanism 604 of lift truck 600 could be equipped with a side shift mechanism that moves the outer pairs of blades laterally in unison, and may also be provided with a shifter mechanism that permits the two or more pairs of forks to be moved respectively to the right and left away from (or towards) each other. The side shift mechanism could be of assistance in positioning the two or more stacks 100, 100' laterally with respect to robot 300.

Alternatively, upper bases 610 and 620 can omit fork tines and include a support plate to support any rotated stacks of cartons. However, when a support plate is used instead of fork tines, the rotator 700 should also include a load push mechanism which can push off the depalletized stacks of cartons (depalletized from rotation) from the rotator to lifting robot 300. One disadvantage of this embodiment with replacing the opposing fork tines with a support plate, is the additional power (and capacity) required for powering both the rotator 700 and the load push mechanism. Additionally, this embodiment would increase the overall size of the rotator causing the stacks of cartons to be supported at a greater longitudinal distance from the elevator (both caused by the addition of the load push mechanism) both of which are expected to increase the size of the lift truck. Additionally, this embodiment suffers from the disadvantage of the additional time required to actually push off the depalletized stacks of cartons from the support plate to the robot. Additionally, this embodiment suffers from possible damage to cartons caused by pushing the depalletized stacks of cartons off of the support plate onto the robot (even though such damage is expected to be substantially lower than actually sliding the stacks of cartons off of the original supporting pallets). Additionally, this embodiment suffers from the disadvantage of, after each rotation cycle, having to reposition rotator 700 so that support plate is rotated back in an upward position and the fork tines are rotated back in a downward position. With upper and lower sets of fork tines, no resetting of the position of the upper and lower sets between rotation cycles is required as the upper set of fork tines in the first cycle serve as the lower set of fork tines in the second cycle (and vice versa for the next rotation cycle).

Lifting Robot or Lifting Tray

Figure 10A:
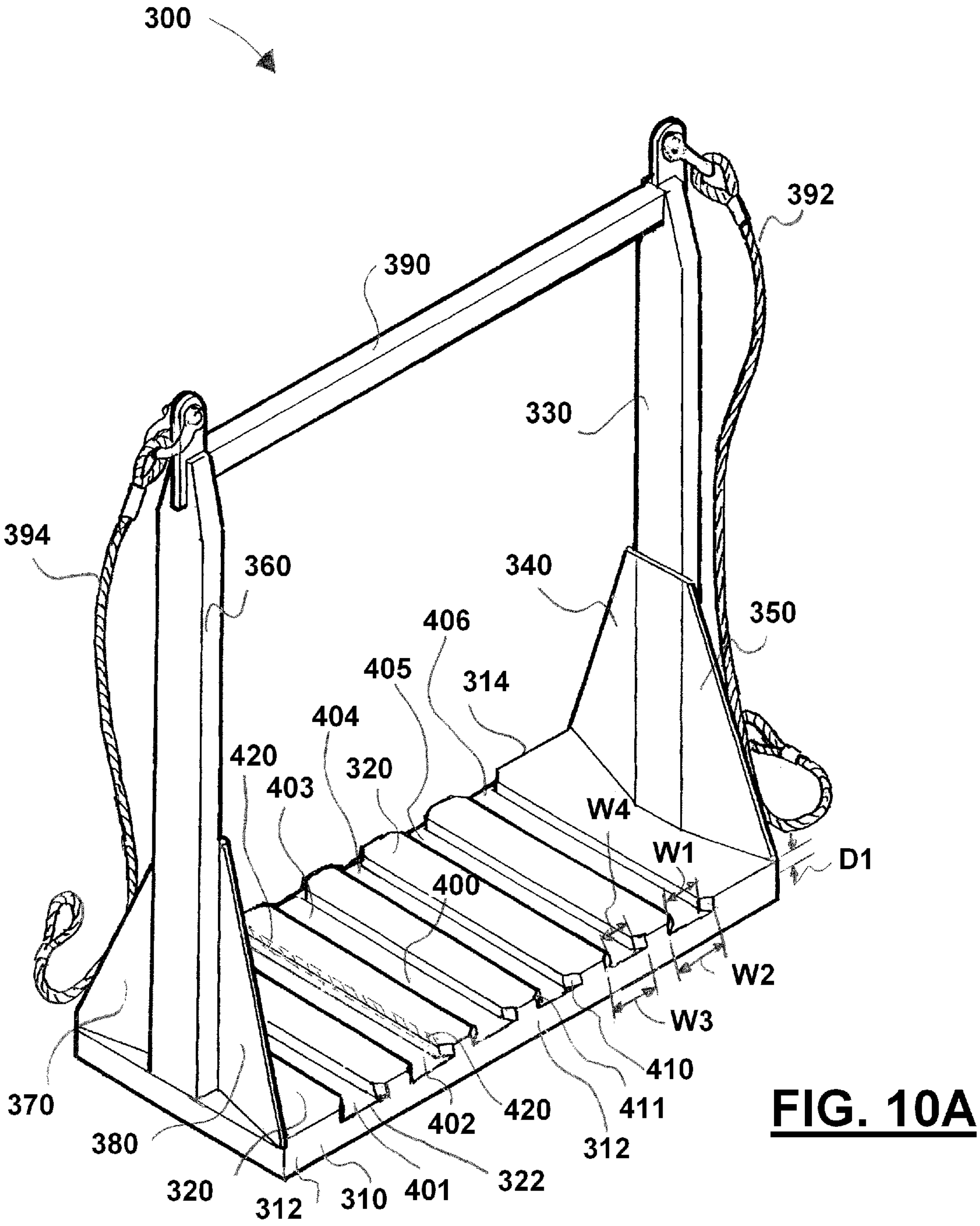
FIGS. 10A and 10B are perspective views of a lifting robot which can be used in one embodiment.
Figure 10B:
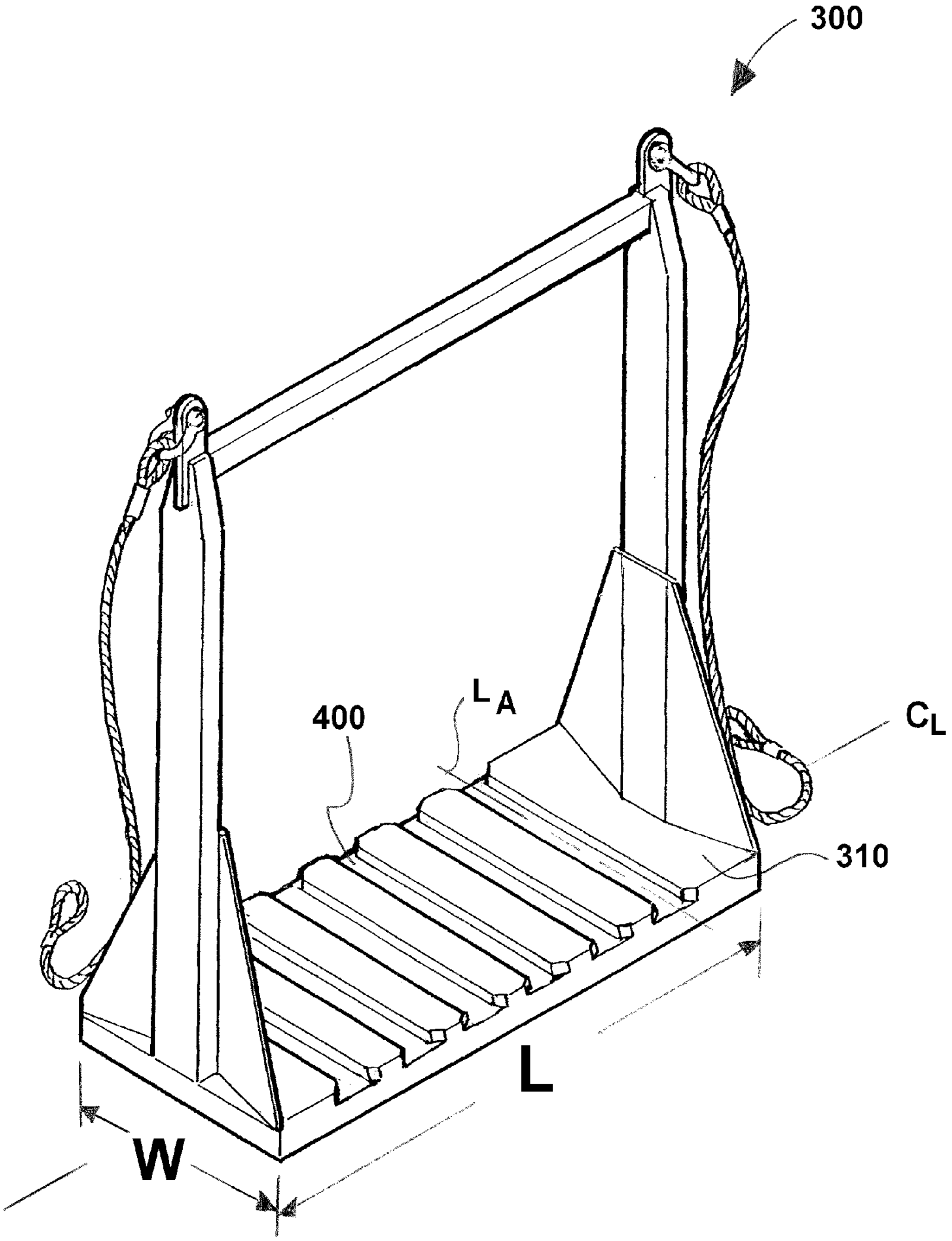

FIGS. 10A and 10B are perspective views of lifting robot or tray 300 which can be used in one embodiment. Lifting robot 300 can include base or deck 310 and plurality of arms 330, 360. Base or deck 310 can include top 320 and lower surface 322. Base or deck 310 can have a length L and width W, where L is greater than W and causing a longitudinal axis to be parallel to center line CL.

Base 310 can include plurality of fork channels or fork openings 400 for receiving the fork tines of various lift trucks or load push lift trucks. Preferably, base 310 includes fork channels or fork openings 401, 402, 403, 404, 405, and 406. Lower surface 322 can form the lower surfaces of the plurality of fork channels or fork openings 400. Plurality of fork channels or fork openings 400 can include a plurality of longitudinal axes which are substantially perpendicular to the longitudinal axis of base or deck 310.

Base 310 and plurality of arms 330, 360 can be structurally reinforced (such as by bottom braces or cross bracing). Preferably, top brace 390 is used to minimize any lateral loading on one or more of the plurality of arms 330,360 when lifting robot 300. Robot 300 can also include lifting cables 392, 394.

Also preferably robot 300 includes a plurality of robot positioning guides 350 and/or 380, and/or 340 and/or 370 which facilitate proper positioning of robot during the depositing of at least one stack of depalletized cartons (e.g., 100, 100'). These positioning guides can reduce the need to reposition lift truck 600 in relation to robot 300 when lift truck 600 is attempting to line up its fork tines in the fork channels to deposit at least one stack of depalletized cartons.

To facilitate proper positioning between robot 300 and lift truck 600 during loading, robot 300 may be slidable relative to the ground or dock 5. If desired, lift truck 600 can be used to rotate and/or move robot 300 during the process of depositing the depalletized stacks of cartons of frozen animal products. Slidable can include mere friction between the bottom of the robot and the ground surface (which, for example, can be concrete, asphalt, gravel, shells, or dirt). Alternatively, a backstop (not shown) can be provided to resist movement of robot 300 by lift truck 600. The backstop should be capable of engaging the base of robot 300 to prevent its sliding As will be described below, plurality of fork channels or fork openings 400 facilitate the easy depositing and/or lifting of at least one stack of depalletized cartons (e.g., 100, 100') without the need to push off the stacks of cartons and/or scrape off the depalletized cartons. This can be accomplished by plurality of fork channels or fork openings accepting the fork tines which (a) are loading stacks of cartons onto lifting robot 300 or (b) removing stacks of cartons from lifting robot 300.

Fork channels or fork openings 400 should be of sufficient depth that the forks tines of a lift truck can be inserted under a stack of cartons, when the stack of cartons are directly supported by base 310, and must be of sufficient width to receive such blades. In one embodiment fork channels or fork openings 400 should be of sufficient depth that the forks tines of a lift truck can be vertically separated from a stack of cartons, when the stack of cartons are directly supported by base 310.

In one embodiment one or more of the plurality of fork channels or fork openings 400 can include vertical positioning guides (e.g., bevel 420) and/or horizontal positioning guides (e.g., bevels 410, 411). With vertical positioning guides small misalignments between the fork tines and the fork channels can be automatically corrected by relative vertical movement between the fork tines and robot 300 caused by contact between the fork tines and the vertical positioning guides. With horizontal positioning guides small misalignments between the fork tines and the fork channels can be automatically corrected by relative horizontal movement between the fork tines and robot 300 caused by contact between the fork tines and the horizontal positioning guides.

Depending on the capacity of the hoisting equipment, such as loading crane or union purchase 20, lifting robot 300 could be fashioned to allow for the loading of two, four, or other numbers of stacks of cartons. Further, the depth of robot 300 (i.e., distance from front 312 to rear 314) and width (i.e., distance from arm 330 to arm 360) could be extended to allow loading of two stacks of cartons, one behind the other, to provide for the lifting of four stacks of cartons in a 2 by 2 pattern, or six stacks of cartons in a 3 by 2 pattern.

Rotation To Depalletize

One embodiment of the overall method of depalletization using rotation will be described below. In this section only one example rotation cycle is discussed as multiple rotation cycles by multiple lift trucks can be performed similarly to the one described example rotation. Preferably, the angular direction of rotation is switched after each rotation cycle of 180 degrees.

Figure 11:
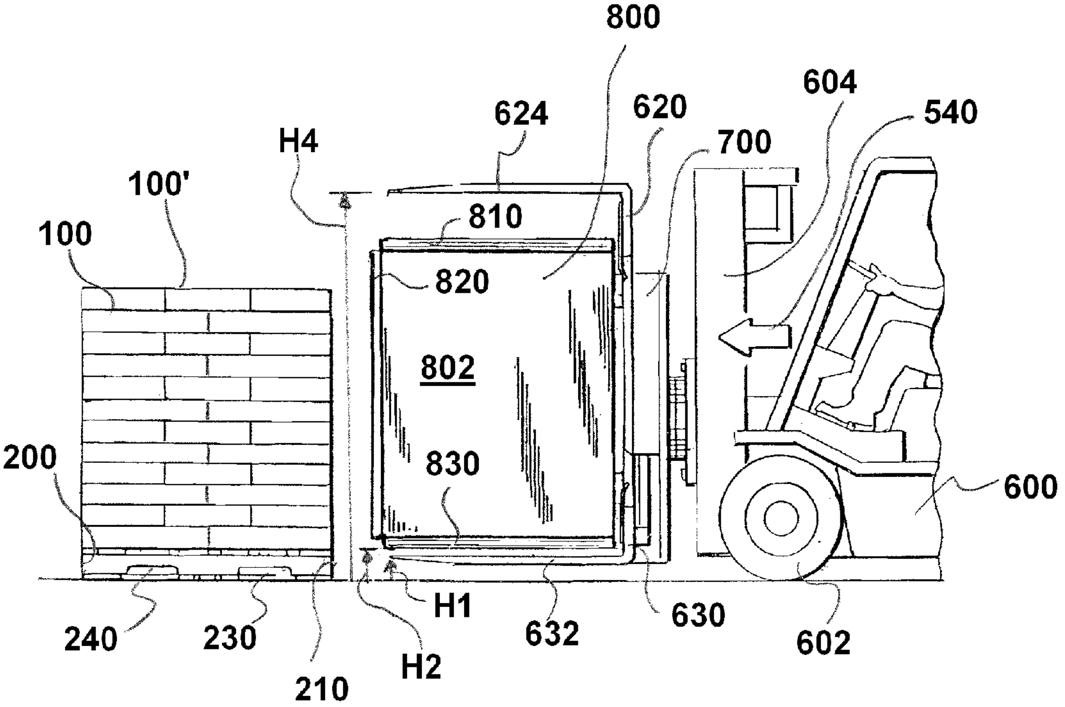
FIG. 11 shows the lift truck approach at two palletized stacks of cartons of frozen animal products.
Figure 12:
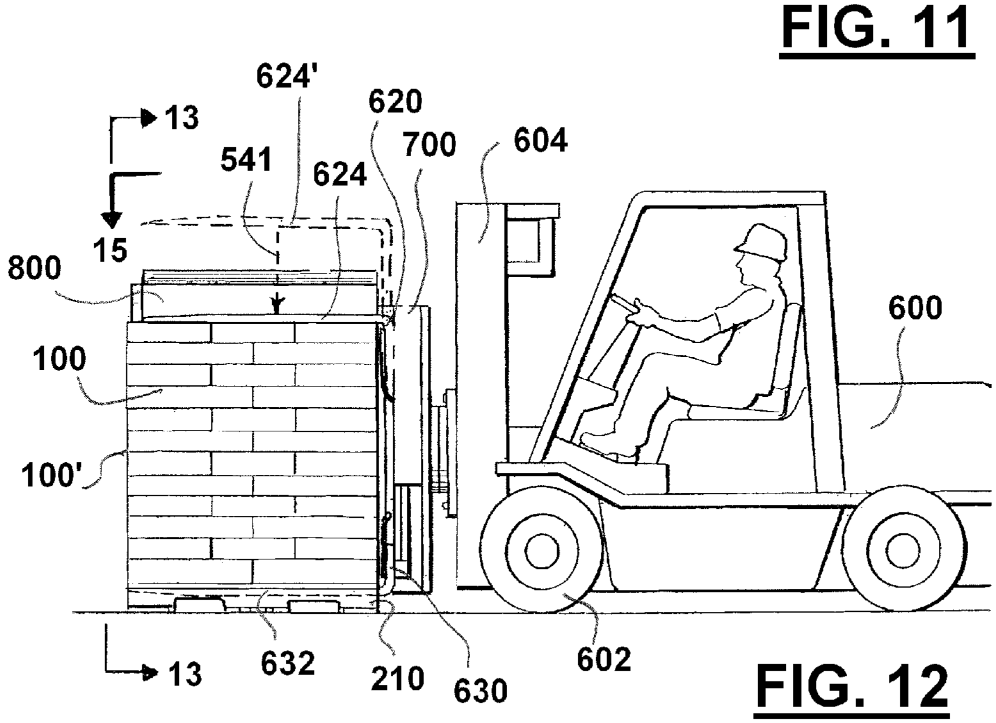
FIG. 12 shows the tines of the lift truck having entered the openings of the pallets supporting the two palletized stacks of cartons of frozen animal products and schematically indicates that the upper tines have closed or squeezed on the top of the stacks.
Figure 13:
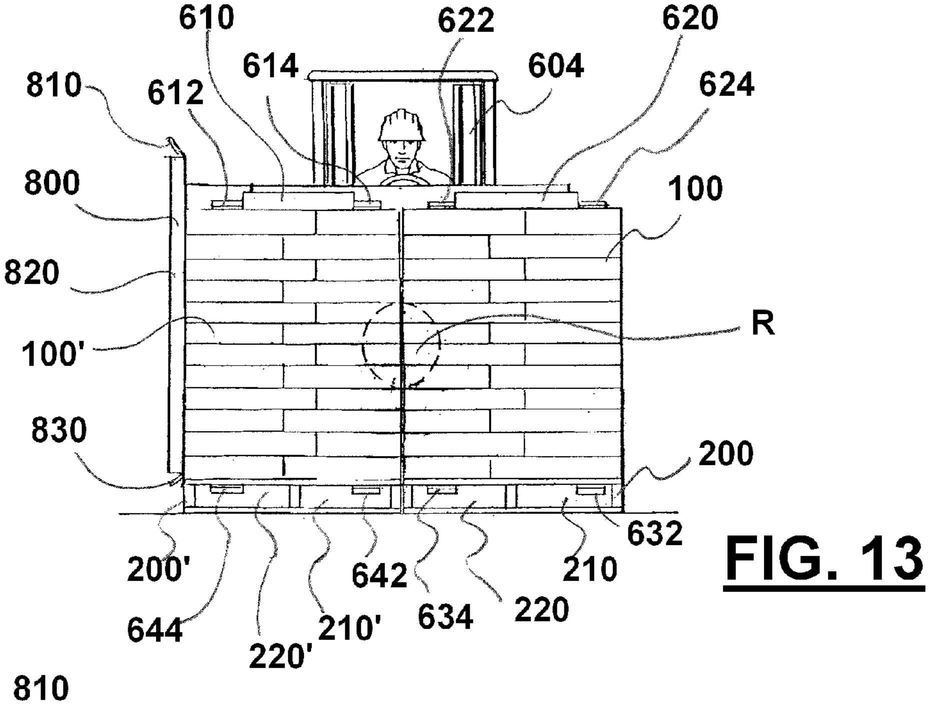
FIG. 13 is a front view of the lift truck of FIG. 12.

As shown in FIGS. 11 through 13 lift truck 600 (or side shift, lift truck) can be used to lift two pallets 200, 200' bearing stacks of cartons of frozen animal product 100, 100' by inserting blades or fork tines 632, 634, 642, 644, of lift truck 600 into openings 210, 220, 210', 220'. Pallets 200, 200' and stacks of cartons 100, 100' may then be lifted by raising the blades or fork tines of lift truck 600.

FIG. 11 shows a side view of lift truck 600 approaching two palletized stacks of cartons 100, 100' of frozen animal products. Arrow 540 schematically indicates the approach. Rotator 700 and lower pairs of fork tines 632, 634 and 642,644 can positioned (i.e., by positioning height H1) to respectively enter openings 210,220 and 210',220' of pallets 200,200'.

FIG. 12 shows the lower pair of fork tines of lift truck 600 after they have entered the openings of pallets 200,200' so that they can support the two palletized stacks 100, 100' of cartons of frozen animal products.

Figure 14:
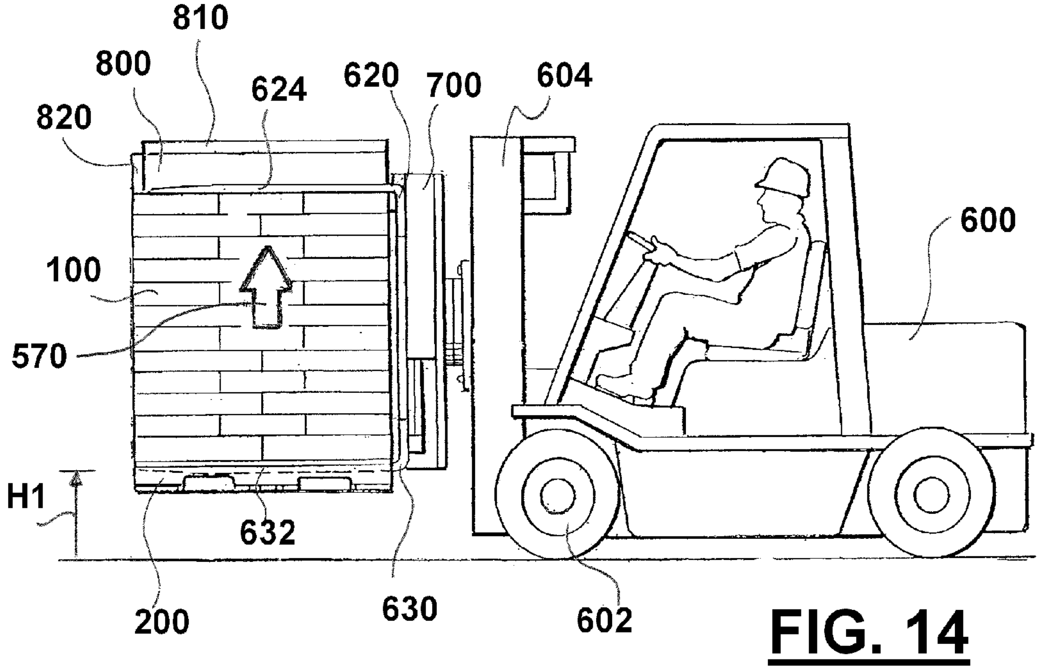
FIG. 14 shows the lift truck of FIG. 12 lifting the two palletized stacks of cartons.

Arrow 541 schematically indicates the closing in of upper pairs of fork tines 624,622 and 614,612 respectively on the tops of stacks 100, 100' (i.e., reducing the distance between H4 and H1 such as by reducing H4, increasing H1, and/or both reducing H4 and increasing H1). Palletized stacks of cartons 100, 100' can be squeezed between the upper and lower sets of pairs of fork tines. As stated below the squeezing should not be so great as to damage the cartons in the stacks of cartons. FIG. 13 is a front view of lift truck 600 after the squeezing has taken place FIG. 14 shows lift truck 600 lifting two palletized stacks of cartons 100,100' and increasing the distance H1. Elevator 604 lifts rotator 700 along with the lower pairs of fork tines 632, 634 and 642,644.

Figure 15:
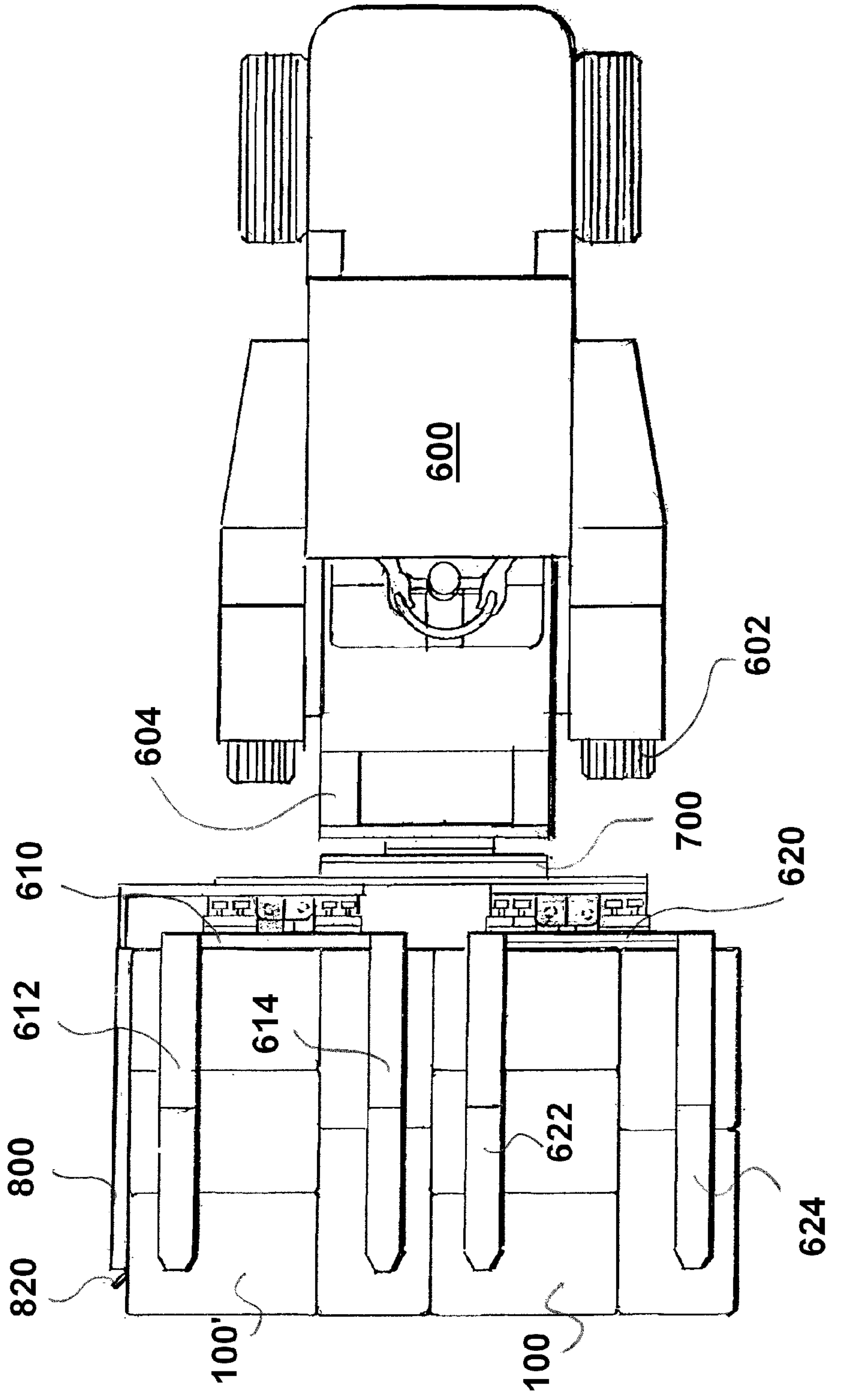
FIG. 15 is a top view of the lift truck of FIG. 12.

FIG. 15 is a top view of lift truck 600 supporting two palletized stacks of cartons 100,100'. Upper pairs of fork tines 624,622 and 614,612 are respectively in contact with the tops of stacks 100, 100'. It should be noted that the upper pairs of fork tines contact each carton in the upper layer of cartons for each stack 100,100'. This configuration can prevent the falling out of one or more cartons after rotation.

Figure 16:
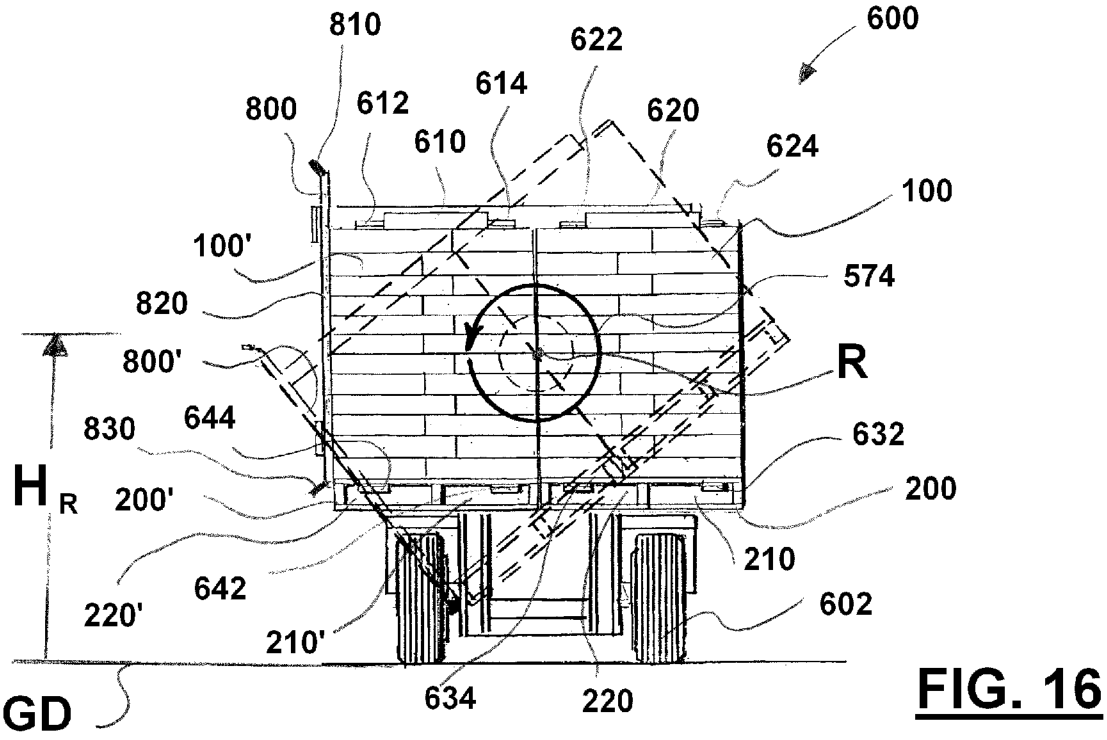
FIGS. 16 and 17 show counter clockwise rotation being used to depalletize two palletized stack of cartons.
Figure 17:
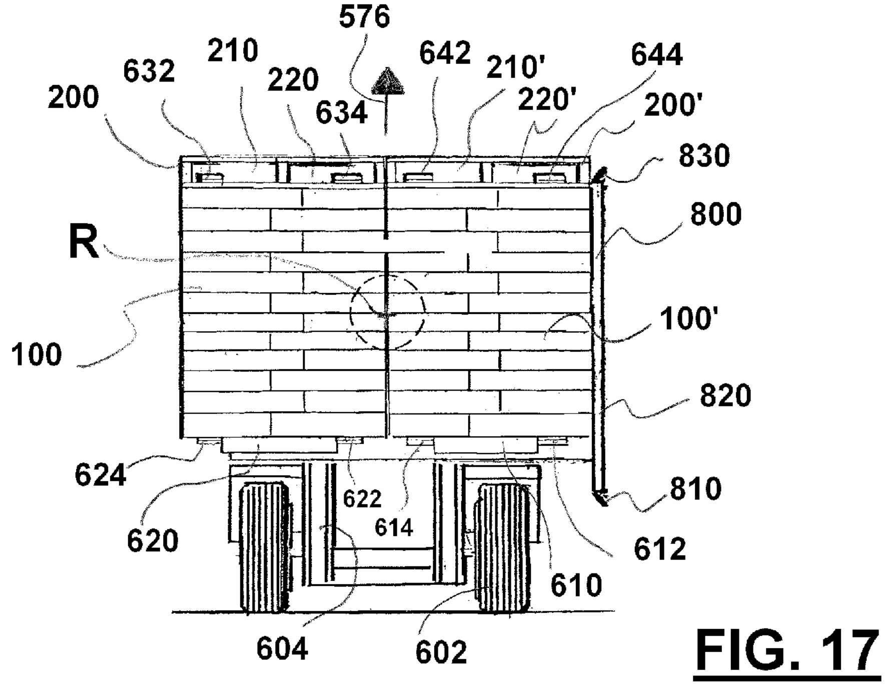

FIGS. 16 and 17 show counter clockwise rotation being used to depalletize two palletized stacks of cartons 100,100'. The height H of rotation of the two stacks of cartons is preferably such that during rotation no part of rotator 700 or stacks 100,100' will contact ground G during the rotation cycle. In a preferred embodiment a safety feature is programmed into the operation of lift truck 600 such that a minimum height H of rotation is achieved before rotation is started (to prevent operator error during rotation).

A counterclockwise rotation cycle is indicated by arrow 574. Stacks of cartons 100,100' are shown in phantom lines at 45 degrees into the rotation cycle. During the rotation cycle side plate 800 supports stacks of cartons 100,100'.

FIG. 17 shows stacks of cartons 100,100' after 180 degrees of rotation. A rotation stop could be used to automatically stop at about 180 degrees of rotation. Now pallets 200,200' are located above stacks 100,100' and stacks 100,100' are supported by pairs of fork tines 624, 622 and 614,612 (at this point being the lower pairs of fork tines). Additionally, side plate 800 is now on the right of stacks of cartons 100,100' (and preferably the next rotation cycle for depalletization will be in a clockwise direction).

After completion of the 180 degree rotation cycle, pallets 200,200' no longer support the stacks of carton, but are now over the stacks. The opposed blades or fork tines can be expanded (or only the top blades or fork tines can be expanded) so that pallets 200,200' can be spaced apart from stacks of cartons 100,100'. Arrow 576 schematically indicates that pallets 200 and 200' will be moved upwardly to space apart the pallets from stacks 100,100'. Occasionally, depending on how shrink or stretch wrap 108 was applied to one or both of the stacks 100,100' (e.g., the pallet may have also been at least partially wrapped), the shrink or stretch wrap may have to be cut. However, in most cases the pallets can be raised without resorting to the cutting of the shrink or stretch wrap. At least by the time that pallets 200 and 200' are spaced apart stacks 100, 100' can be considered depalletized. Spacing apart can be completed before stacks 100,100' are deposited on robot 300, or spacing apart completed after the pallets are loaded on robot 300.

It is noted that shrink or stretch wrap 108 is shown only in some of the figures, but apparently omitted in other figures. This was done for clarity. However, shrink or stretch wrap is preferably maintained on the stacks of cartons to help maintain and handle these individual stacks as unitized loads.

Automatic Repositioning of Displaced Cartons

Figure 18:
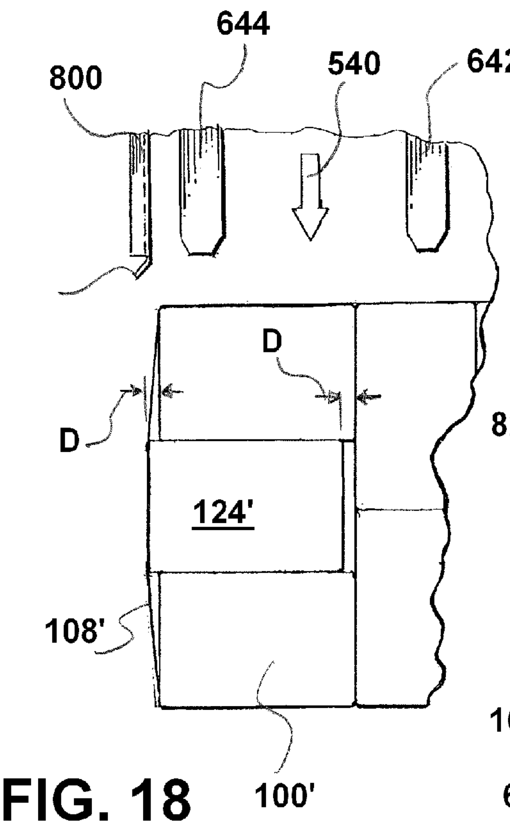
FIGS. 18 and 19 schematically show the repositioning of a carton which is out of place in a stack of cartons by relative horizontal movement between the support plate of the lift truck and the stack.
Figure 19:
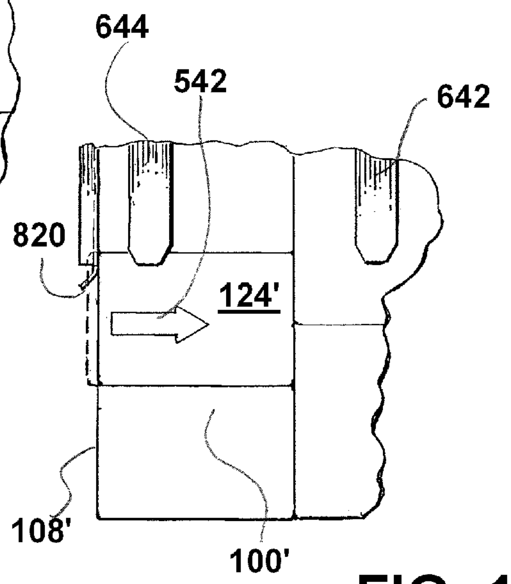

FIGS. 18 and 19 schematically show the automatic repositioning of a carton 124' which is displaced (or out of place) in a stack of cartons 100'. The automatic repositioning is caused by relative horizontal movement between support plate 800 of lift truck 600 (not shown) and the stack. D indicates the amount of displacement between carton 124' and the side of the stack 100' made by all of the other cartons which are properly aligned. Shrink or stretch wrap 108' is shown wrapped around stack 100'. As lift truck 600 (and attached side plate 800) moves in the direction of arrow 540, side plate 800 along with adjustment guide 820 will also move in the direction of arrow 540. Adjustment guide 820 can preferably be an angled (or beveled) surface which can interact with cartons without damaging the cartons. Adjustment guide will contact displaced carton 124' and, as schematically shown in FIG. 19 by arrow 542, readjust carton 124' to reduce and/or substantially eliminate displacement D. Theoretically, displaced carton 124' will also be adjusted during the rotation cycle as stacks 100,100' are rotated and carton 124' is supported by inside surface 802 of side plate 800. However, adjustment guide 820, by being angled outward, also avoids damage to displaced cartons by avoiding a knifing or cutting effect if there was no adjustment guide. Although only one displaced carton 124' is shown in FIGS. 18 and 19, adjustment guide 820 can address multiple displaced cartons when moving in the direction of arrow 540. One carton was merely shown as an example.

Figure 20:
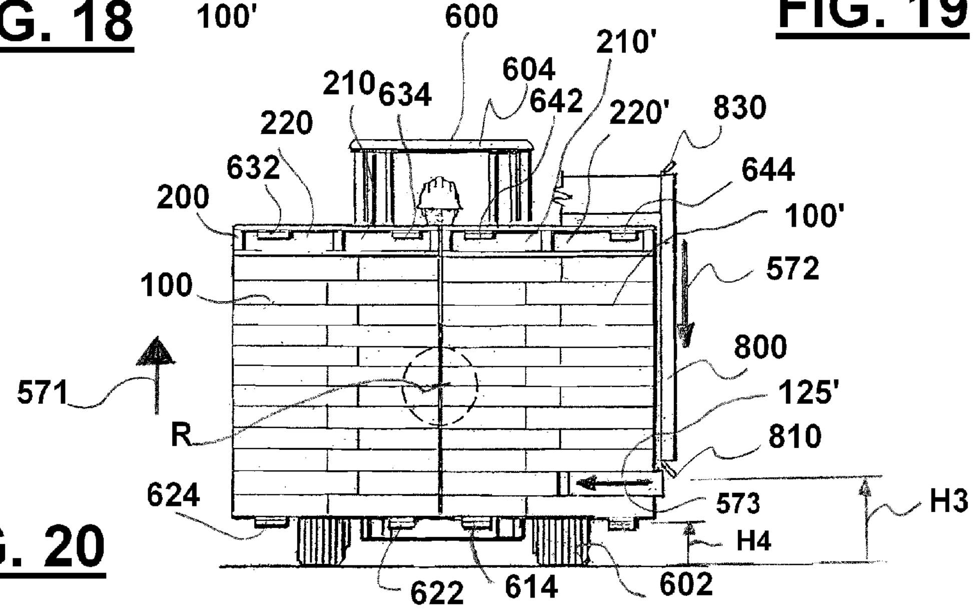
FIG. 20 schematically shows the repositioning of a carton which is out of place in a stack of cartons by vertical relative vertical movement between the support plate of the lift truck and the stack.

FIG. 20 schematically shows the repositioning of a carton 125' which is out of place in a stack of cartons 100' by relative vertical movement between side plate 800 of lift truck 600 and stack 100'. Arrow 572 schematically indicates relative vertical movement between stack 100' and side plate 800—the relative movement occurring after completing a 180 degree rotation cycle for depalletization. Arrow 573 schematically indicates automatic repositioning of displaced carton 125' into stack by increasing height H4 while maintaining constant height H3. Positioning guide 810 automatically repositions displaced carton 125' as it moves towards the displaced carton. Although only one displaced carton is shown as being repositioned multiple displaced cartons can similarly by repositioned by the relative vertical movement of side plate (and repositioning guide 810, or repositioning guide 830) in relation to the stack. Although the relative vertical movement is shown as occurring after a rotation cycle such movement could have occurred prior to the rotation cycle. Relative vertical movement between stack 100' and side plate 800 can be achieved by coordinated vertical movement of the upper and lower fork tines through the upper and lower hydraulic pistons (FIG. 9 shows these components). However, relative vertical movement between side plate 800 and stack 100' should not be necessary if side plate 800 was originally positioned such that its upper and lower guides 810 and 830 were above and below the top and bottom of stack 100'—in this case repositioning guide 820 could have repositioned any displaced carton as indicated in FIGS. 18 and 19.

Alternating Rotation Cycles To Depalletize

A second rotation cycle for depalletizing a second set of palletized stacks of cartons 100",100'" (after the depalletization by rotation described in FIGS. 11,12, and 14-17) will be described below. The steps of entering and lifting supporting pallets 200,200' are similar to those described in FIGS. 11,12 and 14,15 above, excepting rotator 700 will have been rotated 180 degrees based on the previous rotation which occurred in the earlier rotation cycle. Accordingly, in this depalletization cycle, pallets 200,200' will be lifted by pairs of fork tines 612,614 and 622,624 and rotation will occur in a clockwise direction (schematically indicated by arrow 584) so that side plate 800 can support the stacks during the rotation cycle.

Figure 22:
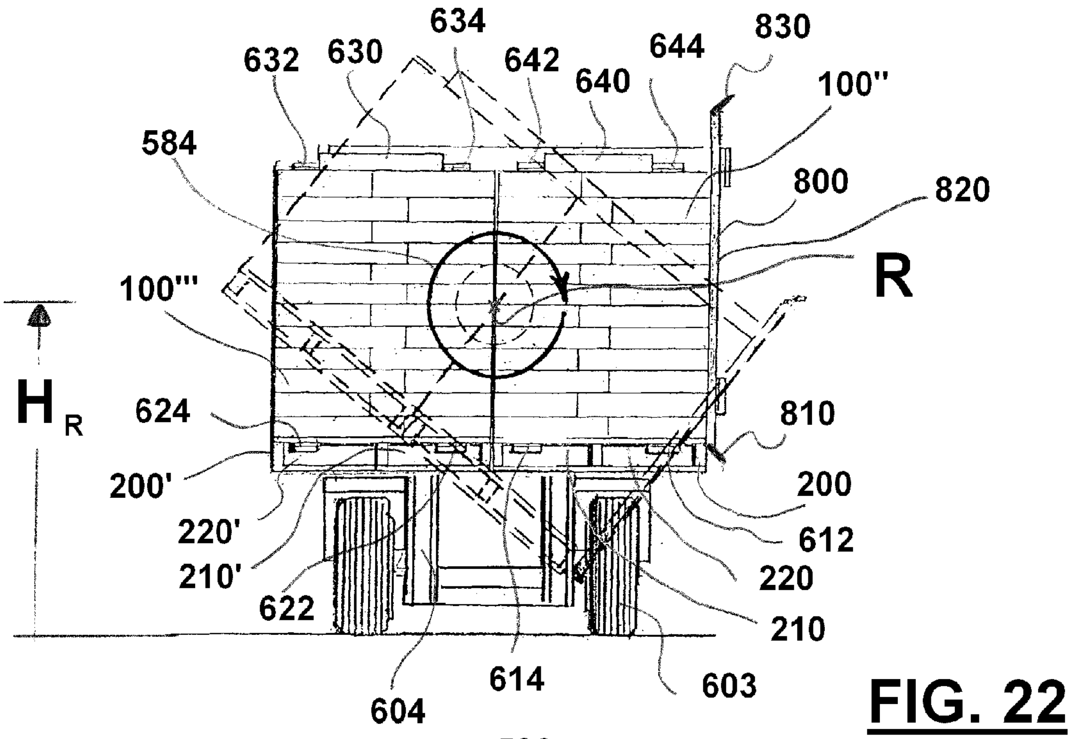
FIGS. 22 and 23 show clockwise rotation being used to depalletize two palletized stack of cartons.
Figure 23:
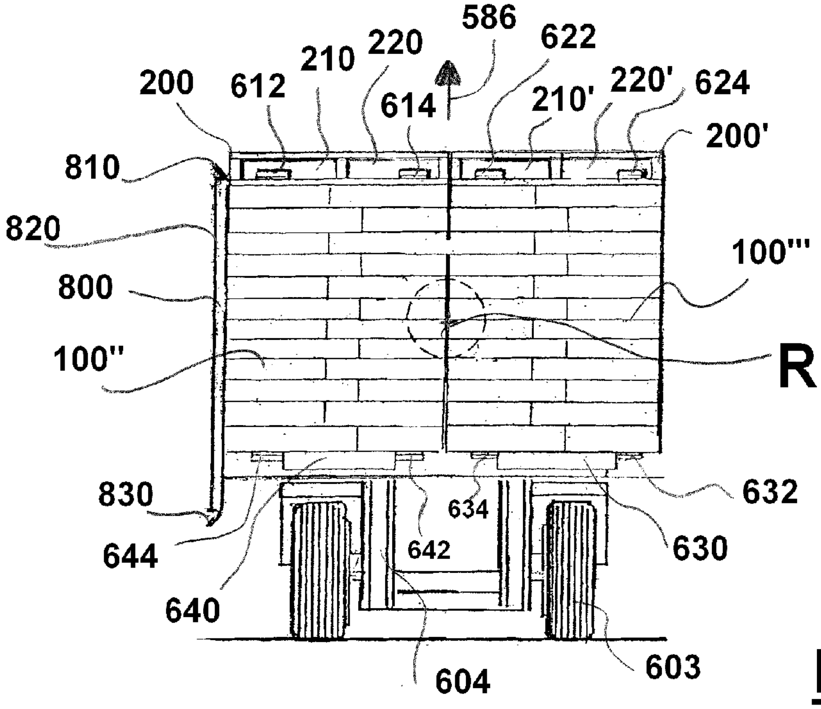

FIGS. 22 and 23 show clockwise rotation being used to depalletize two palletized stacks of cartons 100",100'". The height H of rotation of the two stacks of cartons is preferably such that during rotation no part of rotator 700 or stacks 100",100'" will contact ground G during the rotation cycle. In a preferred embodiment a safety feature is programmed into the operation of lift truck 600 such that a minimum height H of rotation is achieved before rotation is started (to prevent operator error during rotation).

A clockwise rotation cycle is indicated by arrow 584. Stacks of cartons 100",100'" are shown in phantom lines at 45 degrees into the rotation cycle. During the rotation cycle side plate 800 supports stacks of cartons 100",100'".

FIG. 23 shows stacks of cartons 100",100'" after about 180 degrees of clockwise rotation. A rotation stop could be used to automatically stop at about 180 degrees of rotation. Now pallets 200,200' are located above stacks 100",100'" and stacks 100",100'" are supported by pairs of fork tines 634, 632 and 644,642 (at this point being the lower pairs of fork tines). Additionally, side plate 800 is now on the left of stacks of cartons 100",100'" (and preferably the next rotation cycle for depalletization will be in a counter clockwise direction).

After rotation pallets 200,200' should be spaced apart from stacks of cartons 100,100'. Arrow 586 schematically indicates that pallets 200 and 200' will be moved upwardly to space apart the pallets from stacks 100,100'. Occasionally, depending on how shrink or stretch wrap 108 was applied to one or both of the stacks 100,100' (e.g., the pallet may have also been at least partially wrapped), the shrink or stretch wrap may have to be cut. However, in most cases the pallets can be raised without resorting to the cutting of the shrink or stretch wrap. At least by the time that pallets 200 and 200' are spaced apart stacks 100, 100' can be considered depalletized. Spacing apart can be completed before stacks 100,100' are deposited on robot 300, or spacing apart completed after the pallets are loaded on robot 300.

Preferably, the next depalletizing cycle will be performed by rotation in the opposite of the immediately preceding rotation cycle. In this way rotation for depalletization will be performed in opposite rotation directions in order to avoid having to reset rotator 700 to a single standardized pre-rotation configuration/setting before each rotation cycle. This ability to avoid resetting rotator 700 is believed to speed up the overall depalletization cycle by rotation and avoids an extra step in the depalletization cycle along with operator error (in the situations where the operator may have forgotten to reset rotator 700).

Rotation Cycles With Stacks of Different Heights

Because at least one set of the pairs of fork tines can move vertically relative to each other (an upper set of upper fork tines relative to the second upper set of fork tines and/or a first set of lower fork tines relative to the second set of lower fork tines) rotator 700 can rotate and depalletize stacks 100",100" of cartons having different heights. A rotation cycle for depalletizing a set of palletized stacks of cartons 100",100" having different heights will be described below.

Figure 24:
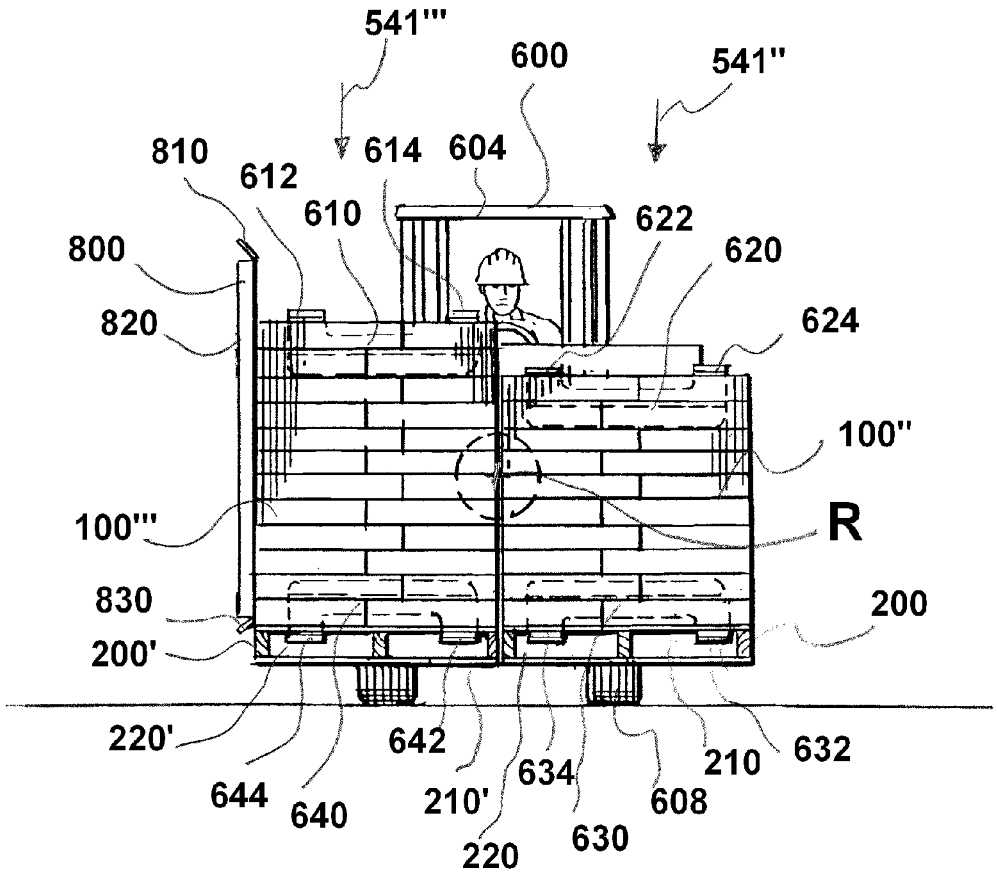
FIGS. 24 through 26 show counter clockwise rotation being used to depalletize two palletized stack of cartons where the two stacks are of differing heights.

The steps of entering and lifting supporting pallets 200, 200' are similar to those described in FIGS. 11,12 and 14,15 above, excepting pair of fork tines 622,624 will clamp down on stack 100" at a lower position than pair of fork tines 612,614. In FIG. 24, the clamping of these pairs of fork tines is schematically indicated by arrows 541" and 541'.

Figure 25:
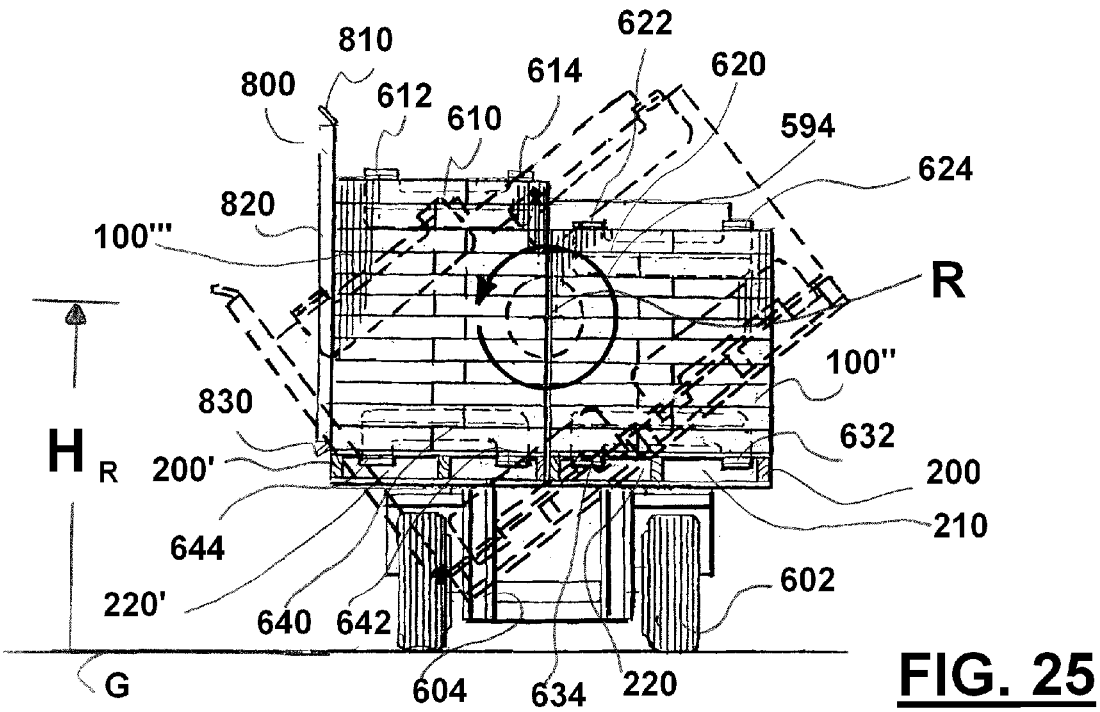
Figure 26:
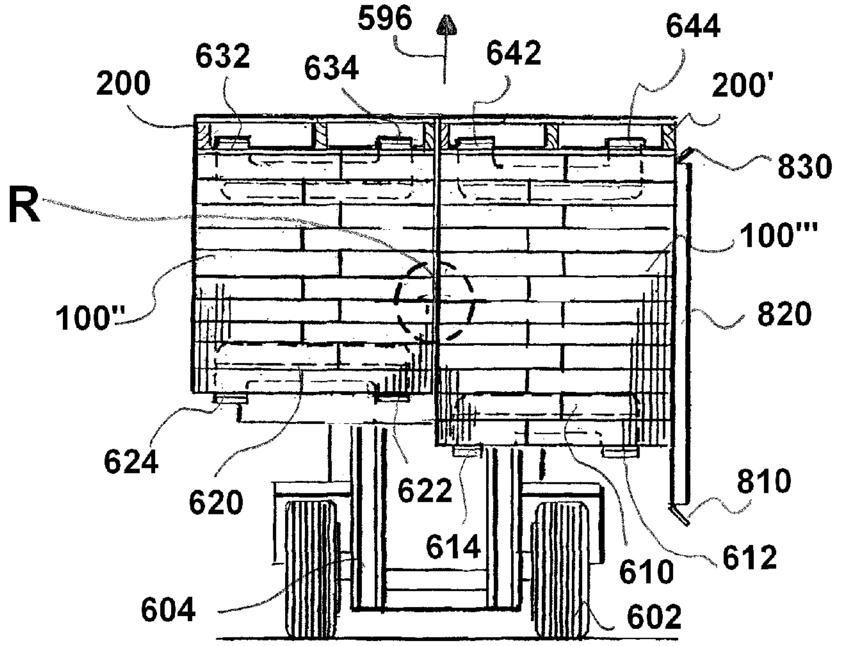

FIGS. 25 and 26 show counter clockwise rotation being used to depalletize the two palletized stacks of cartons 100", 100". The height H of rotation of the two stacks of cartons is preferably such that during rotation no part of rotator 700 or stacks 100",100'" will contact ground GD during the rotation cycle. In a preferred embodiment a safety feature is programmed into the operation of lift truck 600 such that a minimum height H is achieved before rotation is started (to prevent operator error during rotation).

A counterclockwise rotation cycle is indicated by arrow 594. Stacks of cartons 100",100'" are shown in phantom lines at 45 degrees into the rotation cycle. During the rotation cycle side plate 800 supports stacks of cartons 100",100'".

FIG. 26 shows stacks of cartons 100",100'" after 180 degrees of rotation. A rotation stop could be used to automatically stop at about 180 degrees of rotation. Now pallets 200, 200' are located above stacks 100",100'" and stacks 100", 100'" are supported by pairs of fork tines 624, 622 and 614, 612 (at this point being the lower pairs of fork tines). Additionally, side plate 800 is now on the right of stacks of cartons 100",100'" (and preferably the next rotation cycle for depalletization will be in a clockwise direction).

After rotation pallets 200,200' should be spaced apart from stacks of cartons 100",100'". Arrow 596 schematically indicates that pallets 200 and 200' will be moved upwardly to space apart the pallets from stacks 100',100'". Occasionally, depending on how shrink or stretch wrap 108 was applied to one or both of the stacks 100",100'" (e.g., the pallet may have also been at least partially wrapped), the shrink or stretch wrap may have to be cut. However, in most cases the pallets can be raised without resorting to the cutting of the shrink or stretch wrap. At least by the time that pallets 200 and 200' are spaced apart stacks 100", 100'" can be considered depalletized. Spacing apart can be completed before stacks 100,100' are deposited on robot 300, or spacing apart completed after the pallets are loaded on robot 300.

In an alternative embodiment stacks of cartons 100",100'" can be lowered relative to pallets 200,200' when the stacks are being deposited on robot 300. In an alternative embodiment pallets 200,200' can remain at a constant height while the stacks are lowered.

Before or during the deposition of stacks 100",100'" onto robot 300, stack 100" will be lowered a larger amount compared to stack 100'. This can be accomplished relatively easily because base 620 can move relative to base 610 through hydraulic cylinders and pistons 720,710. Where on the same hydraulic circuit, base 610 and base 620 will both lower until resistance is made on fork tines 612,614 (such as by contact with robot 300 in the plurality of fork openings or fork channels) and base 620 will continue to move downwardly until fork tines 622,624 enter the plurality of fork openings or fork channels 400 of robot. Lift truck 600 can then be backed out and pallets 200,200' removed, where lift truck 600 and rotator 700 are ready for the next rotation cycle.

Preferably, the next depalletizing cycle will be performed by rotation in the opposite of the immediately preceding rotation cycle. In this way rotation for depalletization will be performed in opposite rotation directions in order to avoid having to reset rotator 700 to a single standardized pre-rotation configuration/setting before each rotation cycle. This ability to avoid resetting rotator 700 is believed to speed up the overall depalletization cycle by rotation and avoids an extra step in the depalletization cycle along with operator error (in the situations where the operator may have forgotten to reset rotator 700).

7 Carton Layers

Figure 8:
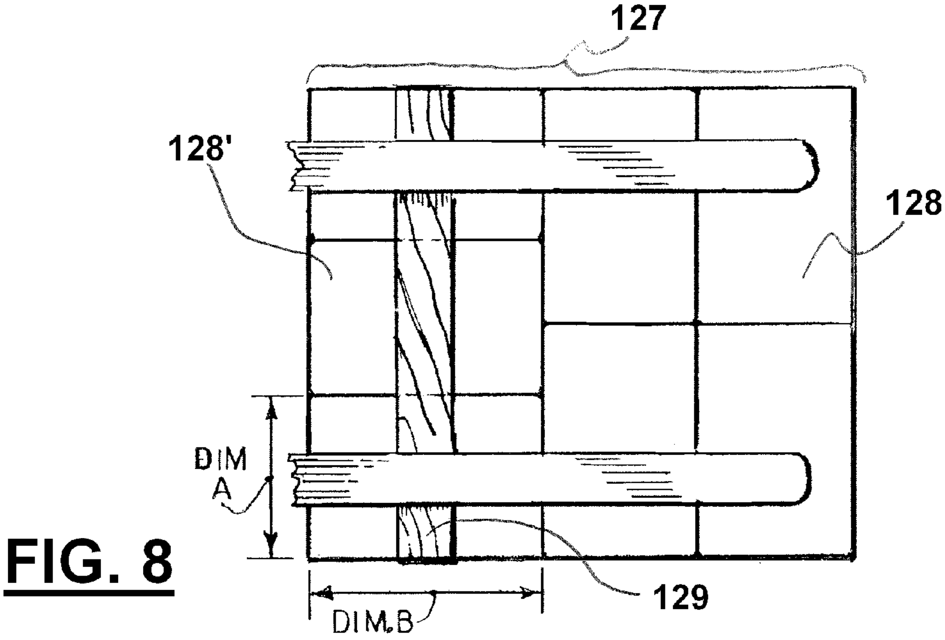
FIG. 8 is a top view of an alternative seven carton layer with a board extending between fork tines to resist dropping of one of the cartons.
Figure 21:
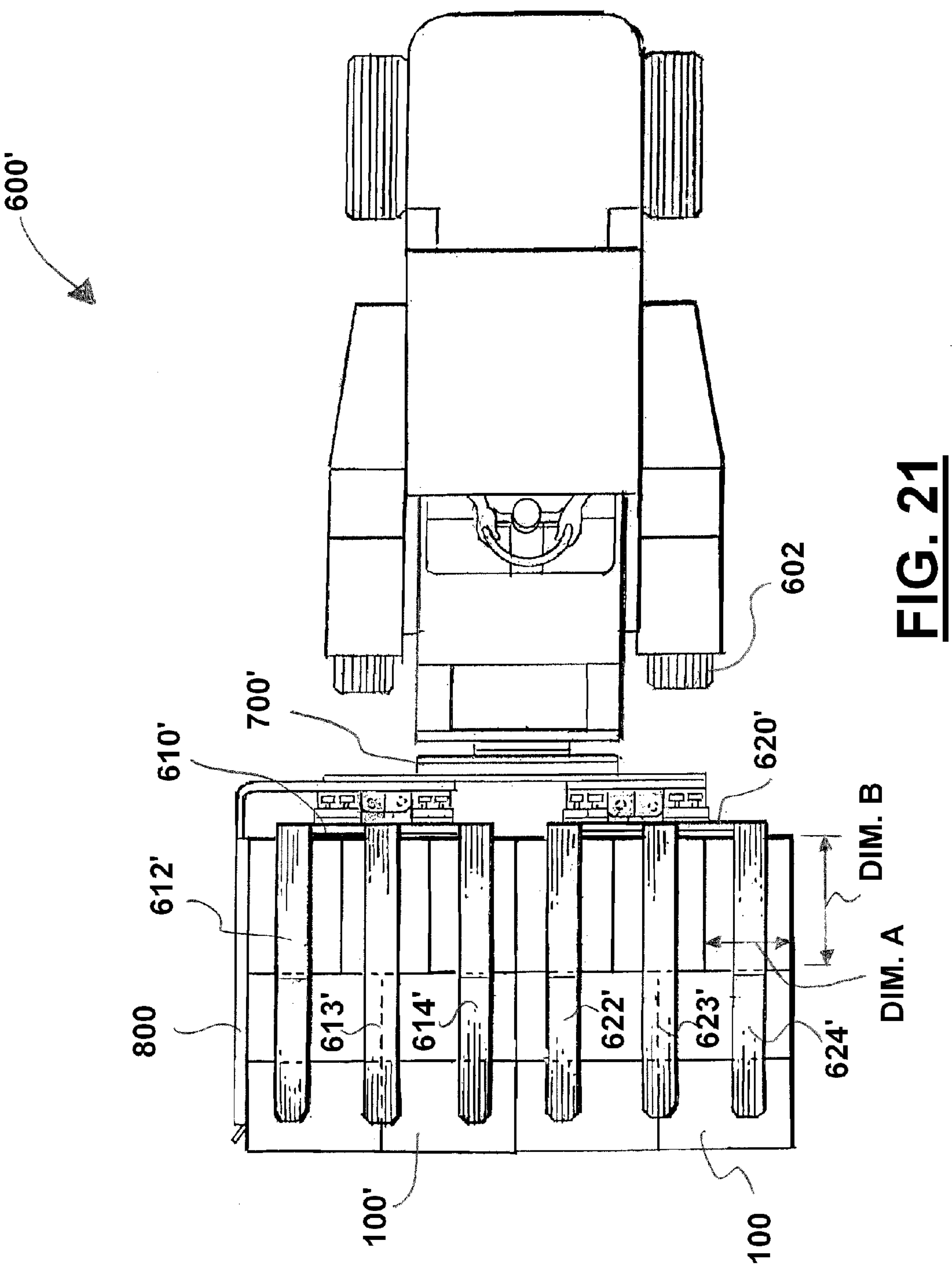
FIG. 21 is a top view of an alternative lift truck of FIG. 12 where three sets of tines are used for each stack which, after rotation, can stop the dropping of one or more cartons in a seven carton layer.

FIGS. 21 and 8 show alternative methods for depalletizing by rotation seven carton layers. FIG. 8 is an alternative seven carton layer 127 with seven cartons 128 stacked in a 3 by 2 by 2 relation. Cartons 128 can have dimension A for width and dimension B for length so that they substantially fit in a standard 40 inch by 48 inch pallet. However as shown by FIG. 8, at least one carton 128' is not directly supported/touched by at least one of the fork tines. Accordingly, after rotation carton 128' can have the tendency to drop out of the stack and there is a need to support all cartons.

FIG. 8 schematically indicates the step of manually placing a support board 129 which spans between the fork tines and can provide support to carton 128'. When rotated support board 129 can extend between the two fork tines to resists dropping of one of the cartons 128'. A pair of support boards 129, 129' (support board 129' is not shown for purposed of clarity) can be placed on top of each stack of palletized stacks of cartons having seven cartons per layer (the support boards spanning the 3 cartons in the top layers stacked in a 3 by 2 by 2 relationship. Looking at FIGS. 11 and 12 (and assuming that the stacks in these two figures have 7 carton layers), when the upper fork tines squeeze the stacks and a support system as shown in FIG. 8 can be achieved. When the stacks are rotated the support boards 129, 129' can support the cartons 128' and prevent these cartons from falling. Preferably, the support boards 129,129' are removed sometime before depositing the depalletized stacks in ship 10. Removal can be manually performed during at various stages after depalletization by rotation (e.g., after dropping on robot 300, after picking up a stack in hold 35, or when ultimately depositing the stack by load push mechanism 1010 at the stack's ultimate stowage location). In the hold of ship 10, load push lift trucks 1000 preferably have three fork tines and the middle fork tines resist the dropping of cartons 128'.

Alternatively, three or more blades of fork tines can be used to support the stack and middle carton 128'. FIG. 21 is a top view of an alternative lift truck 600' where pairs of three fork tines (612', 613', 614' and 622',623',624') are used for supporting each stack 100',100 after rotation. After rotation, these pairs of three fork tines can stop the dropping of one or more cartons in a seven carton layer. However, where pairs of three fork tines are used for alternative lift truck 600', the upper and lower sets of fork tines will not be symmetrical (e.g., having a symmetrical number of pairs of upper and lower fork tines are shown in FIG. 9). This is because the set of three fork tines cannot be used to lift a standard four way pallet—instead the opposed set of two fork tines are used to lift the pallet. Accordingly, the two pairs of two fork tines are used for lifting the standard pallets, and the stacks are rotated angularly about 180 degrees onto the two pairs of three fork tines which then deposits the depalletized stacks onto robot 300 with the pairs of three fork tines entering the plurality of fork openings or fork channels.

However, before lift truck 600 picks up the next set of two palletized stacks of cartons to be rotated 180 degrees for depalletization, rotator 700 should be rotated to a position where the pairs of two fork tines are again the lower pair so that the standard four way pallets can be lifted and rotated. As described, with upper and lower pairs of two fork tines, no pre-pick up resetting angular rotation is required (before picking up the next set of palletized stacks of cartons) because both upper and lower pairs of two fork tines can pick up the pallets.

In one embodiment, the middle fork tine (e.g., 613' and 623') of the set of three fork tines can be detachably connectable to its respective base (610' and 620'). Removal of the middle fork tines allows for the conversion between three and two pairs of fork tines to address differing stack configurations. Where five carton layers are depalletized the middle fork tines (e.g., 613' and 623') can be removed, avoiding the need to rotate rotator 700 180 degrees before rotation cycles as both the upper and lower sets of fork tines can be used to lift standard four way pallets. However, where seven carton layers are to be depalletized, the middle fork tines (e.g., 613' and 623') can be added to address the issue of cartons dropping after rotation—but rotator 700 would need to be rotated 180 degrees before each new rotation cycle so that the pairs of two fork tines can be used to lift the four way pallets. This pre-cycle rotation is an extra step, and believed to slow down the overall depalletization cycle and possibly the entire loading cycle.

In one embodiment one or both of the paired set of three fork tines can be detachably connectable to their respective bases and replaceable with a paired set of two fork tines which are also detachably connected to the same bases.

A plurality of threaded fasteners can be used for detachably connecting the items. Preferably, these fasteners would be recessed to avoid any sharp edges or protrusions which otherwise may damage the cartons.

Rotation Performed Simultaneously with Ambulation of Lift Truck

In one embodiment, lift truck 600 both carries and performs at least part of the 180 degrees of rotation rotates at least one (and preferably two) palletized stacks of cartons while ambulating from the point of initial pickup to the drop off point on the lifting robot. One example of lift truck 600 both ambulating and angularly rotating stacks of cartons and pallets is schematically shown in FIG. 1 by arrows 550 and 574. During at least part of the rotation cycle for palletized stacks of cartons 100,100' (schematically indicated by arrow 574 in FIG. 1), lift truck 600 ambulates towards lifting robot 300 (schematically indicated by arrow 550). Traveling towards lifting robot 300 during at least part of the rotation cycle shortens the overall cycle time between depalletizing a first pair of stacks of cartons, loading the pair on robot 300, and then depalletizing a second pair of stacks of cartons and loading the second pair on robot 300.

In various embodiments at least 5, 10, 15, 20, 25, 30, 33, 40, 50, 60, 67, 70, 75, 80, 90, and/or 100 percent of the rotation is performed while ambulating from the initial pickup location towards the drop location of robot 300 (e.g., moving from picking up in multiple palletized stacks 950 to dropping off on robot 300). In various embodiments ranges between any two of the specified percentages of rotation is performed while ambulating towards robot 300.

In various embodiments at least about 1, 2, 3, 4, 5, 6, 7, 8, 9, 10, 15, 20, 25, and/or 30 feet is ambulated while rotation is performed. In various embodiments ranges between any two of the specified minimums of rotation is performed while rotating.

In various embodiments load truck 600 both ambulates and rotates while robot 300 is being lowered by ship 10 into its designated loading area. Performing ambulation and rotation simultaneously with hoisting (e.g., lifting or lowering) is believed to shorten the overall cycle time for loading.

After being angularly rotated for depalletization, the rotated stacks of cartons are loaded onto a lifting robot. This activity is schematically shown in FIG. 1 by lift truck 600' loading robot 300'. The loaded robot is then hoisted or raised, and deposited into hold 35. This activity is schematically shown FIG. 1 by arrow 510 for robot 300'" and arrow 530 for robot 300". Raising and lowering a loaded lifting robot is also schematically shown in FIG. 2.

Multiple loading circuits can be used simultaneously for a ship with multiple hatches. Using multiple loading circuits can shorten the overall loading time of the ship—as more than one hold is stowed at a times. FIG. 1 shows the operation of loading ship 10 using four rotating lift trucks 600, 600', 600", 600'. Using multiple lift trucks decreases the overall time needed to load ship 10. The individual lift trucks are shown in various stages of the depalletization cycles.

Loading Lifting Robot or Tray

After being rotated by at least about 180 degrees, the rotated stacks of cartons should be loaded onto lifting robot 300. After being rotated, the pallets are on top of the stacks of cartons and can easily be removed from the stacks.

Figure 27:
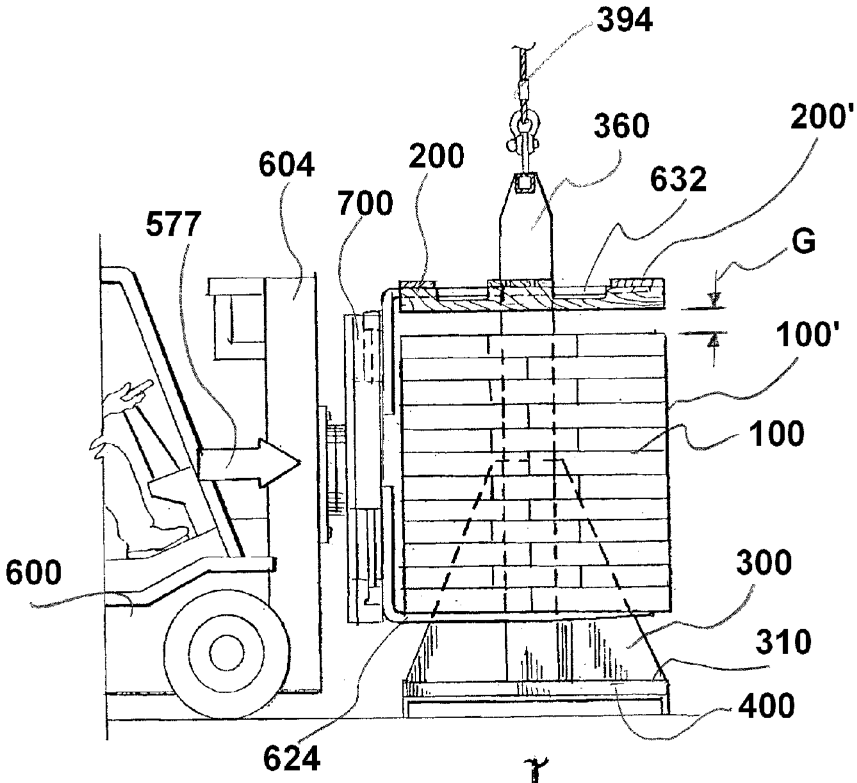
FIGS. 27 and 28 show a lift truck, after rotation, depositing two stacks of cartons on a robot where the pallets for the stacks have already been separated from the stacks.
Figure 28:
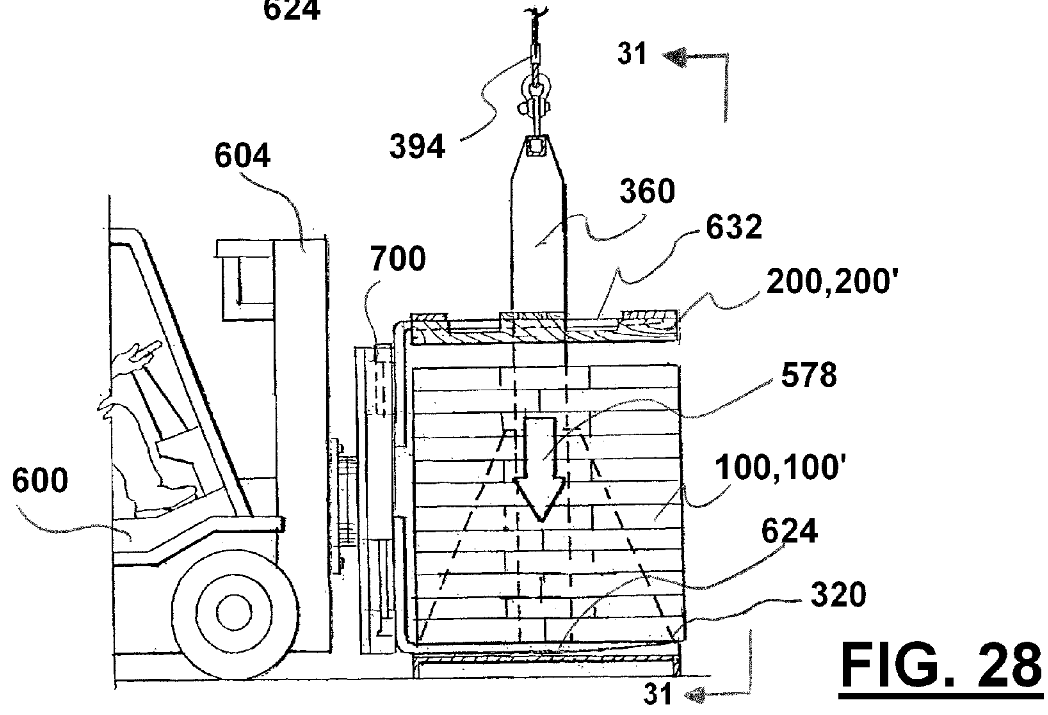

FIGS. 27 and 28 show a lift truck 600, after rotation, loading two stacks of cartons 100,100' on a robot 300 (schematically indicated by arrows 577 and 578) where the used pallets 200,200' have been separated or spaced apart (schematically indicated by gap G) from the stacks 100,100' (before rotation such pallets had supported the stacks). After rotation, to space apart pallets 200,200' upper and lower pairs of fork tines (612,614; 622,624 and 644,642; 634,632) are expanded in one of the following three methods: (a) expanding both upper and lower pairs away from each other; (b) expanding only the upper pair, maintaining the lower pair at a constant position; and/or (c) expanding only the lower pair, maintaining the upper pair at a constant position.

Figure 31:
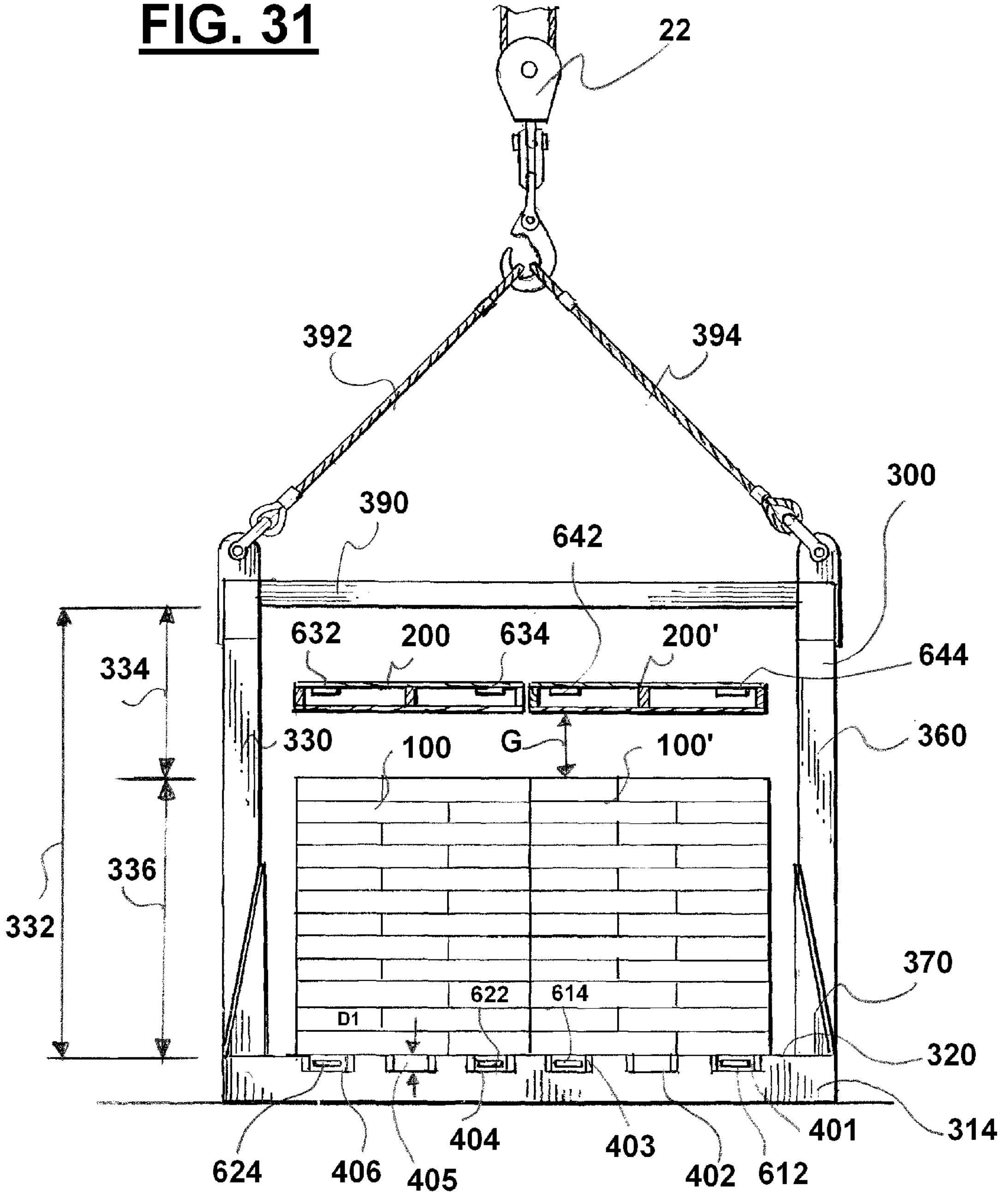
FIG. 31 is a front view of FIG. 28 showing the two stacks of cartons after being deposited on the robot along with space in the fork channels of the robot for removal of the fork tines of the lift truck and also space between the top of the stacks of cartons and the support bar for easy removal of the two pallets.

FIG. 31 is a view taken along the lines 31—31 of FIG. 28. Stacks of cartons 100, 100' are supported by upper surface 320 of deck 310 of robot 300. Pairs of fork tines 624,622 and 614, 612 have entered plurality of fork openings or fork channels 400 (more particularly, in 406,404,403, and 401). Lift truck 600 can now be backed up with the pairs of fork tines 624,622 and 614, 612 being moved under the stacks of cartons 100,100' (preferably not touching the stacks during the withdrawal). During the withdrawal of lift truck 600 Pallets 200,200' are supported by and remain on pairs of fork tines 632,634 and 642,644 (separated from stacks such as by gap G) for later deposition.

Preferably, plurality of fork openings or channels 400 are large enough to allow adequate room for the fork tines or blades to enter and detach from the stacks which the fork tines had supported. In this way the loading of robot 300 can be done without any pushing of the stacks of cartons.

After withdrawal of the fork tines or blades of lift truck 600, lifting robot 300 is now loaded with two depalletized stacks of cartons of frozen animal products, and lifting robot 300 can be raised or hoisted (such as through ship's crane or union purchase 20), and then lowered into one of ship's 10 holds 35 for ultimate stowage of the depalletized stacks.

Figure 29:
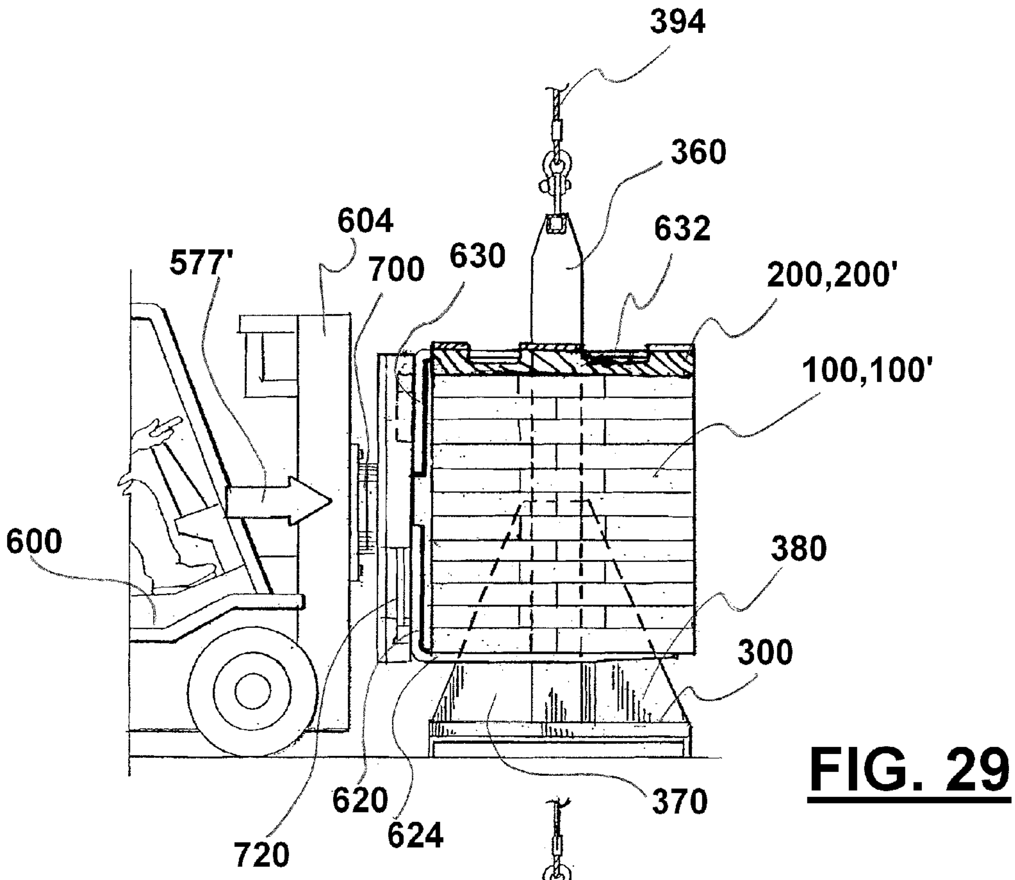
FIGS. 29 and 30 show a lift truck, after rotation, depositing two stacks of cartons on a robot where the pallets are still touching the stacks.
Figure 30:
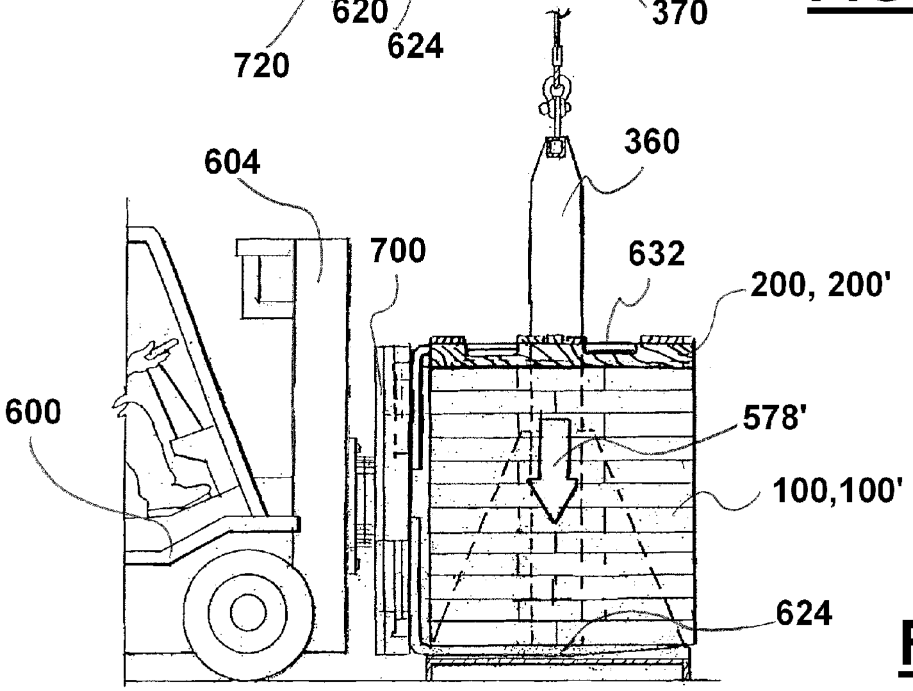

FIGS. 29 and 30 show lift truck 600, after rotation, loading two stacks of cartons 100,100' on robot 300 (schematically indicated by arrows 577' and 578') where pallets 200,200' are still touching the stacks (and not spaced apart). However, after loading on lifting robot 300 the two stacks of cartons, pallets 200,200' can then be spaced apart making a front view look similar to that shown in FIG. 31.

It is preferred that, before the fork tines or blades are withdrawn from the plurality of fork channels or fork openings 400 of lifting robot 300, the pallets 200,200' be spaced apart from the stacks 100,100'. Otherwise, the pallets may stay on top of the stacks or damage the upper layer of cartons if caused to slide across the upper layer.

Self Aligning Lifting Robot or Tray

Figure 32:
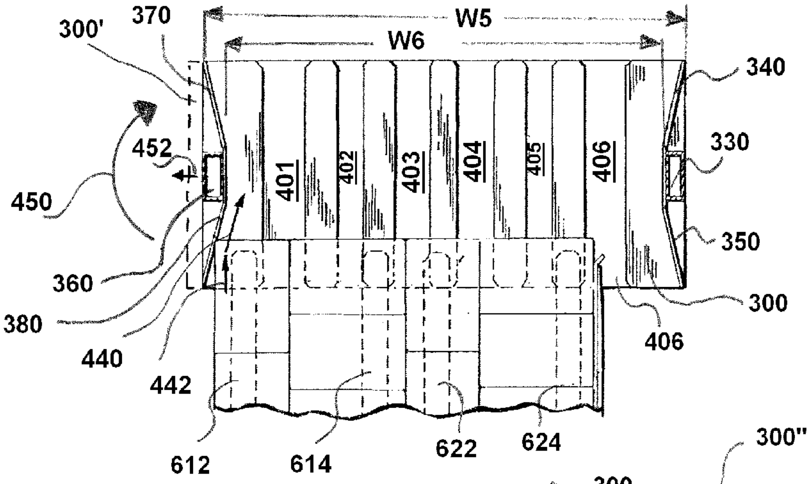
FIG. 32 is a top view schematically illustrating adjustment of the robot relative to the lift truck when the lift truck is misaligned to the left side relative to the fork channels.
Figure 33:
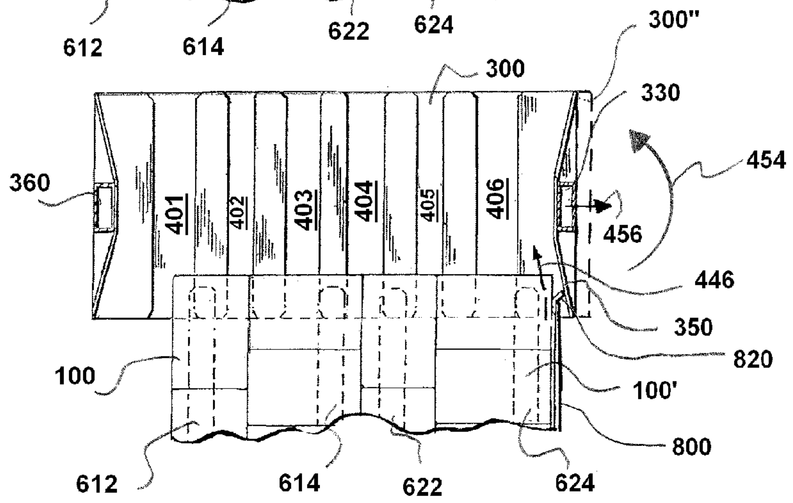
FIG. 33 is a top view schematically illustrating adjustment of the robot relative to the lift truck when the lift truck is misaligned to the right side relative to the fork channels.

FIGS. 32 and 33 schematically illustrate self adjustment feature of the plurality of fork channels or fork openings 400 of lifting robot 300. Preferably, when loading lifting robot 300, the lower pairs of fork tines or blades supporting the stacks of cartons will line up with and easily enter the fork openings or fork channels 400 thereby providing room for the fork tines or blades to be separated from and then withdrawn from under the stacks of cartons now loaded on lifting robot 300. Otherwise, if contact is maintained between the supporting fork tines or blades and the stacks of cartons being loaded friction will tend to move the stacks with movement of the fork tines (or even damage the lower most layer of cartons). Accordingly, the fork tines are preferably positioned where they can be lowered into the fork openings or fork channels 400.

However, the operator of lift truck 600 is not always able to properly align the supporting fork tines or blades with the plurality of fork channels and a substantial amount of time can be consumed attempting to achieve adequate alignment. During this process the lift operated may have to back up and move forward several times before he has the supporting fork tines parallel and over the plurality of fork channels or openings.

As shown in FIG. 10, plurality of fork openings or fork channels 400 can include vertical positioning guides 420 (or bevels). If fork tines are slightly misaligned the vertical positioning guides can facility the automatic alignment of lifting robot 300 such as by shifting of the lifting robot (caused by the forces between lifting robot and the fork tines contacting the vertical positioning guides) or by shifting of the fork tines or rotating lift truck 600 (caused by the same forces). Similarly, horizontal positioning guides 410,411 (or bevels) can be used when fork tines attempt to enter horizontally the plurality of fork openings or fork channels 400 (such as when lift truck 1000 unloads a stack in hold 35 schematically shown in FIG. 2, or when lift truck attempts to load lifting robot 300 with the lower fork tines or blades a height below the top of deck 310).

Additionally, the process of adequately aligning can be considerably sped up if lifting robot 300 includes one or more alignment guides 340,350, 380,370. As will be described below, these alignment guides can automatically move robot 300 to a more preferred alignment position (from a non-preferred alignment position).

FIG. 32 is a top view schematically illustrating adjustment of robot 300 relative to lift truck 600, when lift truck 600 is misaligned to the left side relative to the plurality of fork openings or fork channels 400. Here, the stack of cartons contacts alignment guide 380 causing at least partial movement of robot 300 laterally (schematically indicated by arrow 452) and/or rotationally (schematically indicated by arrow 450). With this partial realignment (schematically indicated by robot 300' in phantom for movement in the direction of arrow 452), the operator's next attempt to adequately align the fork tines with the plurality of fork openings or fork channels 400 should be made easier (and more successful).

FIG. 33 is a top view schematically illustrating adjustment of robot 300 relative to lift truck 600, when lift truck 600 is misaligned to the right side relative to the plurality of fork openings or fork channels 400. Here, guide 820 of side plate contacts alignment guide 350 causing at least partial movement of robot 300 laterally (schematically indicated by arrow 456) and/or rotationally (schematically indicated by arrow 454). With this partial realignment (schematically indicated by robot 300" in phantom for movement in the direction of arrow 456), the operator's next attempt to adequately align the fork tines with the plurality of fork openings or fork channels 400 should be made easier (and more successful).

Depending on the side from which robot 300 is loaded, and the position of side plate 800, any one of the guides 340,350, 370,380 can come into operation by contact with the stack of cartons being loaded or side plate 800.

Figure 37:
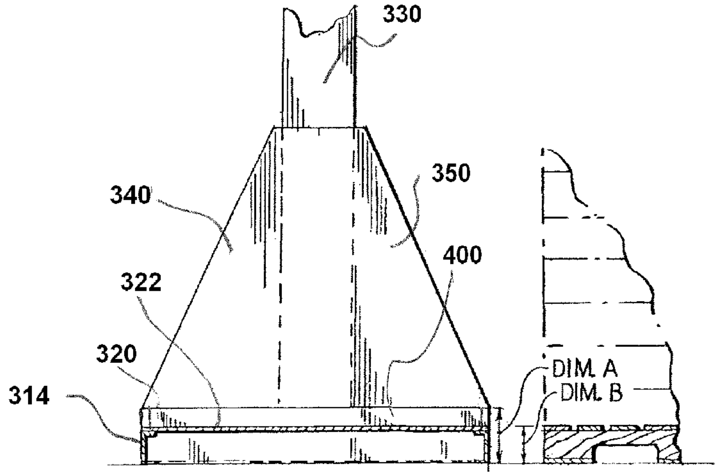
FIG. 37 schematically illustrates the preferred construction of the fork channels in the robot where the top of the fork channels is higher than the top of the wooden pallets.

FIG. 37 schematically illustrates the preferred construction of the plurality of fork openings or fork channels 400 in robot 300 where the top of the fork channels is higher than the top of the wooden pallets. In a preferred embodiment DIM. A will be greater than DIM. B. This high construction provides the advantage of being able to make deeper fork openings or fork channels 400 and also include additional support for robot base 310 to resist excessive bending and flexing of robot 300 during operation. In systems where the stacks of cartons are slid off of pallets DIM. B preferably would be at least as high as DIM A to allow the stacks to slide off of the pallets and onto the surface of the robot.

Another option for aligning robot 300 relative to lift truck 600 is to land robot 300 adjacent or next to an alignment device (such as a backstop or concrete block). For example, although not shown, dock 5 can include a backstop, such as a concrete block 4, which is parallel to the edge of dock 5 (docks without the backstop is shown in FIG. 1). As robot 300 is being lowered or landed, robot 300 can be positioned against this concrete block 4. This positioning can be manually assisted by one or more individuals manually positioning robot 300 against the alignment device (such as when robot 300 is being lowered or landed). After being aligned against backstop or alignment device, robot 300 will be in a consistent position. In this way lift truck 600 can repetitively approach robot 300 where robot 300 is in a consistent position (e.g., parallel to edge of dock 5) for each iteration of loading. Having robot 300 in a consistent position assists the operating in aligning the fork tines or blades of lift truck 600 in fork channels 400 of robot 300. In one embodiment the alignment device can include two spaced apart side guides (which can be parallel to the lateral sides of robot 300 (e.g., perpendicular to the longitudinal length of robot 300)). These two sides guides and the backstop can form an interior space which is rectangular in shape and is about the size of the footprint made be robot 300 (in which interior space robot 300 can be positioned for loading). In one embodiment the side guides can include inclined vertical sections which can assist in guiding robot 300 during the landing/lowering process, such as when robot 300 is offset relative to the two side guides. The vertical sections can be inclined toward the interior space defined by the backstop and the two side guides. The inclined section which contacts robot 300 during the landing process can gently cause robot 300 to shift and land in the middle of the two side guides (i.e., in the middle of the interior space). In one embodiment concrete block 4 can also include an inclined vertical section to assist in aligning robot 300 during the landing or lower process.

Figure 35:
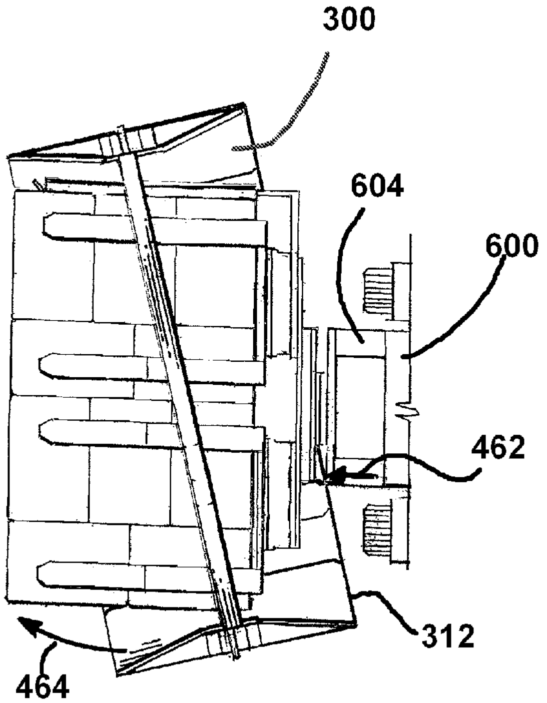
FIG. 35 is a top view schematically indicating that the lift truck uses the elevator to align the robot.
Figure 34:
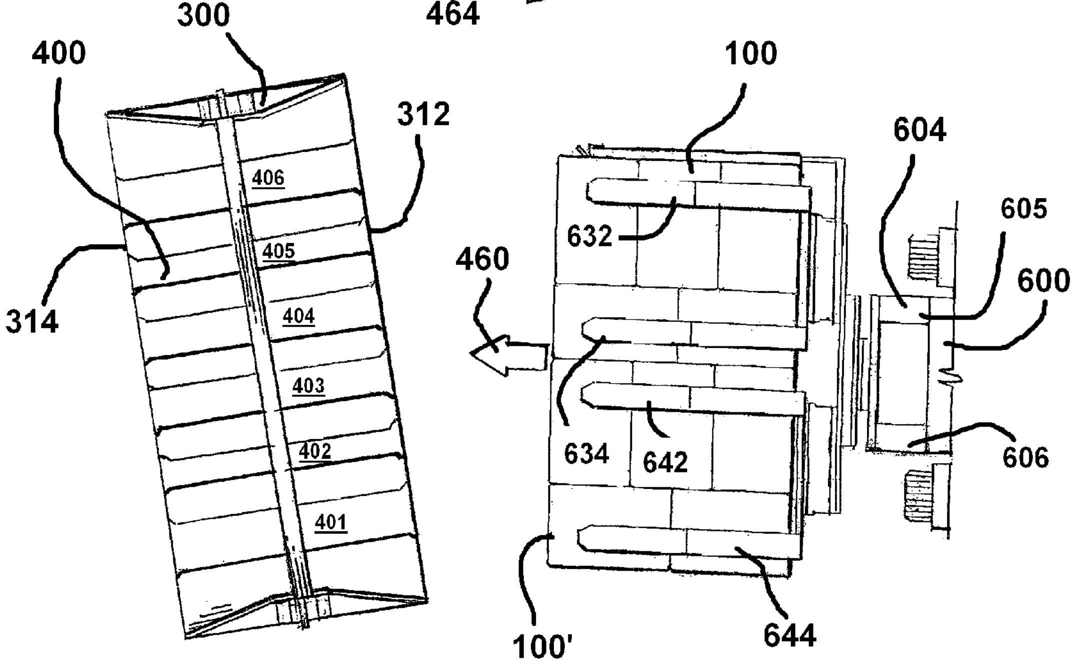
FIG. 34 is a top view schematically illustrating an alternative method for adjusting the robot relative to the lift truck when the two are misaligned.
Figure 36:
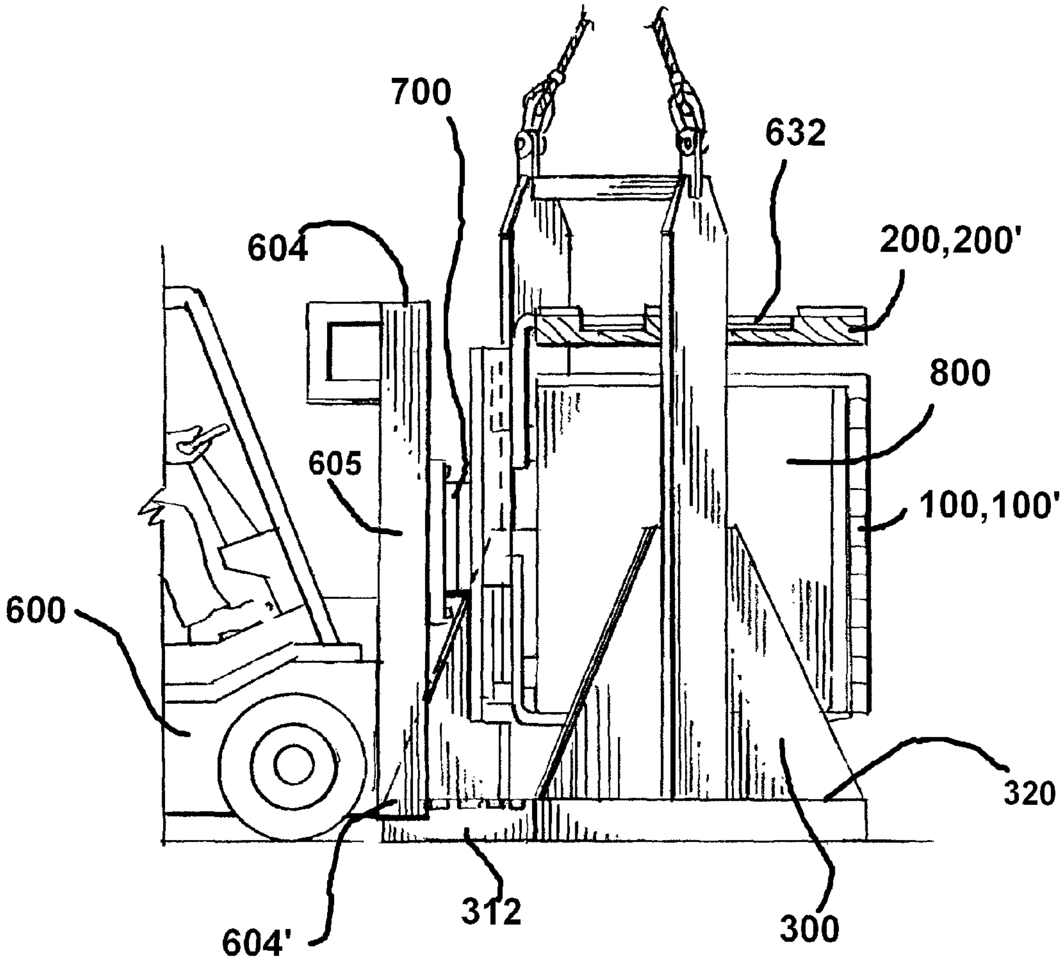
FIG. 36 is a side view of the lift truck and robot of FIG. 35.

Another embodiment for aligning robot 300 relative to lift truck 600 is schematically shown in FIGS. 34-36. FIG. 34 is a top view schematically illustrating an alternative method for adjusting robot 300 relative to lift truck 600 when the two are misaligned. Arrow 460 schematically indicates that lift truck 600 is approaching robot 300. FIG. 35 is a top view schematically indicating that lift truck 600 uses elevator 604 to align robot 300. FIG. 36 is a side view of lift truck 600 and robot 300 shown in FIG. 35.

In this embodiment the lower portion 604' of elevator member 604 can be used align robot 300 and lift truck 600. Elevator member 604 can be comprised of two spaced apart vertical members 605,606 which spaced apart vertical members form part of an alignment plane, which alignment plane is substantially perpendicular to the fork tines or blades of lift truck 600. If robot 300 is skewed (i.e., not perpendicular) in relation to lift truck 600 (see FIGS. 35 and 36), then contact between lower portion 604' of elevator member 604 and front 312 of robot 300 will tend to realign robot 300 to be parallel to the plane made by elevator 604 (e.g., members 605,606) and thereby perpendicular to fork tines or blades. If fork tines or blades of lift truck 600 are raised above the top of deck 320 (see FIG. 36) then elevator member 604 can contact front 312 of robot 300. In FIG. 35 arrow 462 schematically indicates lift truck 600 pushing robot 300. Arrow 464 schematically indicates that robot is angularly aligned relative to lift truck 600 by the pushing indicated by arrow 462. The angular alignment may include linear movement in addition to angular movement. Angular alignment will occur until front 312 contacts both vertical members 605, 606 of elevator 604. At this point front 312 will be parallel to the plane made by elevator 604 and perpendicular to the fork tines or blades.

Having front 312 perpendicular to fork tines or blades will make plurality of fork channels or openings 400 parallel to the fork tines or blades thereby assisting alignment between fork channels or openings 400 and fork tines or blades. Such parallel relationship will assist in having fork tines or blades to enter the fork channels or openings of robot 300 and loading of stacks of cartons 100,100'.

Removing Used Pallets from Rotating Lift Truck

Figure 38:
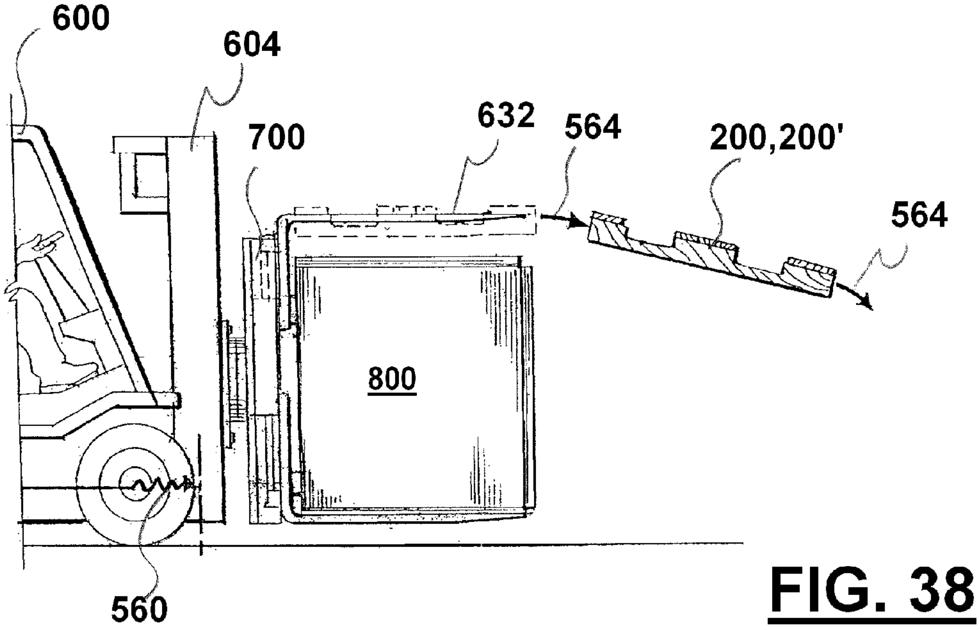
FIG. 38 schematically illustrates one option for removing the wooden pallets from the fork tines.
Figure 39:
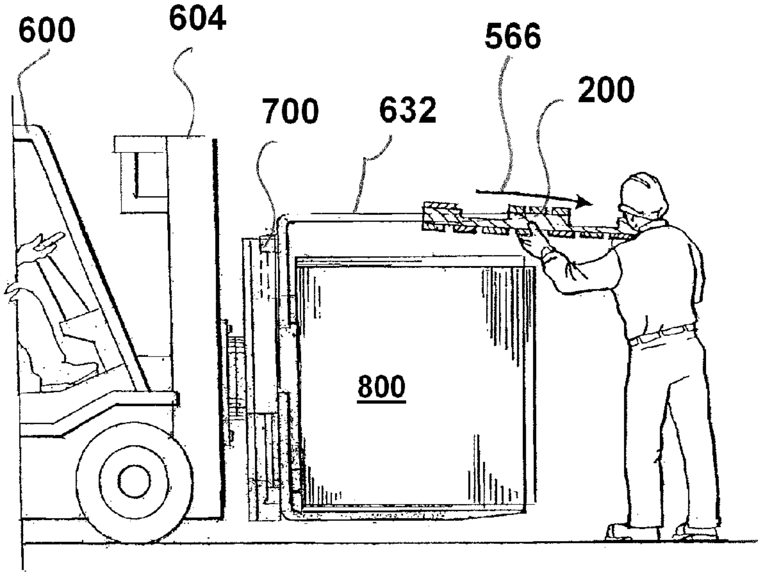
FIG. 39 schematically illustrates a second option for removing the wooden pallets from the fork tines.

After stacks of cartons 100, 100' have been loaded on lifting robot 300, the rotated pallets are still on the fork tines or blades of rotating lift truck 600. Lift truck 600 may then carry the pallets to a pallet storage location where it deposits the pallets. Depositing of the empty pallets is shown in FIGS. 1 and 38-39.

One embodiment includes having the automatic removal performed through use of the momentum of the pallet causing the pallet to slide off the fork tines of the lift truck. FIG. 38 shows automatic deposition of the used pallets by stopping short (schematically indicated by arrow 560) and allowing the pallets to slide off of the fork tines through their own momentum. This embodiment includes having at least one pallet being automatically removed from the fork tines of the lift truck at a used pallet storage station.

One embodiment includes having at least one rotated pallet manually removed from the fork tines of the lift truck at a used pallet storage station. FIG. 39 shows manual removal of the rotated pallets by an individual.

After depositing the rotated pallets, rotating lift truck 600 can then retrieve another stack (or multiple stacks of palletized cartons of frozen animal products where lift truck 600 provided with multiple sets of forks) for depalletization by rotation (e.g., about 180 degrees of angular rotation) and loading onto a lifting robot. In FIG. 1 lift truck 600" is shown moving in the direction of arrow 540" to retrieve another set of palletized stack of cartons from multiple palletized stack of cartons 970.

After a period of time the temporarily stored stacks of used pallets 1100" and 1100'" can be picked up and brought to a overall pallet accumulation area. One embodiment includes having a plurality of pallets at a plurality of used pallet stations being collected and brought to an overall used pallet storage station.

Although not shown in the figures, in one embodiment empty pallets 200,200' can be removed from the blades of rotating lift truck 600 using friction such as through the following procedure: (a) rotating empty pallets at least about 180 degrees so that they are now on the lower set for fork tines, (b) lowering empty pallets 200,200' until they contact a resistance (such as the ground or a stack of pallets), and (c) then backing up rotating load lift truck 600 when the resistance overcomes frictional forces between the fork tines and the empty pallets 200,200', and the empty pallets slide off of the fork tines. In one embodiment a stack of empty pallets 1100" can be created by successively rotating and depositing empty pallets through lowering and backing up. In one embodiment a pallet rack can be used where the pallets are deposited on the pallet rack, or the edge of the rack is used to generate the resistance (such as by placing the pallets inside the edge and having this edge scrape the pallets off of the fork tines). As described above, after a period of time the temporarily stored stacks can be picked up and brought to an overall pallet accumulation area. This procedure has the advantage that it does not require a person to manually removed the empty pallets, or stopping short using the momentum. However, it has the disadvantage in that rotation of about 180 degrees is required to have the pallets on the lower fork tines.

Stowing the Depalletized Stacks of Cartons

Next will be described the process of lifting the loaded lifting robot 300 into ship 10 and then stowing the depalletized stacks of cartons into their ultimate stowage locations.

Figure 40:
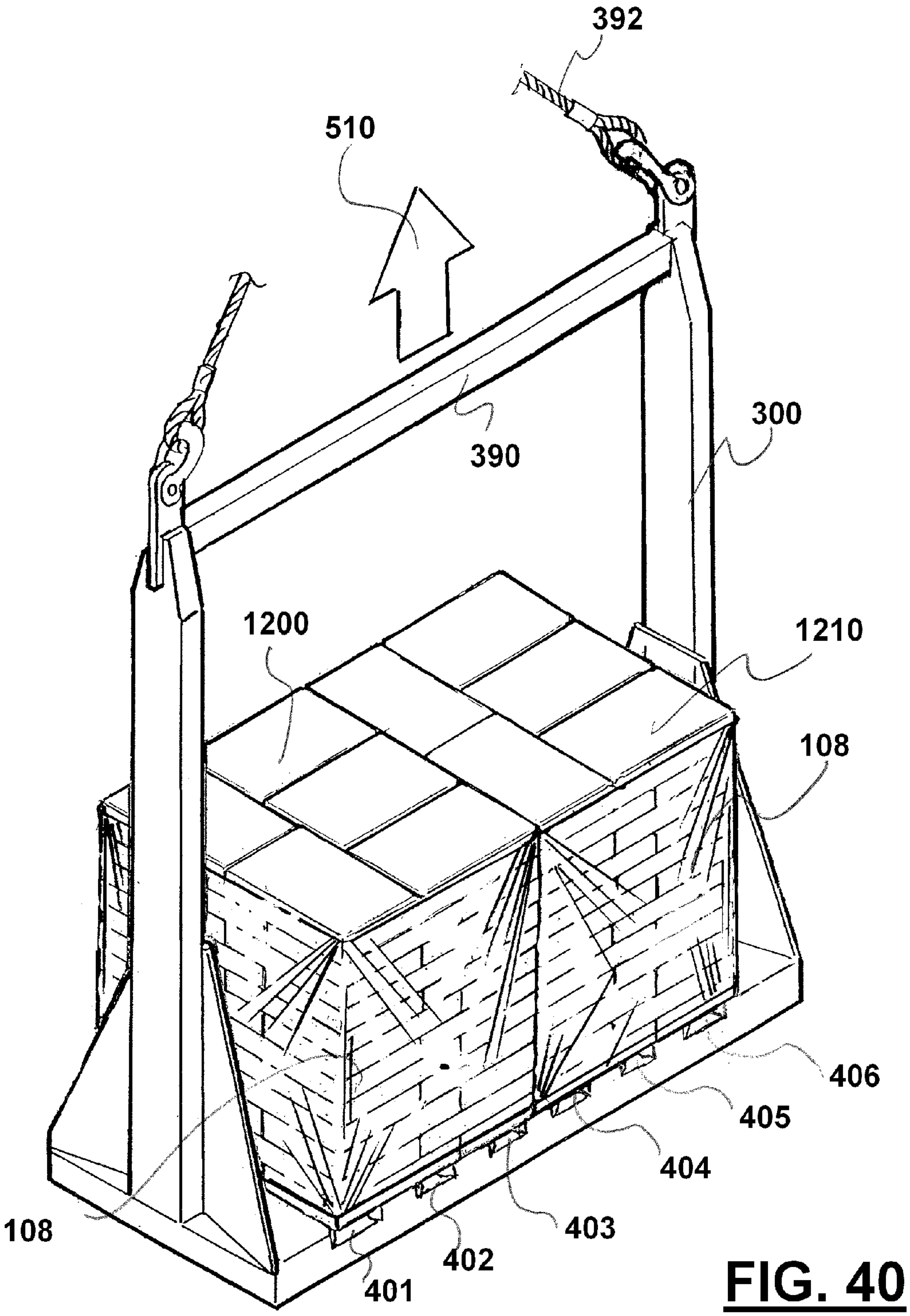
FIG. 40 is an overall view of the robot loaded with two now depalletized stacks of cartons of frozen animal products schematically indicating that the robot is being lifted into the ship.

Once the robot 300 is loaded, the ship's hoisting system (e.g., crane or union purchase 20) can lift lifting robot 300 and then lower it into hold 35. FIG. 40 is perspective view of lifting robot 300 now loaded with two depalletized stacks of cartons of frozen animal products, and schematically indicating (arrow 510) that loaded lifting robot 300 is being hoisted into ship 10. In the overall perspective view of FIG. 1 hoisting of loaded robots is shown with robot 300" or robot 300". FIG. 2 schematically shows the overall lifting and landing process of lifting robot 300 (arrows 510,512, and 514) through hatch 30. Additionally, FIG. 2 shows lifting robot 300 after it is landed in hold 35 with load push lift truck 1000 moving in to pick up one of the depalletized stacks (schematically indicated by arrow 1001).

For purposes of clarity the depalletized stacks of cartons will be referred to as reference numbers 1200,1210. The unloading and stowage of only one pair of stacks of cartons is described. This process can be repeated numerous times however with different stacks.

Load push lift trucks have been used to push cargo off the lift truck blades.

Load push, side shift lift trucks are known in the art of specialty lift trucks. Such lift trucks are discussed, for example, in U.S. Pat. No. 4,752,179 to Seaberg. In one embodiment, a lift truck may include three relatively flat blades having widths of about 3 to about 8 inches (10.2 to 20.3 cm), and may include side shift capability. The blades may be smooth and preferably polished, and may have rounded or tapered edges. The load push system should be sufficiently powerful to push a full stack of cartons of frozen chicken parts or the like off of the blades and into a stowage location, such as a position atop another stack of cartons.

Figure 41:
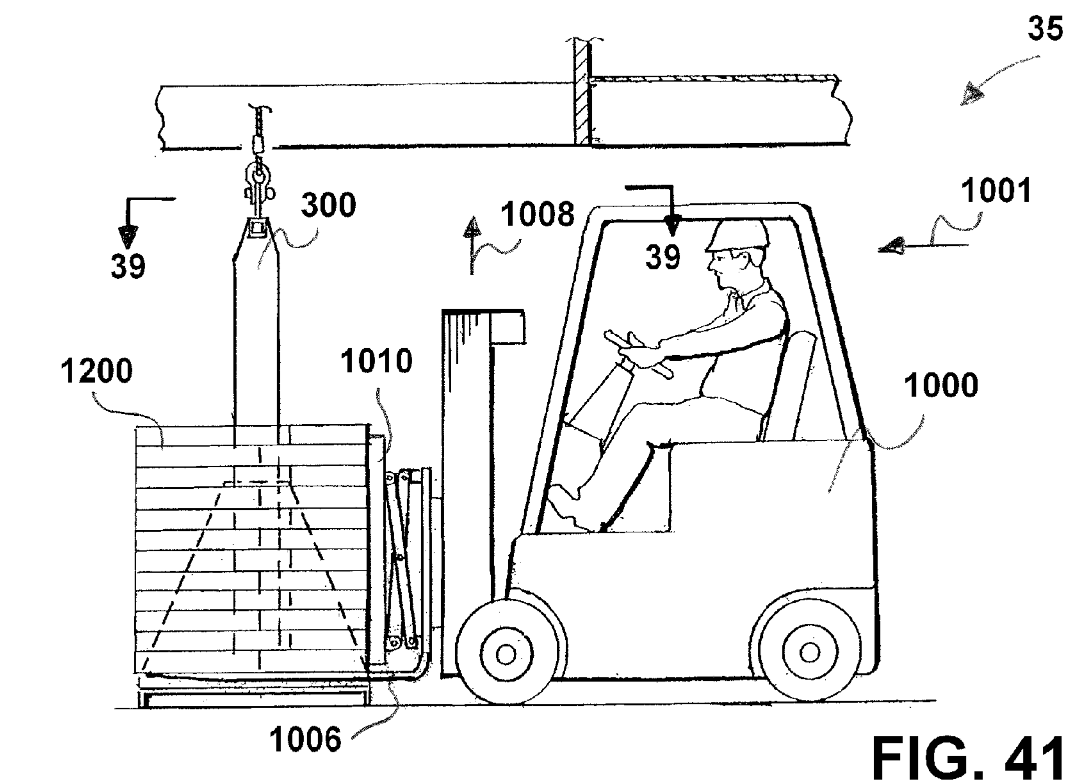
FIG. 41 is a side view of a load push lift truck being used to remove one of the two stacks of cartons from the robot.

A load push lift truck has at least two blades extending from its lift mechanism. Typically, the blades are relatively broad, and may have relatively smooth or polished upper surfaces to facilitate the sliding of the cartons thereon. A push plate associated with the lift mechanism can be extended by means of hydraulic cylinders from a retracted position adjacent the lift mechanism to a position adjacent the ends of the blades. If the stack of cartons is resting on the blades of the lift truck, the push mechanism may also be used to push the cartons off the blades and/or to extract the blades from under cargo as the lift truck moves backward away from the desired position of the stack of cartons. Such a lift truck may include a side-shift mechanism which permits small lateral adjustments in the position of the cargo to facilitate its precise placement. Such load-push lift trucks are known in the art of specialized lift trucks. In hold 35 of ship 10 stacks of cartons 1200,1210 will be stowed. FIG. 41 shows a first load push lift truck 1000 picking up a stack of cartons 1200 from robot 300. In the hold of the ship a second load push lift truck 1000' can also pick up stack of cartons 1210 from robot 300. Load push lift trucks 1000,1000' can be of different type than lift truck 600. Here, trucks 1000,1000' can be smaller one load trucks (compared to larger lift truck 600) and can be battery operated for safety concerns while inside the ship's hold.

Figure 42:
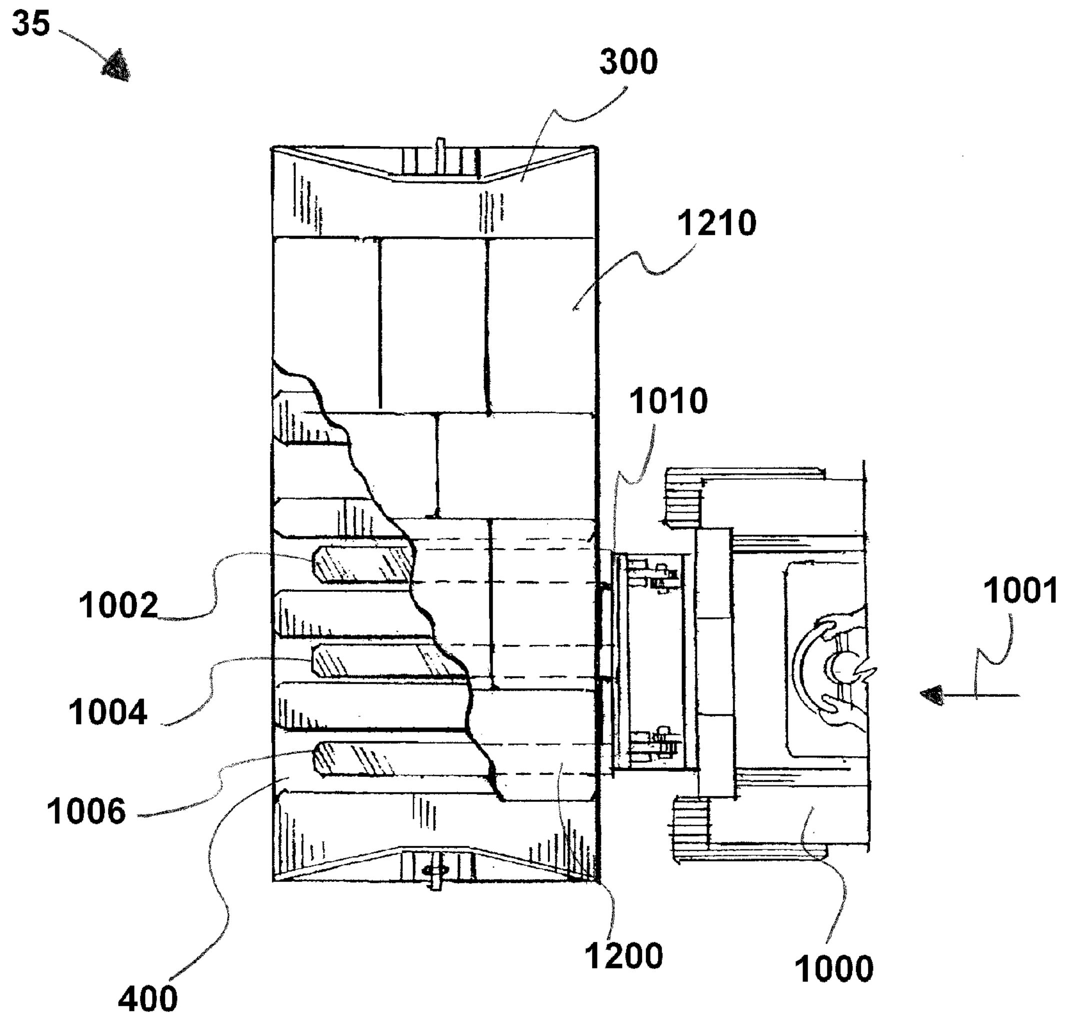
FIG. 42 is a top view of the load push lift truck of FIG. 38.

Once in hold 35, three-blade lift trucks 1000 may be used to unload robot 300 by inserting their fork tines or blades into the plurality of fork openings or fork channels 400 beneath the stacks of cartons 1200, 1210 and carrying them to stowage locations as described below. Horizontal adjustment guides 410,411 in plurality of fork channels or fork openings 400 can assist this process (shown in FIG. 10). For greater efficiency, the lift trucks 1000 may be load push lift trucks that can then deposit the stacks of cartons directly into desired stowage locations. FIG. 38 is a side view of load push lift truck 1000 moving in the direction of arrow 1001 and being used to remove one of the two depalletized stacks of cartons (now labeled 1200,1210) from robot 300. FIG. 42 is a top view of load push lift truck 1000 where its fork tines 1002,1004,1006 enter plurality of fork channels or openings to move under the stack to be lifted without sliding against the stack. Arrow 1008 in FIG. 41 schematically indicates that lift truck 1000 will use its fork tines to lift stack 1200 off of robot 300. After lifting stack 1200 off of robot 300, stack 1200 can be quickly stowed in its ultimate stowage location.

Figure 43:
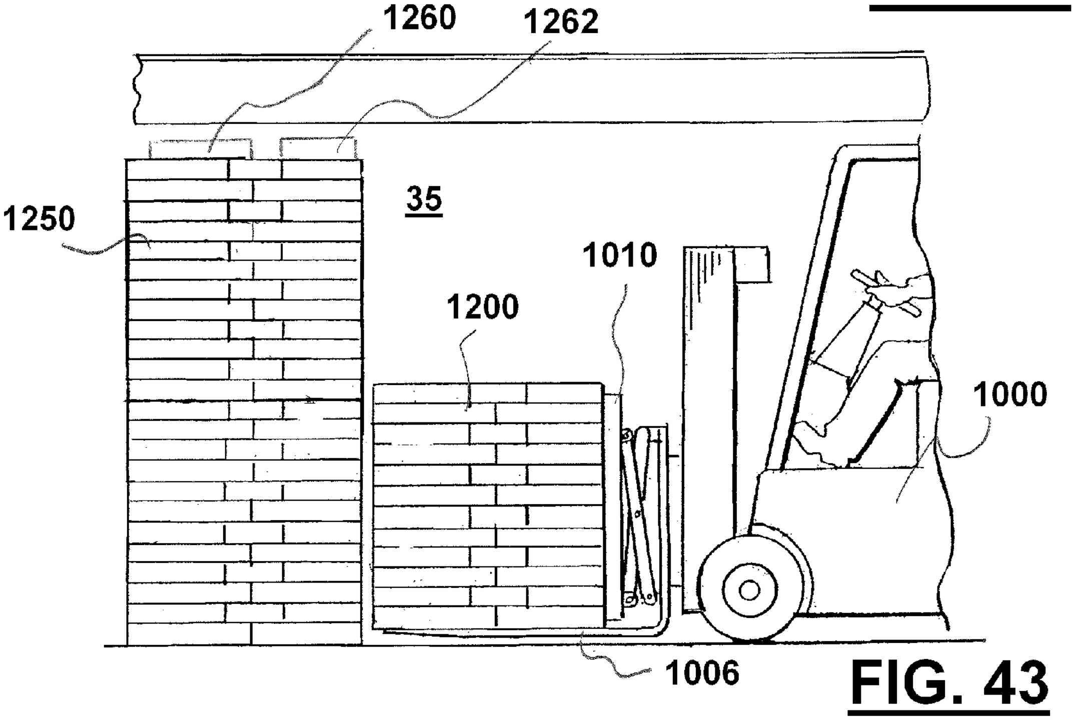
FIG. 43 is a side view of the load push lift truck of FIG. 38.
Figure 44:
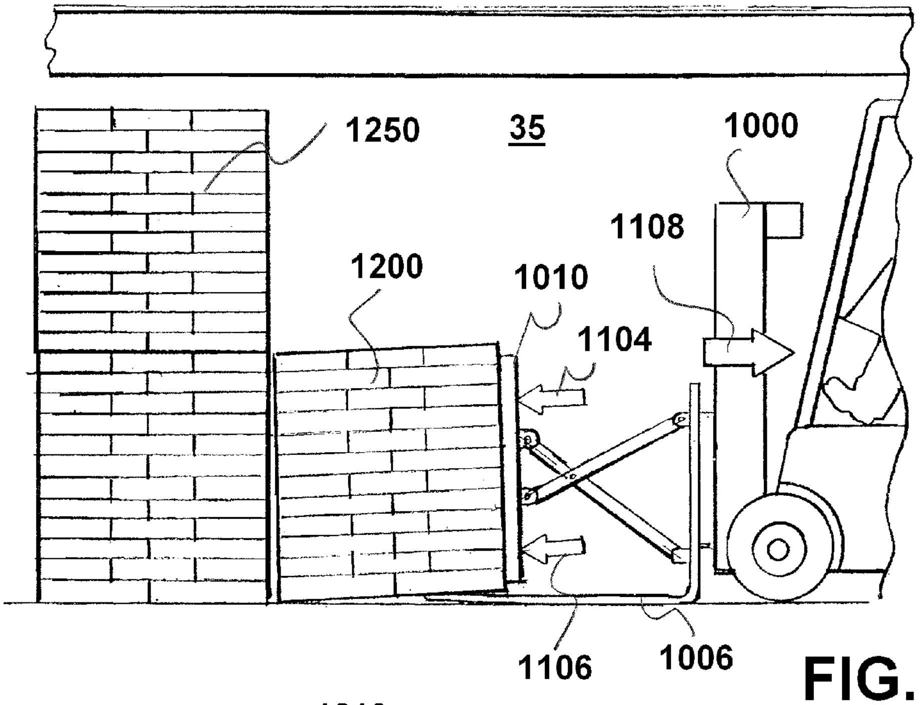
FIG. 44 is a side view of the load push lift truck of FIG. 38 using a push mechanism to push off a stack of cartons to a stowage location on the floor of the hatch.

When picking a stack of cartons 1200 up from one of the 48 inch sides, a three-blade lift truck 1000 can provide support to each of the three side-by-side cartons the ends of which abut one another along the 48 inch side of the stack. The three-blade lift truck 1000 may also be used to lift stacks of cartons 1200 from one of the 40 inch sides of a stack if robot 300 is loaded with the 40 inch side for pickup. When robot 300 has been landed in hold 35, as shown in FIG. 2, a load push lift truck 1000 can then be used to lift one of the stack of cartons (e.g., 1200) from robot 300 and transport stack of cartons 1200 to its ultimate stowage location on the floor of hold 35 (as shown in FIGS. 42 through 44).

It has also been found that using three fork tines or blades to lift a stack of cartons in the hold of a ship can be beneficial in the carrying and maneuvering of the stack of cartons into a stowage location. In order to prevent thawing of frozen products during loading, the holds may be maintained at a sub-freezing temperature, and ice can form on the blades of a lift truck. During transportation of stack of cartons 1200 in hold 35 by lift truck 1000, stack of cartons 1200 may slide laterally relative to lift truck 1000 under such icing conditions. Such shifting has been found to be less likely and less serious when stack 1200 is supported during transportation by three blades, rather than two.

When two lift trucks 1000, 1000' are used in the hold 35, typically one of them is working in greater proximity to the robot landing zone. Accordingly, one of the lift trucks will frequently return for another load before the other. Thus, it may be desirable to carry three or more stacks of cartons into hold 35 at a time when using two lift trucks in hold 35 depending on how quickly the lift trucks can stow the stacks of cartons. The addition of a third lift truck may improve the cycle time of robot 300 between hold 35 and dock 5, since robot 300 may be unloaded more quickly.

Providing load push lift truck 1000 with side shift capability allows for greater precision in the placement of the stacks of cartons 1200,1210. Such side shift mechanisms shift the forks of lift truck 1000 laterally, usually by means of a hydraulic cylinder.

Two lift trucks 1000, 1000' may be used to remove the stacks of cartons 1200, 1210 from robot 300, so that robot 300 may be quickly returned to dock 5 for further loading. The cycle time of the ship's crane or union purchase 20 lifting robot 300 can be significantly increased if the loading or unloading of robot 300 is delayed. If robot 300 is designed to carry more than two stacks of cartons, more lift trucks may be used simultaneously to unload it, thereby minimizing the time the robot 300 remains in hold 35. Similarly, the time robot 300 remains on dock 5 can be reduced by using lift trucks 600 with the capability to move multiple stacks of cartons when loading robot 300.

Figure 45:
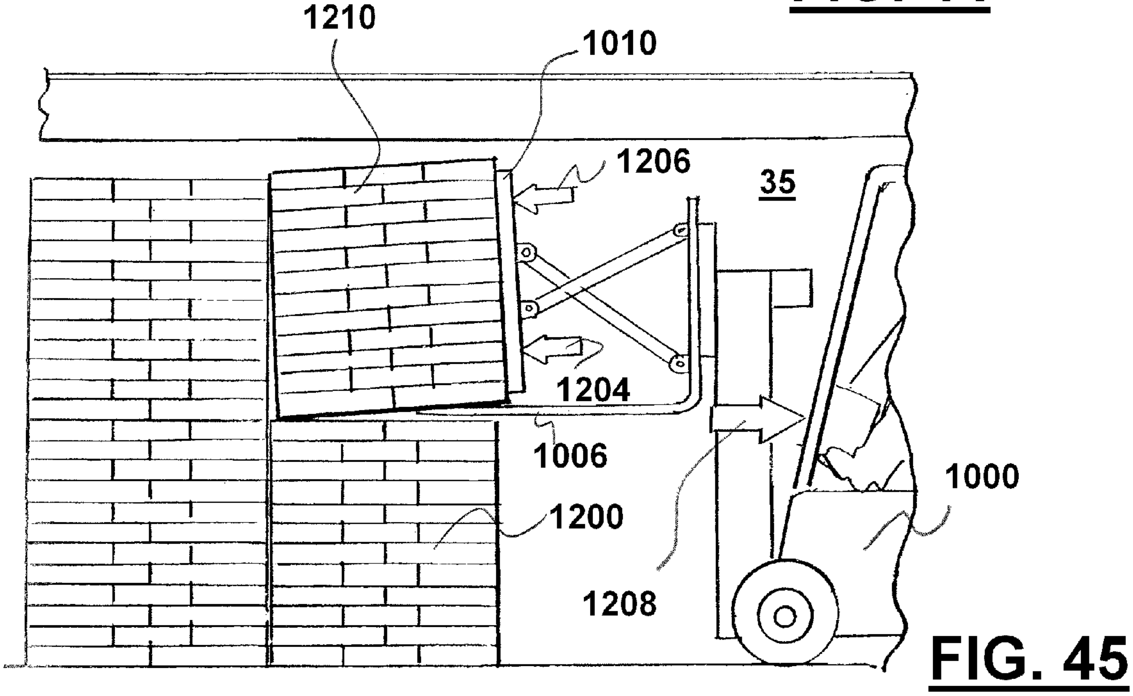
FIG. 45 is a side view of the load push lift truck of FIG. 38 using a push mechanism to push off a stack of cartons to a stowage location on top of a previously stowed stack of cartons.

FIG. 43 is a side view of load push lift truck 1000 beginning to deposit depalletized stack of cartons on the floor. FIG. 44 is a side view of load push lift truck 1000 using load push mechanism 1010 to push off stack of cartons 1200 to a stowage location on the floor of hold 35. FIG. 45 is a side view of load push lift truck 1000 using load push mechanism 1010 to push off a stack of cartons 1210 to a stowage location on top of previously stowed stack of cartons 1200.

In order to deposit stack of cartons 1200 on the floor of cargo hold 35, the lift truck operator moves stack 1200 into the desired position and lowers the blades (1002, 1004, 1006) of lift truck 1000 to the floor. If desired, the side shifter can be used to position stack 1200 in abutting relation with an adjacent stack or wall. The lift truck operator then simultaneously actuates load push mechanism 1010 and either backs lift truck 1000 away from the location or allows load push mechanism 1010 to push lift truck 1000 back from stack 1200 (where the front of stack 1200 is engaged with another stack or with a wall such as shown in FIGS. 43 and 44).

Additionally, load push lift truck 1000 can deposit stacks of cartons on other stacks of cartons. For example, load push lift truck 1000 can lift stack of cartons 1210 from robot 300 and then transport stack 1210 to its ultimate stowage location on top of another stack, such as previously deposited stack 1200 (as shown in FIG. 45).

Load push lift truck 1000 can initially deposit stack of cartons 1210 in its final stowage location on top of stack 1200, with a stevedores manually filling the remaining space atop stack 1210 from a nearby lift-truck-deposited stack of cartons. Alternatively, lift truck 1000 may deposit stack 1210 in a location with the stevedores breaking down stack 1210 into two or more shorter stacks placed on top of existing stacks (e.g., previously stowed stack 1200), and on top of which the load push lift truck 1000 may deposit another full stack of cartons (e.g., stack 1210), the combined height of the hand-stacked and lift-truck-deposited cartons filling the available vertical space. FIG. 43 shows some examples of manually stowed cartons 1260, 1262 on top of a machine stowed stack 1250.

The process of depositing stack of cartons 1210 on top of another full or partial stack is the same, except lift truck 1000 positions the blades immediately above the full or partial stack on top of which the full stack is to be deposited (shown in FIG. 45).

For stowage in irregular spaces, such as adjacent a sloping wall, in spaces too small for a full stack to be inserted or the like, the lift truck may deposit a full stack of cartons near such stowage location and the stevedores can manually stow the cartons in such areas by hand.

As schematically shown in FIG. 2, when substantially all of the cargo hold at a certain level has been filled, the particular hatch for that level can be closed and loading of the next highest level can be performed.

Once robot 300 has been unloaded it can be removed from hold 35 (such as by ship's 10 crane or union purchase 20) and placed in a loading area so that it can be reloaded. Empty robot 300 can now be removed from the hold of ship 10 (in the opposite directions of arrows 514,512,510 of FIG. 2) and placed outside of the ship for further loading activities. In FIG. 1 empty robot 300 is being lowered for reloading by lift truck 600. By repeating the steps of depalletizing by rotation on a lift truck, loading the robots, raising the loaded robots and lowering them into the hold of the ship, using a load push lift trucks to unload the robots and mechanically stowing the loads with the load push devices, the overall process of loading a refrigerated ship with depalletized stacks of cartons can be substantially shorted with less manpower than use by other prior art methods.

The following is a list of reference numerals:

LIST FOR REFERENCE NUMERALS

| (Reference No.) | (Description) |
|---|---|
| 5 | dock |
| 6 | water |
| 10 | ship |
| 12 | deck |
| 20 | crane or union purchase |
| 22 | hook |
| 30 | hatch |
| 35 | hold |
| 100 | stack of cartons |
| 102 | top of stack |
| 104 | bottom of stack |
| 108 | shrink wrap |
| 110 | layer of cartons |
| 111 | carton |
| 112 | carton |
| 113 | carton |
| 114 | carton |
| 115 | carton |
| 116 | retaining strap |
| 120 | layer of cartons |
| 121 | carton |

-continued

LIST FOR REFERENCE NUMERALS

| (Reference No.) | (Description) |
|---|---|
| 122 | carton |
| 123 | carton |
| 124 | carton |
| 125 | carton |
| 127 | layer of seven cartons |
| 128 | carton |
| 129 | support board |
| 130 | plurality of layers of cartons stacked alternatively |
| 200 | pallet |
| 202 | side |
| 204 | side |
| 206 | top |
| 208 | bottom |
| 210 | opening |
| 220 | opening |
| 230 | opening |
| 240 | opening |
| 250 | plurality of slats or boards |
| 251 | plurality of slats or boards |
| 252 | beam |
| 254 | beam |
| 256 | beam |
| 300 | robot |
| 310 | base or deck |
| 312 | front |
| 314 | rear |
| 320 | top of deck |
| 322 | lower surface of deck |
| 330 | arm |
| 332 | space |
| 334 | free space |
| 336 | height of stack |
| 340 | guide |
| 350 | guide |
| 360 | arm |
| 370 | guide |
| 380 | guide |
| 390 | top brace |
| 392 | lifting cable |
| 394 | lifting cable |
| 400 | plurality of fork channels or openings |
| 401 | fork channel or opening |
| 402 | fork channel or opening |
| 403 | fork channel or opening |
| 404 | fork channel or opening |
| 405 | fork channel or opening |
| 406 | fork channel or opening |
| 410 | horizontal positioning bevel |
| 411 | horizontal positioning bevel |
| 420 | vertical positioning bevel |
| 440 | arrow |
| 442 | arrow |
| 446 | arrow (movement of lift truck) |
| 450 | arrow (rotational adjustment of robot) |
| 452 | arrow (linear adjustment of robot) |
| 454 | arrow (rotational adjustment of robot) |
| 456 | arrow (linear adjustment of robot) |
| 460 | arrow |
| 462 | arrow |
| 464 | arrow |
| 510 | arrow (upward movement of loaded robot) |
| 512 | arrow |
| 514 | arrow |
| 520 | arrow |
| 530 | arrow |
| 540 | arrow (movement of lift truck towards stacks) |
| 541 | arrow (closing in of upper pairs of fork tines) |
| 542 | arrow (movement of carton caused by support plate) |
| 550 | arrow (movement towards robot) |
| 560 | arrow (stopping of lift truck) |
| 562 | arrow (removal of pallets) |
| 564 | arrow (automatic removal of pallets) |
| 566 | arrow (manual removal of pallets) |
| 570 | arrow |

-continued

LIST FOR REFERENCE NUMERALS

| (Reference No.) | (Description) |
|---|---|
| 571 | arrow (upward movement of stack relative to support plate) |
| 572 | arrow (downward movement of support plate relative to stack) |
| 573 | arrow (movement of carton caused by support plate) |
| 574 | arrow (rotation of stacks) |
| 576 | arrow (movement of pallets away from stacks) |
| 577 | arrow (movement of lift truck towards robot) |
| 578 | arrow (depositing of stacks on robot) |
| 584 | arrow (rotation of stacks) |
| 586 | arrow (movement of pallets away from stacks) |
| 594 | arrow (rotation of stacks) |
| 596 | arrow (movement of pallets away from stacks) |
| 600 | lift truck |
| 602 | wheels |
| 604 | elevator member |
| 605 | vertical member |
| 606 | vertical member |
| 610 | fork tine base |
| 612 | fork tine |
| 613 | fork tine |
| 614 | fork tine |
| 620 | fork tine base |
| 622 | fork tine |
| 624 | fork tine |
| 623 | fork tine |
| 630 | fork tine base |
| 632 | fork tine |
| 634 | fork tine |
| 640 | fork tine base |
| 642 | fork tine |
| 644 | fork tine |
| 700 | rotator |
| 701 | base |
| 702 | arrows |
| 704 | counter clockwise arrow |
| 706 | clockwise arrow |
| 710 | hydraulic cylinder and piston |
| 712 | arrows |
| 720 | hydraulic cylinder and piston |
| 722 | arrows |
| 730 | hydraulic cylinder and piston |
| 732 | arrows |
| 740 | hydraulic cylinder and piston |
| 742 | arrows |
| 800 | support plate |
| 802 | inside surface |
| 804 | outside surface |
| 810 | guide |
| 820 | guide |
| 830 | guide |
| 900 | warehouse |
| 950 | multiple palletized stack of cartons |
| 960 | multiple palletized stack of cartons |
| 970 | multiple palletized stack of cartons |
| 980 | multiple palletized stack of cartons |
| 1000 | load push lift truck |
| 1001 | arrow |
| 1002 | fork tine |
| 1004 | fork tine |
| 1006 | fork tine |
| 1008 | arrow |
| 1010 | push mechanism |
| 1100 | pallet stacks |
| 1110 | pair of pallets |
| 1104 | arrow |
| 1106 | arrow |
| 1108 | arrow |
| 1200 | non-palletized load (e.g., stack of cartons) |
| 1210 | non-palletized load (e.g., stack of cartons) |
| 1250 | multiple non-palletized stacks of cartons |
| 1260 | manually or hand stowed carton |
| 1262 | manually or hand stowed carton |

All measurements disclosed herein are at standard temperature and pressure, at sea level on Earth, unless indicated otherwise. All materials used or intended to be used in a human being are biocompatible, unless indicated otherwise.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

What is claimed is:

1. A method of loading items onto a vessel with a hold and a lifting crane, the method comprising the steps of:

(a) providing a rotating lift truck, the lift truck having
  a rotator and an elevator
  both of which being operably connected to the lift truck,
the rotator having
  first and second sets of fork tines,
  the first set of fork tines having
    left and right fork tines,
  the second set of fork tines having
    left and right fork tines,
  the left fork tine from the first set of fork tines and
  the left fork tine from the second set of fork tines being
    opposed and
    capable of clamping onto a first palletized stack of cartons having a first height,
  the right fork tine from the first set of fork tines and
  the right fork tine from the second set of fork tines being
    opposed and
    capable of clamping onto a second palletized stack of cartons having a second height,
  wherein clamping can occur even where
    the second height is different from the first height;

(b) using the elevator of the rotating lift truck
to elevate first and second palletized stacks of cartons of frozen animal products located in a first area,
the first and second palletized stacks of cartons each having a pallet supporting a plurality of layers of cartons, each layer having a plurality of cartons;

(c) using the rotating lift truck to move
the elevated first and second palletized stacks of cartons
from the first area to a loading area for loading on a vessel lifting platform;

(d) using the rotator of the rotating lift truck
to rotate the elevated first and second palletized stacks of cartons
by at least about 180 degrees in a first direction;

(e) during at least part of step "d"
the rotating lift truck moving the elevated first and second palletized stacks of cartons towards to the vessel lifting platform,
the vessel lifting platform being operably connected to the crane; and (f) the rotating lift truck loading the first and second stacks of cartons onto the vessel lifting platform.

2. The method of claim 1, wherein the pallets are not raised with the vessel lifting platform.

3. The method of claim 1, wherein the rotator includes first and second opposed sets of fork tines, the first and second sets of fork tines clamping on the first and second palletized stacks of cartons in step "d" during rotation.

4. The method of claim 1, wherein the rotator includes first and second sets of opposed fork tines, the first set of fork tines being inserted into the pallets in step "b", the first and second sets of fork tines clamping on the first and second palletized stacks of cartons in step "d" during rotation, and the first set of fork tines being used to space apart the pallets from the cartons before step "d."

5. The method of claim 1, wherein the rotator includes first and second sets of opposed fork tines, the first set of fork tines being inserted into the pallets in step "b", the first and second sets of fork tines clamping on the first and second palletized stacks of cartons in step "d" during rotation, and the first set of fork tines being used to space apart the pallets from the cartons after step "d."

6. The method of claim 1, wherein the rotator includes first and second sets of opposed fork tines, the first set of fork tines being inserted into the pallets in step "b", the first and second sets of fork tines clamping on the first and second palletized stacks of cartons in step "d" during rotation, the second set of fork tines being used provide support for the stacks of cartons after step "d", and the first set of fork tines being used to space apart the pallets from the stacks of cartons before step "d".

7. A method of loading items onto a vessel with a hold and a lifting crane, the method comprising the steps of:

(a) providing a rotating lift truck, the lift truck having a rotator and an elevator
both of which being operably connected to the lift truck;
(b) using the elevator of the rotating lift truck
to elevate two palletized stacks of cartons of frozen chicken located in a first area,
the two palletized stacks of cartons having
pallets supporting a plurality of layers of cartons,
each layer having a plurality of cartons,
the first stack having a first height and
the second stack having a second height,
the first height being not equal to the second height;
(c) using the rotating lift truck to move the elevated stack of cartons
from the first area to a loading area for loading on a vessel lifting platform,
the lifting platform being operably connected to the crane;
(d) using the rotator of the rotating lift truck
to clamp onto and rotate
the elevated first and second stacks of cartons and pallets
by at least about 180 degrees in a first direction,
(e) during at least part of step "d"
the rotating lift truck moving the elevated stacks of cartons towards the vessel lifting platform; and
(f) using the rotating lift truck to load the stacks of cartons on the vessel lifting platform.

8. The method of claim 7, wherein the pallets are prevented from being raised with the vessel lifting platform, and the rotating lift truck includes a rotation stop which automatically restricts the extent of rotation to about 180 degrees in the first direction.

9. The method of claim 7, wherein the rotator includes first and second opposed sets of fork tines, the first and second sets of fork tines clamping on the palletized stack of cartons in step "b".

10. The method of claim 7, wherein the rotator includes first and second sets of opposed fork tines, the first set of fork tines being inserted into the pallets in step "b", the first and second sets of fork tines clamping on the palletized stack of cartons in step "b", and the first set of fork tines being used to space apart the pallets from the cartons before step "d."

11. The method of claim 7, wherein the rotator includes first and second sets of opposed fork tines, the first set of fork tines being inserted into the pallets in step "b", the first and second sets of fork tines clamping on the palletized stacks of cartons in step "d" during rotation, and the first set of fork tines being used to space apart the pallet from the cartons after step "d."

12. The method of claim 7, wherein the rotator includes first and second sets of opposed fork tines, the first set of fork tines being inserted into the pallet in step "b", the first and second sets of fork tines clamping on the palletized stack of cartons in "b", the second set of fork tines being used provide support for the first and second stacks of cartons after step "d", and the first set of fork tines being used to space apart the pallets from the stacks of cartons before step "d".

13. The method of claim 7, wherein the vessel lifting platform includes a plurality of fork openings or fork channels, and during step "f" the second set of fork tines enter the fork openings or fork channels and stop providing support for the stacks of cartons.

14. The method of claim 7, wherein the first stack has a different number of layers of cartons compared to the second stack.

15. The method of claim 7, wherein during the entire time of step "e" the rotating lift truck moving the elevated stacks of cartons closer to the vessel lifting platform located in the loading area.

16. The method of claim 7, wherein during at least 45 degrees of rotation in step "e", the rotating lift truck moving the elevated stacks of cartons closer to the vessel lifting platform located in the loading area.

17. The method of claim 7, wherein during at least 90 degrees of rotation in step "e", the rotating lift truck moving the elevated stacks of cartons closer to the vessel lifting platform located in the loading area.

18. The method of claim 7, wherein during at least 135 degrees of rotation in step "e", the rotating lift truck moving the elevated stacks of cartons closer to the vessel lifting platform located in the loading area.

19. The method of claim 7, wherein after step "e" further including the steps of:

(g) using the rotating lift truck to elevate a second plurality of palletized stacks of cartons each stack being supported by a pallet, and each stack including a plurality of layers of cartons, each layer having a plurality of cartons;
(h) using the rotator of the rotating lift truck to simultaneously rotate the second plurality of stacks of cartons by at least about 180 degrees in a second direction, the second direction being the opposite direction as the first direction, this rotation occurring at least partially during the time that the vessel lifting platform is being lowered into the loading area;
(i) using the rotating lift truck to deposit the second plurality of stacks of cartons on the vessel lifting platform; and
(j) preventing the second pallet from being raised with the vessel lifting platform.

20. The method of claim 7, wherein during the entire time of step "h" the rotating lift truck moving the elevated stacks of cartons closer to the vessel lifting platform.

* * * * *